United States Patent
Shekel et al.

(10) Patent No.: US 6,519,377 B2
(45) Date of Patent: Feb. 11, 2003

(54) INTEGRATED OPTICS BEAM DEFLECTORS AND SYSTEMS

(75) Inventors: Eyal Shekel, Jerusalem (IL); Daniel Majer, Givat Shmuel (IL); Shlomo Ruschin, Herzliya (IL); Guy Matmon, Jerusalem (IL); Jacob Julian Vecht, Jerusalem (IL); Yedidia Ariel, Dolev (IL)

(73) Assignee: Chiaro Networks Ltd., Jerusalem (IL)

( * ) Notice: Subject to any disclaimer, the term of this patent is extended or adjusted under 35 U.S.C. 154(b) by 0 days.

(21) Appl. No.: 10/055,133

(22) Filed: Jan. 23, 2002

(65) Prior Publication Data

US 2002/0097944 A1 Jul. 25, 2002

Related U.S. Application Data

(63) Continuation of application No. 09/470,642, filed on Dec. 22, 1999, now Pat. No. 6,366,710, which is a continuation of application No. PCT/IL98/00293, filed on Jun. 23, 1998.

(30) Foreign Application Priority Data

Jun. 23, 1997 (IL) .................................................. 121138

(51) Int. Cl.[7] .............................................. G02F 1/295
(52) U.S. Cl. .......................................................... 385/8
(58) Field of Search .............................. 385/44, 8, 132, 385/147, 88–92; 359/15

(56) References Cited

U.S. PATENT DOCUMENTS

| 4,245,883 | A | 1/1981 | Johnson et al. ................ 385/8 |
| 4,767,170 | A | 8/1988 | Mizutani et al. .......... 350/96.14 |
| 4,840,447 | A | 6/1989 | Kataoka ................... 350/96.14 |
| 5,239,598 | A | 8/1993 | Wight et al. ................... 385/8 |
| 5,371,817 | A | 12/1994 | Revelli et al. ................ 385/44 |
| 5,418,871 | A | 5/1995 | Revelli et al. ................ 385/44 |
| 5,745,631 | A | 4/1998 | Reinker ..................... 385/132 |
| 6,172,778 | B1 | 1/2001 | Reinhorn et al. ............. 359/15 |

OTHER PUBLICATIONS

Katz, J. et al. "Phase–Locked Semiconductor Laser Array with Separate Contacts", *Applied Phys. Letters*, vol. 43, No. 6, pp. 521–523, Sep. 1983.

Vasey, F., et al., "Spatial Optical Beam Steering with an AlGaAs integrated Phased Array" Applied Optics, vol. 32, No. 18, pp. 3220–3232, Jun. 1993.

*Primary Examiner*—Akm E. Ullah
(74) *Attorney, Agent, or Firm*—Ladas & Parry

(57) ABSTRACT

This invention discloses a selectably directable optical beam deflecting device including at least at least one substrate having formed thereon a multiplicity of waveguides, each waveguide receiving light and emitting light, the totality of light emitted by said multiplicity of waveguides producing at least one delectably directable output beam, and at least one multiplexer applying electrical inputs to the at least one substrate for individually controlling the light emitted by each of the multiplicity of waveguides, thereby governing the orientation of the selectably directable output beam.

64 Claims, 39 Drawing Sheets

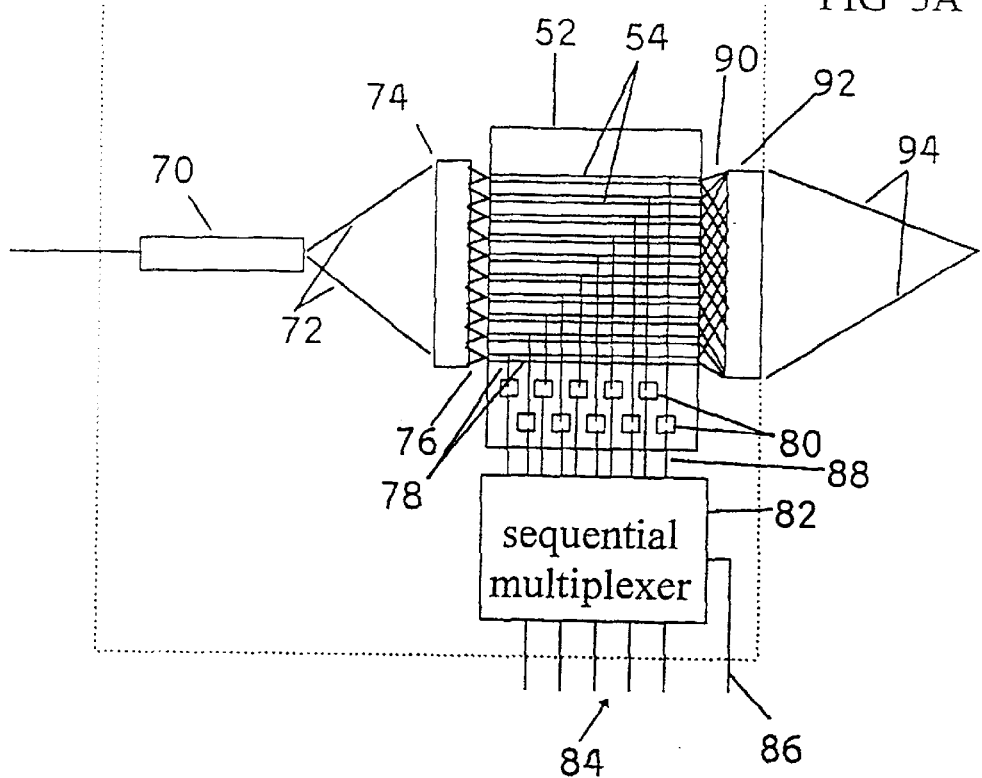
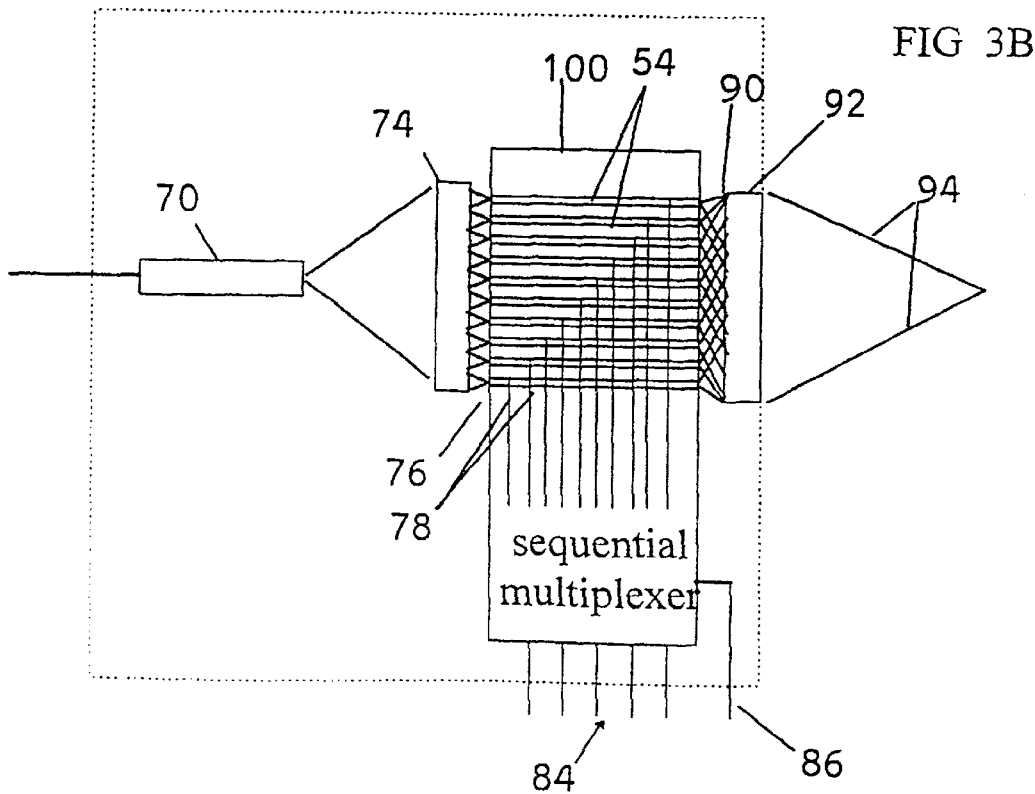

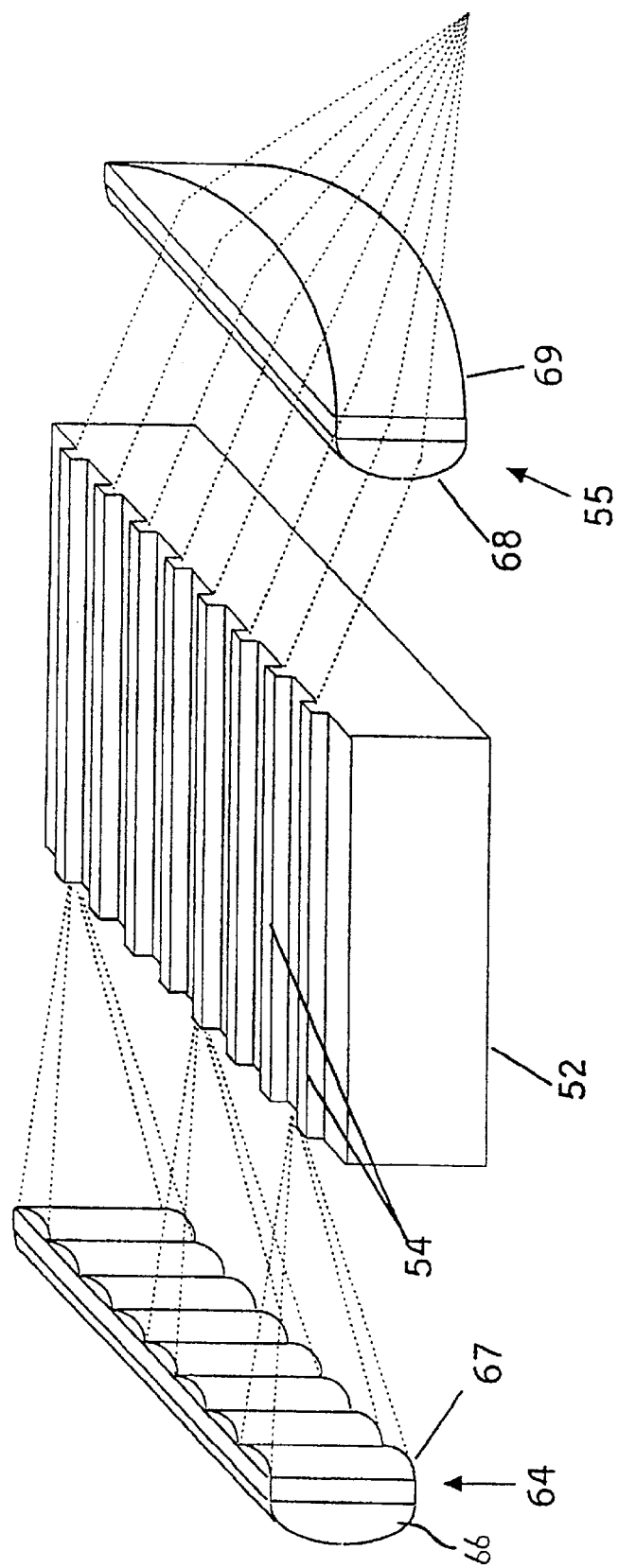

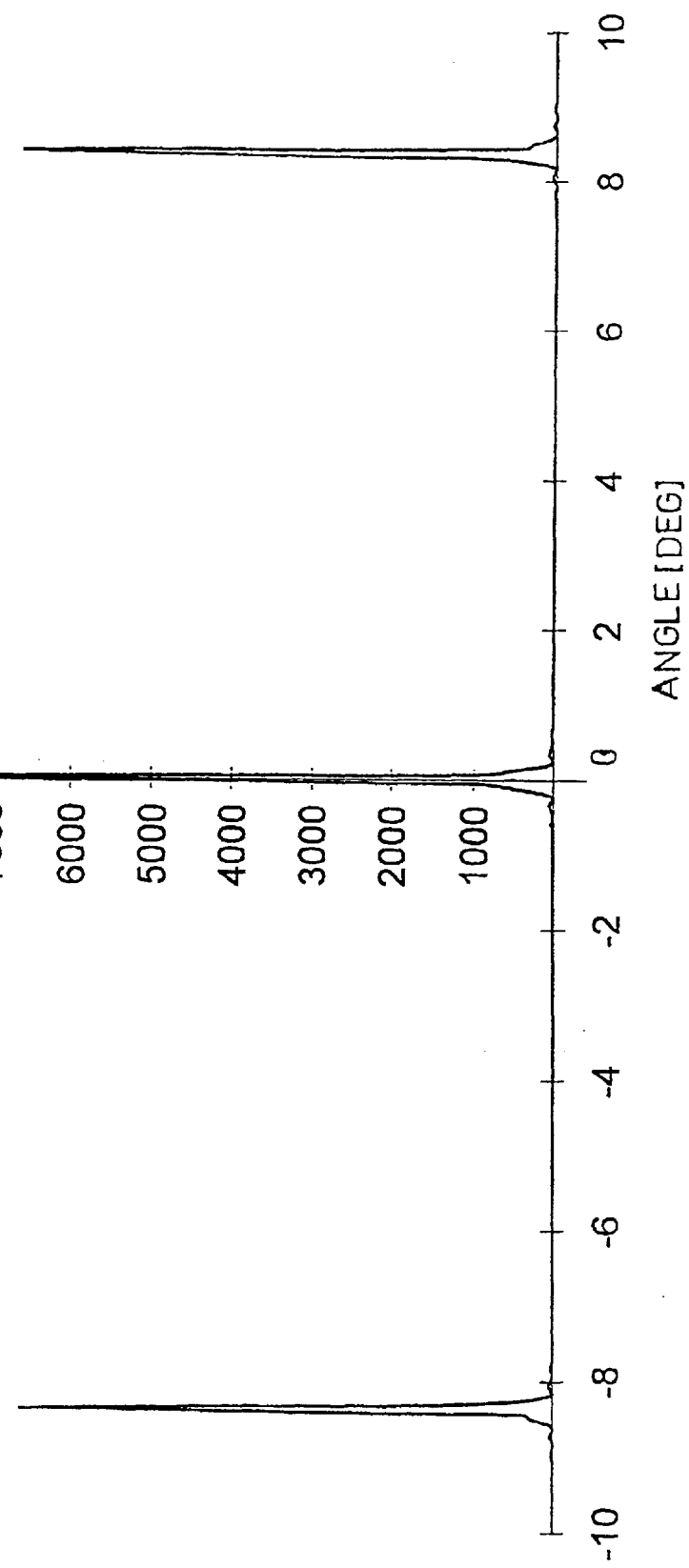

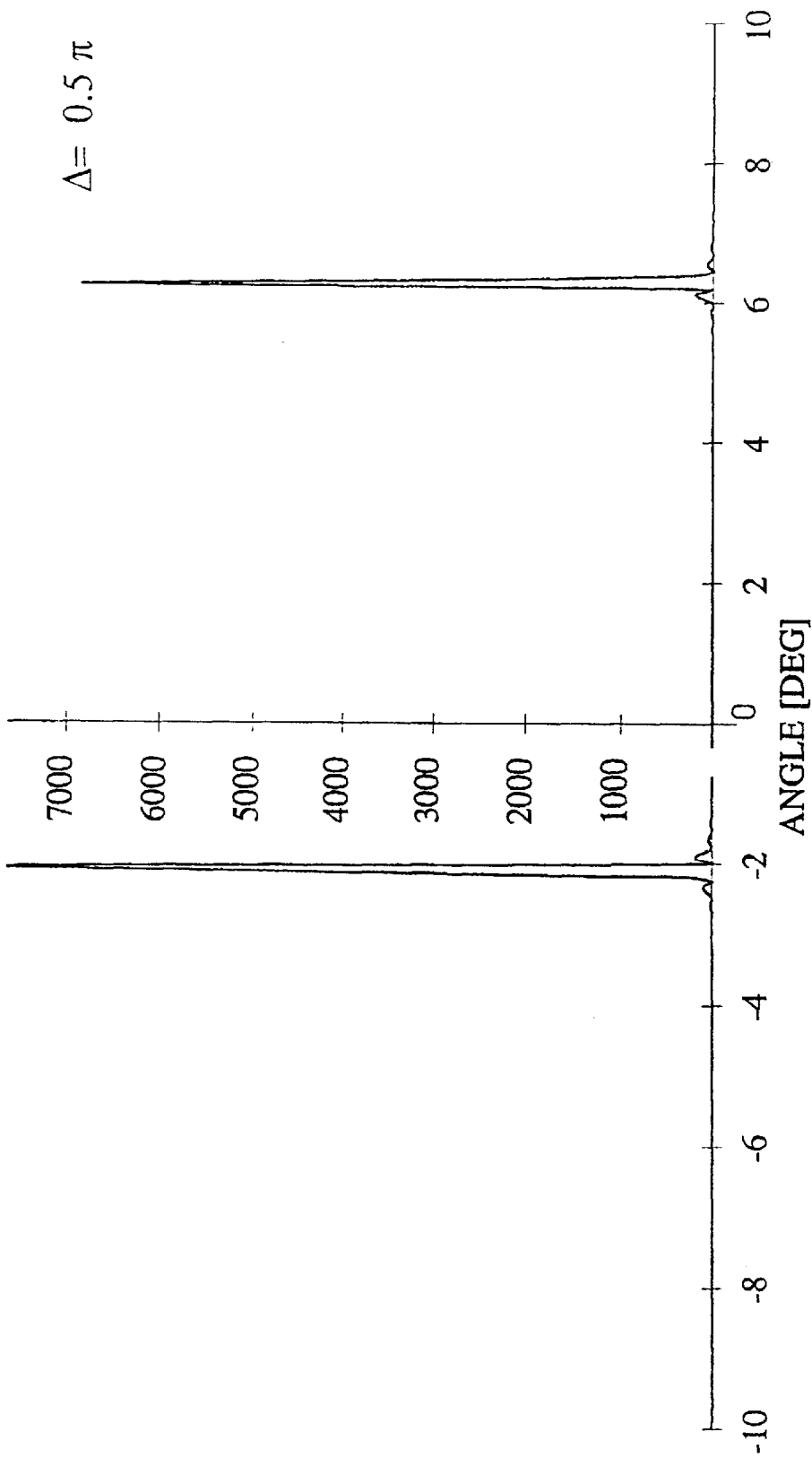

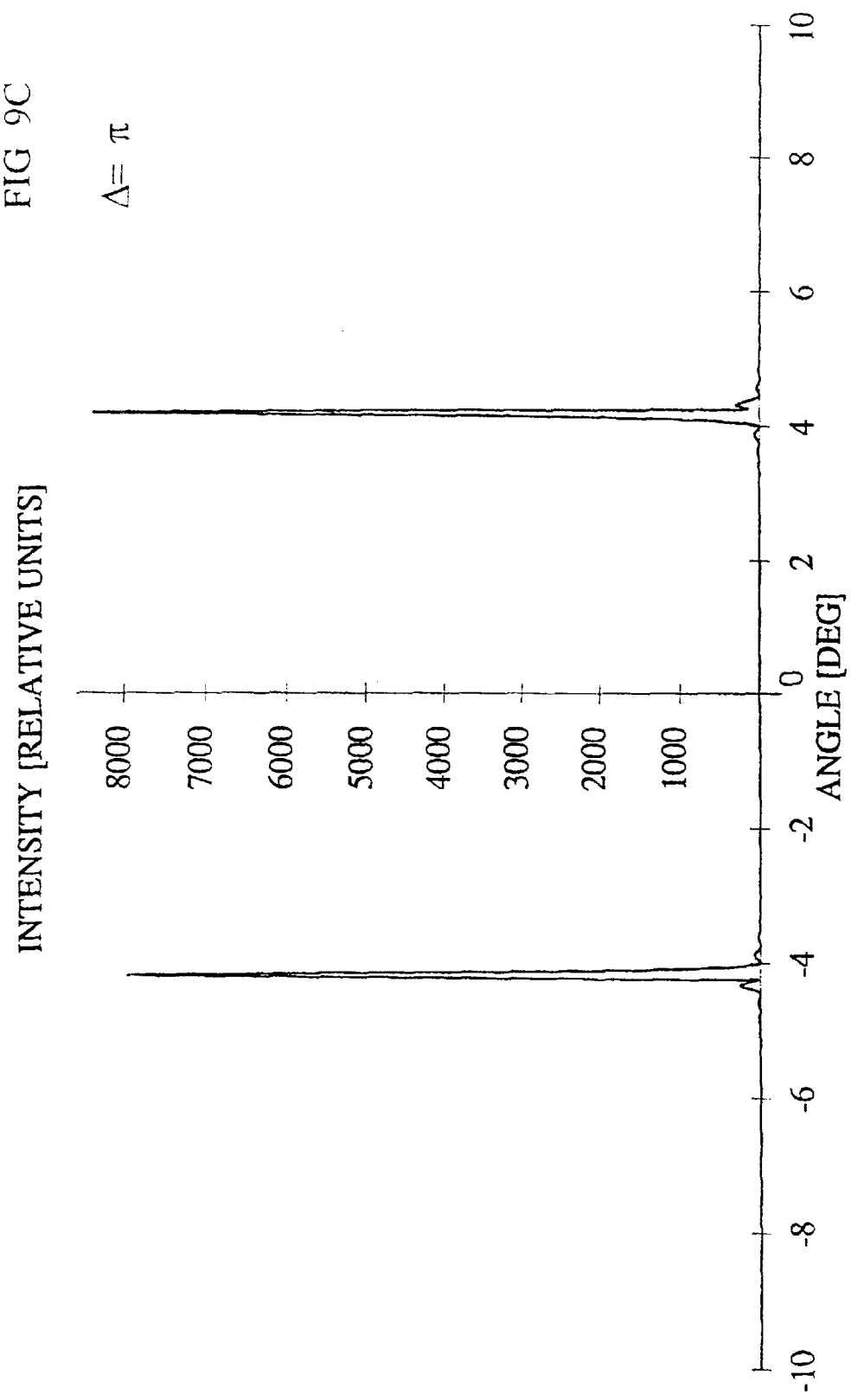

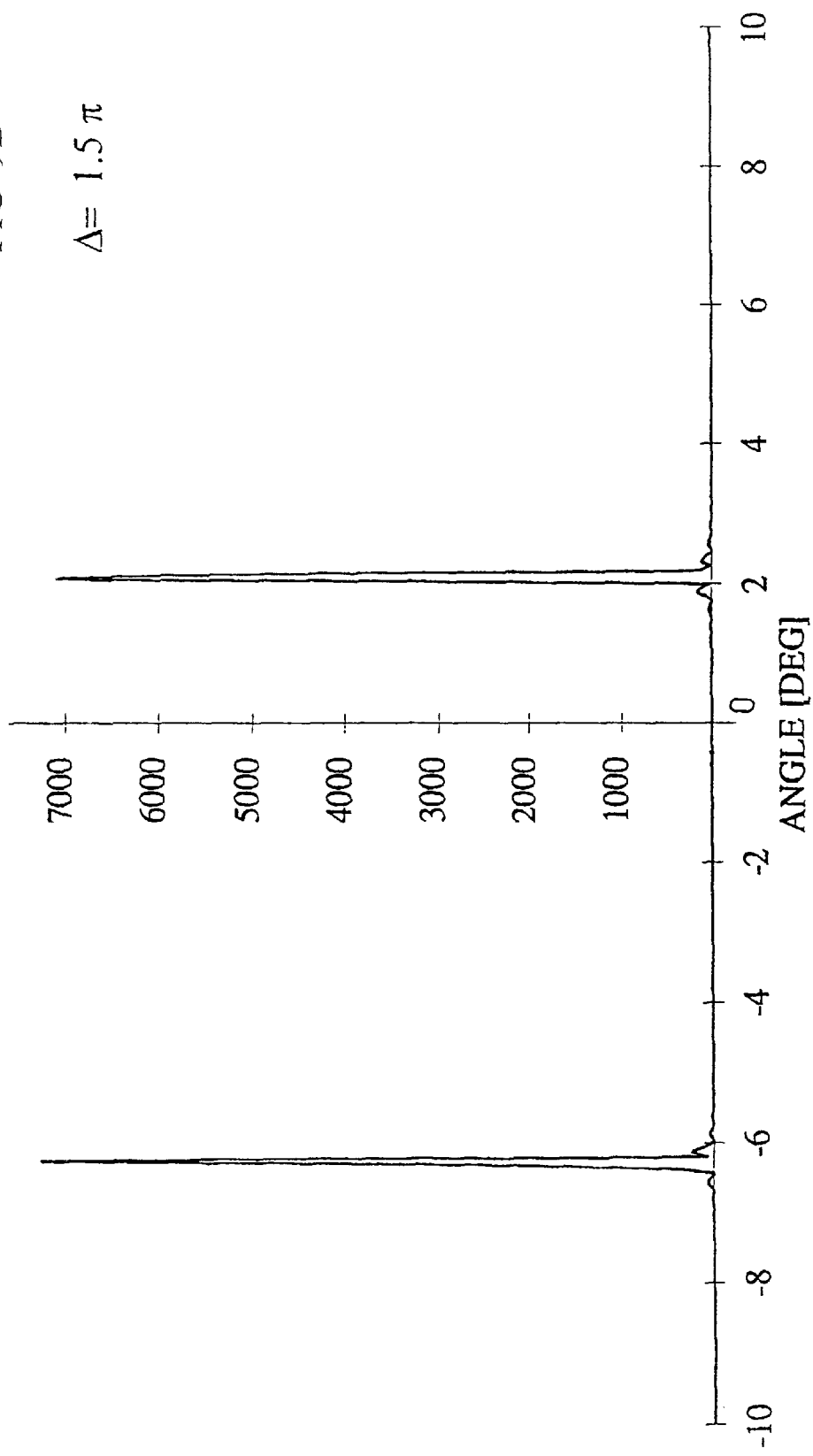

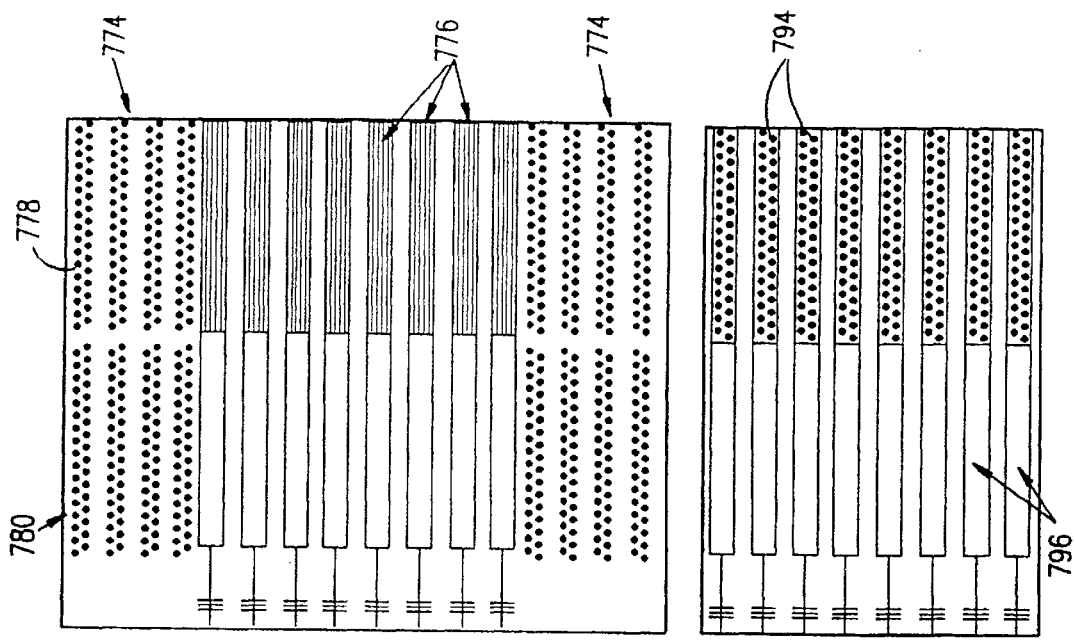
FIG. 30
FIG. 31
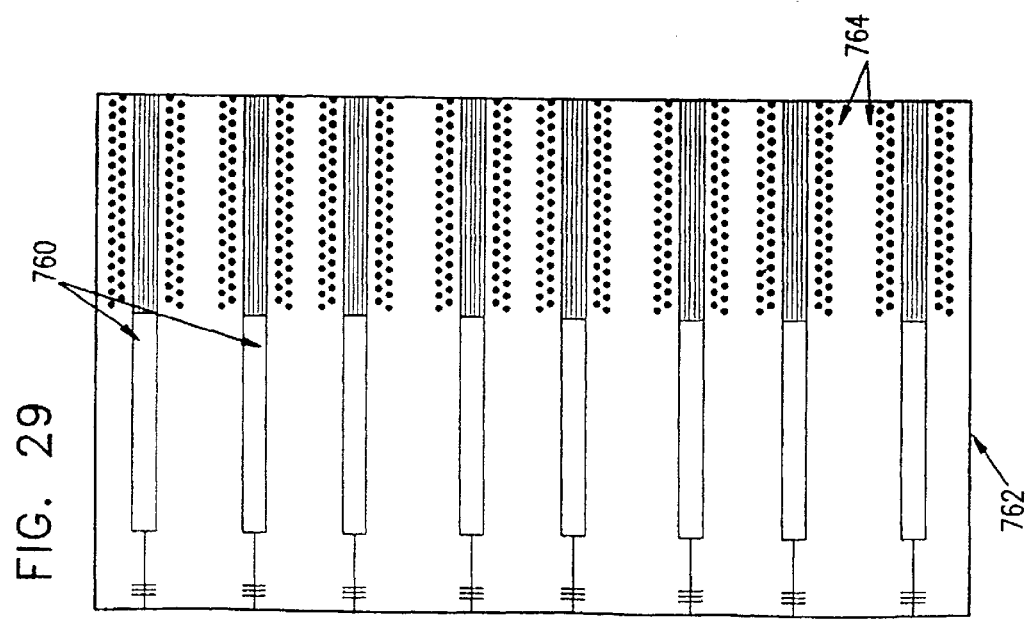
FIG. 29

INTEGRATED OPTICS BEAM DEFLECTORS AND SYSTEMS

This application is a continuation of application Ser. No. 9/470,642 filed on Dec. 22, 1999, now U.S. Pat. No. 6,366,710 which is a continuation International Application PCT/IL98/00293 filed on Jun. 23, 1998, which designated the U.S.

FIELD OF THE INVENTION

The present invention relates to integrated optics beam deflectors and to systems, such as scanners and optical switches, employing such deflectors.

BACKGROUND OF THE INVENTION

Various types of integrated optics beam deflectors are known in the art. U.S. Pat. No. 5,239,598, the disclosure of which is hereby incorporated by reference, and the references cited therein, as well as the following articles are believed to represent the state of the art:

Katz et al, Phase-locked semiconductor laser array with separate contacts, Appl Phys. Lett 43, 1983, pp 521–523;

Vasey et al Spatial optical beam steering with an AlGaAs integrated phased array, Applied Optics, 32, No. 18, 20 June, 1993, pp 3220–3232.

SUMMARY OF THE INVENTION

The present invention seeks to provide an improved light beam deflector and systems employing same.

There is thus provided in accordance with a preferred embodiment of the present invention a selectably directable optical beam deflecting device including:

at least one substrate having formed thereon a multiplicity of waveguides, each waveguide receiving light and emitting light, the totality of light emitted by the multiplicity of waveguides producing at least one selectably directable output beam; and at least one sequential multiplexer applying electrical inputs to the at least one substrate for individually controlling the light emitted by each of the multiplicity of waveguides, thereby governing the orientation of the selectably directable output beam Preferably, the at least one sequentimal multiplexer is a phase controller which controls the phase of the light emitted by each of the multiplicity of waveguides.

Alternatively or additionally, the at least one sequential multiplexer is an intensity controller which controls the intensity of the light emitted by each of the multiplicity of waveguides.

In accordance with a preferred embodiment of the present invention, the at least one substrate includes a plurality of substrates, each having formed thereon a multiplicity of waveguides, each waveguide receiving light and emitting light and wherein the at least one sequential multiplexer applies electrical inputs to the plurality of substrates.

There is also provided in accordance with a preferred embodiment of the present invention a selectably directable optical beam deflecting device including:

a plurality of substrates, each having formed thereon a multiplicity of waveguides, each waveguide receiving light and emitting light, the totality of light emitted by the multiplicity of waveguides producing at least one selectably directable output beam.

Further in accordance with a preferred embodiment of the present invention there is provided a selectably directable optical beam generating device including:

a light source;

at least one substrate having formed thereon a multiplicity of waveguides, each waveguide receiving light from the light source and emitting light, the totality of light emitted by the multiplicity of waveguides producing at least one selectably directable output beam; and Preferably the light source includes a laser formed on the at least one substrate.

at least one sequential multiplexer applying electrical inputs to the at least one substrate for individually controlling the light emitted by each of the multiplicity of waveguides, thereby governing the orientation of the selectably directable output beam.

Preferably, the at least one sequential multiplexer is a phase controller which controls the phase of the light emitted by each of the multiplicity of waveguides.

Alternatively or additionally, the at least one sequential multiplexer is an intensity controller which controls the intensity of the light emitted by each of the multiplicity of waveguides.

Preferably, the at least one substrate includes a plurality of substrates, each having formed thereon a multiplicity of waveguides, each waveguide receiving light and emitting light and wherein the at least one sequential multiplexer applies electrical inputs to the plurality of substrates.

Additionally in accordance with a preferred embodiment of the present invention there is provided a selectably directable optical beam generating device including:

at least one light source; and a plurality of substrates, each having formed thereon a multiplicity of waveguides, each waveguide receiving light from the at least one light source and emitting light, the totality of light emitted by the multiplicity of waveguides producing at least one selectably directable output beam.

Still further in accordance with a preferred embodiment of the present invention there is provided a selectably directable optical beam deflecting device including:

at least one substrate having formed thereon a multiplicity of wave guides; and a microlens array receiving light and coupling the received light to the multiplicity of waveguides.

Additionally in accordance with a preferred embodiment of the present invention there is provided a selectably directable optical beam generating device including:

a light source;

at least one substrate having formed thereon a multiplicity of waveguides; and a microlens array receiving light from the light source and coupling the received light to the multiplicity of waveguides.

There is also provided in accordance with another preferred embodiment of the present invention a selectably directable optical beam generating device including a light source, at least one substrate having formed thereon a multiplicity of waveguides and a microlens array receiving light from the light source and coupling the received light to the multiplicity of waveguides.

Preferably the selectably directable optical beam generating device provides wavelength division multiplexing.

There is also provided in accordance with another preferred embodiment of the present invention an optical device including at least one substrate having formed thereon a multiplicity of polarization independent, electrically controlled waveguides, and a light receiver directing light into the multiplicity of waveguides.

Further in accordance with a preferred embodiment of the present invention each one of the multiplicity of polarization independent, electrically controlled waveguides includes first and second phase shifting waveguide portions.

Still further in accordance with a preferred embodiment of the present invention the electric fields of different directions are applied to the first and second phase shifting waveguide portions.

Preferably each of the multiplicity of polarization independent electrically controlled waveguides includes first and second phase-shifting waveguide portions of respective first and second lengths having respective first and second electric fields of different directions applied thereto.

Additionally in accordance with a preferred embodiment of the present invention at least one of the multiplicity of polarization independent, electrically controlled waveguides includes first and second phase shifting waveguide portions separated by a quarter-wave plate, whereby light from the first waveguide portion passes through the quarter-wave plate prior to entering the second waveguide portion.

There is also provided in accordance with a preferred embodiment of the present invention an optical device including at least one substrate having formed thereon a multiplicity of electrically controlled waveguides, and a light receiver for directing light into the multiplicity of waveguides, the light receiver including a selectable polarization rotator.

There is also provided in accordance with yet another preferred embodiment of the present invention an optical device including at least one substrate having formed thereon a multiplicity of electrically controlled waveguides, and a polarization rotator for rotating the polarization of light passing through the multiplicity of electrically controlled waveguides by 90 degrees or an odd integer multiple thereof.

Further in accordance with a preferred embodiment of the present invention the polarization rotator operates by generating a magnetic field extending parallel to longitudinal axes of the multiplicity of waveguides.

Still further in a accordance with a preferred embodiment of the present invention the selectable polarization rotator is automatically operative to rotate the polarization so as to provide an optimized light output from the multiplicity of waveguides.

Additionally in accordance with a preferred embodiment of the present invention the selectable polarization rotator is responsive to an output of the multiplicity of waveguides.

Moreover in accordance with a preferred embodiment of the present invention the selectable polarization rotator is responsive to the polarization of an input to the multiplicity of waveguides.

Further in accordance with a preferred embodiment of the present invention and having selectably directable beam deflection functionality. Alternatvely, the selectably directable beam deflection functionality includes directable beam receiving functionality.

Further in accordance with a preferred embodiment of the present invention and the selectably directable functionality is realized by means of phase-shifting.

There is also provided in accordance with yet another preferred embodiment of the present invention an optical device including at least one substrate having formed thereon a nultiplicity of electrically controlled waveguides, and a light receiver directing light into the multiplicity of waveguides and including polariztion maintaining optical fibers.

There is also provided in accordance with a preferred embodiment of the present invention a selectably directable optical beam deflecting device including at least one substrate having formed thereon a multiplicity of phase-shifting waveguides, and a light receiver directing light into the multiplicity of waveguides, and wherein the at least one substrate includes multiple mutually insulated conductor layers including a multiplicity of conductors, at least some of which are connected to the waveguides by vias.

There is provided in accordance with another preferred embodiment of the present invention a selectably directable optical beam generating device including at least one substrate having formed thereon a multiplicity of waveguides, and a laser monolithically formed on the at least one substrate and providing light to the multiplicity of waveguides.

There is provided in accordance with a preferred embodiment of the present invention an optical device including at least one substrate having formed thereon a multiplicity of waveguides, and a laser monolithically formed on the at least one substrate and providing light to the multiplicity of waveguides, the multiplicity of waveguides and the laser being formed at different regions of identical layers.

There is provided in accordance with yet another preferred embodiment of the present invention a semiconductor laser including an N-doped gallium arsenide substrate, an N-doped aluminum gallium arsenide layer formed over the substrate, an N-doped gallium arsenide layer formed over the N-doped aluminum gallium arsenide layer, a P-doped gallium arsenide layer formed over the N-doped gallium arsenide layer, a P-doped aluminum gallium arsenide layer formed over the P-doped gallium arsenide layer, and a P-doped gallium arsenide layer formed over the P-doped aluminum gallium arsenide layer.

There is provided in accordance with a preferred embodiment of the present invention a selectably directable optical beam deflecting device including at least one substrate having formed thereon a multiplicity of waveguides, and a light receiver coupling light to the multiplicity of waveguides at first ends thereof and wherein the multiplicity of waveguides are outwardly tapered at the first ends thereof There is also provided in accordance with yet another preferred embodiment of the present invention a selectably directable optical beam deflecting device including at least one substrate having formed thereon a multiplicity of waveguides, and a light receiver directing light into the multiplicity of waveguides, the light receiver including a cylindrical lens.

There is also provided in accordance with a preferred embodiment of the present invention a selectably directable optical beam deflecting device including at least one substrate having formed thereon a multiplicity of waveguides, and a light receiver directing light into the multiplicity of waveguides, the light receiver including a multi-mode interference coupler.

There is also provided in accordance with a preferred embodiment of the present invention a selectably directable optical beam deflecting device including at least one substrate having formed thereon a multiplicity of waveguides, and a light receiver directing light into the multiplicity of waveguides, the light receiver including a planar wave guide.

Further in accordance with a preferred embodiment of the present invention the multiplicity of waveguides have first ends which abut the planar waveguide, the first ends being tapered outwardly.

Still further in accordance with a preferred embodiment of the present invention the multi-mode interference coupler includes a light receiving waveguide. Preferably the light receiving waveguide includes a light receiving end which is outwardly tapered.

Additionally in a accordance with a preferred embodiment of the present invention the light receiving waveguide includes an electro-absorption modulator.

Moreover in accordance with a preferred embodiment of the present invention the electro-absorption modulator receives a modulating input from a light detector monolithically formed therewith on the at least one substrate.

Additionally or alternatively the multiplicity of waveguides is controllable so as to selectably provide multiple selectably directed output beams.

There is also provided in accordance with a preferred embodiment of the present invention a selectably directable optical beam deflecting device including at least one substrate having formed thereon a multiplicity of waveguides, and a light receiver directing light into the multiplicity of waveguides, and wherein the multiplicity of waveguides is controllable so as to selectably provide multiple selectably directed -output beams.

Additionally or alternatively the optical device also includes a waveguide filter including a necked waveguide having a relatively broad input end which receives light and allows propagation of multi-mode light waves therethrough, a narrowed neck portion at which higher modes radiate outside the waveguide and only the modes which can propagate therethrough pass therethrough, and a relatively broad output end.

There is also provided in accordance with a preferred embodiment of the present invention a waveguide filter including a necked waveguide having a relatively broad input end which receives light and allows propagation of multi-mode light waves therethrough, a narrowed neck portion at which higher modes radiate outside the waveguide and only the modes which can propagate therethrough pass therethrough, and a relatively broad output end.

Preferably the optical device is implemented on gallium arsenide.

There is also provided in accordance with a preferred embodiment of the present invention an optical switch including a monolithic plurality of selectably directable optical beam deflecting devices, a plurality of optical beam receiving devices.

There is also provided in accordance with yet another preferred embodiment of the present invention an optical switch including a plurality of monolithic pluralities of selectably directable optical beam deflecting devices, a plurality of optical beam receiving devices.

Further in accordance with a preferred embodiment of the present invention the plurality of monolithic pluralities of beam deflecting devices are arranged generally parallel to one another along an axis perpendicular to a plane in which selectable deflection of a light beam is produced thereby.

Still further in accordance with a preferred embodiment of the present invention the plurality of monolithic pluralities of beam deflecting devices are arranged generally distributed along a curve extending in a plane perpendicular to a plane in which selectable deflection of a light beam is produced thereby.

There is also provided in accordance with yet another preferred embodiment of the present invention an optical switch including a plurality of selectably directable optical beam deflecting devices, each including at least one substrate having formed thereon a multiplicity of waveguides, and a plurality of optical beam receiving devices.

Further in accordance with a preferred embodiment of the present invention each of the plurality of optical beam receiving devices includes an optical fiber. Preferably the optical fiber has a numerical aperture of less than 0.3.

Additionally in accordance with a preferred embodiment of the present invention the selectably directable optical beam deflecting devices each include at least one substrate having formed thereon a multiplicity of waveguides.

There is also provided in accordance with a preferred embodiment of the present invention an optical switch including a plurality of optical beam emitting devices and a monolithic plurality of selectably directable optical beam receiving devices. Preferably the optical beam receiving devices are selectably directable.

There is also provided in accordance with a preferred embodiment of the present invention an optical switch including a plurality of optical beam emitting devices and a plurality of monolithic pluralities of selectably directable optical beam receiving devices.

Further in accordance with a preferred embodiment of the present invention the plurality of monolithic pluralities of beam receiving devices are arranged generally parallel to one another along an axis perpendicular to a plane in which selectable deflection of a light beam is produced thereby. Alternatively the plurality of monolithic pluralities of beam receiving devices are arranged generally distributed along a curve extending in a plane perpendicular to a plane in which selectable deflection of a light beam is produced thereby.

Still further in accordance with a preferred embodiment of the present invention the selectable directable optical beam receiving devices each include at least one substrate having formed thereon a multiplicity of waveguides.

There is also provided in accordance with a preferred embodiment of the present invention an optical switch including a plurality of optical beam emitting devices, and a plurality of selectably directable optical beam receiving devices, each including at least one substrate having formed thereon a multiplicity of waveguides.

Additionally in accordance with a preferred embodiment of the present invention both the optical beam emitting devices and the optical beam receiving devices are selectably directable.

Moreover in accordance with a preferred embodiment of the present invention and including a light input coupler to the plurality of optical beam devices and a cylindrical lens light output coupler receiving light from the plurality of optical beam devices. Preferably the cylindrical lens light output coupler includes a plurality of cylindrical lenses, each associated with an optical beam device. Alternatively the cylindrical lens light output coupler includes a single cylindrical lens associated with a plurality of optical beam devices.

Additionally in accordance with a preferred embodiment of the present invention and including a light input coupler to the plurality of optical beam devices which includes at least one cylindrical lens. Preferably the light input coupler to the plurality of optical beam devices includes at least one cylindrical lens.

Moreover in accordance with a preferred embodiment of the present invention the at least one cylindrical lens includes a plurality of cylindrical lenses, each associated with an optical beam device.

Still further in accordance with a preferred embodiment of the present invention the at least one cylindrical lens includes a single cylindrical lens associated with a plurality of optical beam devices.

Further in accordance with a preferred embodiment of the present invention the light input coupler also includes a multiplicity of microlenses fixed with respect to the at least one cylindrical lens, each of the multiplicity of microlenses directing light into a single beam transmitting device.

Preferably the multiplicity of microlenses includes focusing microlenses. Alternatively the multiplicity of microlenses includes collimating microlenses.

There is also provided in accordance with a preferred embodiment of the present invention an active optical beam transmission device including at least one substrate having formed thereon a multiple layer integrated electronic circuit, and a multiplicity of electrically controlled waveguides.

Further in accordance with a preferred embodiment of the present invention the waveguides emit a selectably directable beam of light. Alternatively or additionally the waveguides selectably receive a beam of light.

Still further in accordance with a preferred embodiment of the present invention the multiplicity of waveguides are operative simultaneously to deflect a plurality of optical beams.

Preferably overlying the waveguides, a multiplicity of electrical contacts, each contact providing an electrical connection to at least one of the multiplicity of electrically controlled waveguides.

There is also provided in accordance with a preferred embodiment of the present invention an active optical beam transmission device including at least one substrate having formed thereon a plurality of waveguide assemblies, each including a multiplicity of electrically controlled waveguides, and overlying each of the waveguide assemblies, a multiplicity of electrical contacts, each contact providing an electrical connection to at least one of the multiplicity of electrically controlled waveguides in the assembly.

There is also provided in accordance with a preferred embodiment of the present invention a monolithic optical fight modulator including a substrate having formed monolithically thereon an electro-absorption modulator, and a light detector providing a modulating output to the electro-absorption modulator.

There is also provided in accordance with a preferred embodiment of the present invention an optical waveguide-lens including at least one substrate having formed thereon a multiplicity of electrically controlled, phase-shifting waveguides, and an electrical control signal source providing electrical signals to the multiplicity of waveguides to cause them to have a desired lens functionality.

Additionally the optical devices described hereinabove may also include an electrical control signal source providing electrical signals to the multiplicity of waveguides to cause them to have a desired lens functionality. Furthermore the optical devices may also include a feedback connection between the optical beam receiving devices and the optical beam deflecting devices.

Still further in accordance with a preferred embodiment of the present invention the optical beam receiving devices are configured to receive light over a region sufficiently large such that wavelength dependencies of the deflectors do not substantially affect the amount of light sensed by the receiving devices.

There is also provided in accordance with a preferred embodiment of the present invention an optical switch including a plurality of selectably directable optical beam deflecting devices, a plurality of optical beam receiving devices, and wherein the plurality of selectably directable optical beam deflecting devices and the plurality of optical beam receiving devices are monolithically formed on the same substrate.

Further in accordance with a preferred embodiment of the present invention the plurality of selectably directable optical beam deflecting devices and the plurality of optical beam receiving devices are monolithically formed on the same substrate There is also provided in accordance with a preferred embodiment of the present invention a method of forming a monolithic structure having electrical contacts including the steps of configuring regions on a wafer such that upper and lower surfaces are defined thereon, coating the upper and lower surfaces with metal by evaporation in a direction generally perpendicular to the upper and lower surfaces, the direction being selected with respect to interconnecting surfaces which interconnect the upper and lower surfaces such that metal is not substantially coated onto the interconnecting surfaces, whereby electrical connections between the upper and lower surfaces via the interconnecting surfaces are not formed by the metal coating.

Further in accordance with a preferred embodiment of the present invention the monolithic structure includes a waveguide device.

There is also provided in accordance with yet another preferred embodiment of the present invention a method for aligning a waveguide device including providing a waveguide having light emitting capability, and operating the waveguide to emit light during alignment thereof.

There is also provided in accordance with a preferred embodiment of the present invention an optical switch including a plurality of ports, an optical crossbar assembly, and a plurality of information carrying optical fibers interconnecting the plurality of ports with inputs to the optical crossbar assembly, the information carrying optical fibers including polarization maintaining fibers.

There is also provided in accordance with yet another preferred embodiment of the present invention an optical switch including a plurality of ports, an optical crossbar assembly, and a plurality of information carrying optical fibers interconnecting the plurality of ports with inputs to the optical crossbar assembly, the plurality of ports each having an input and output which are clock synchronized.

Additionally in a accordance with a preferred embodiment of the present invention the plurality of ports are clock synchronized among themselves.

BRIEF DESCRIPTION OF THE DRAWINGS

The present invention will be understood and appreciated more fully from the following detailed description, taken in conjunction with the drawings in which:

FIGS. 3A and 3B illustrate two alternative embodiments of an integrated optics scanning unit forming part of the scanning engine of FIG. 2;

FIG. 7 is a simplified pictorial illustration of an integrated optics beam deflection unit useful as part of an integrated optics scanning unit of the type shown in FIGS. 3A and 3B or as part of an integrated optics switching unit of the type shown in FIGS. 6A or 6B;

FIGS. 9A, 9B, 9C and 9D are graphs illustrating the far-field diffraction pattern produced by an optical beam deflector constructed and operative in accordance with a preferred embodiment of the present invention for different applied voltages;

FIG. 29 is a simplified illustration of part of an optical switch including a monolithic plurality of selectably directable optical beam deflecting devices in accordance with one preferred embodiment of the present invention;

FIG. 30 is a simplified illustration of part of an optical switch including a monolithic plurality of selectably directable optical beam deflecting devices in accordance with another preferred embodiment of the present invention;

FIG. 31 is a simplified illustration of part of an optical switch including a monolithic plurality of selectably directable optical beam deflecting devices in accordance with yet another preferred embodiment of the present invention;

DETAILED DESCRIPTION OF PREFERRED EMBODIMENTS

Figure 1:
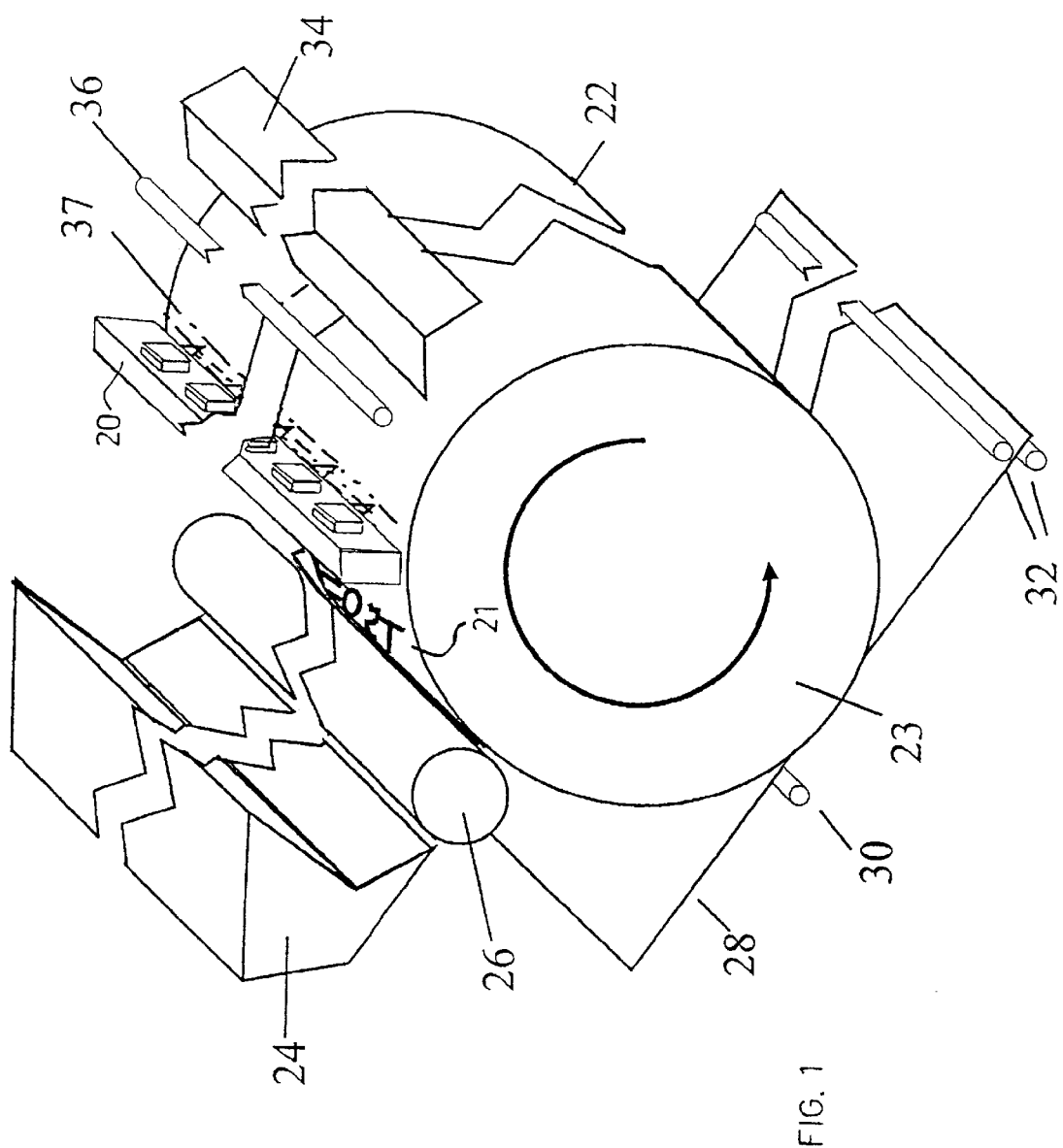
FIG. 1 is a simplified illustration of laser writing apparatus constructed and operative in accordance with a preferred embodiment of the present invention.

Reference is now made to FIG. 1, which is a simplified illustration of laser writing apparatus constructed and operative in accordance with a preferred embodiment of the present invention. The laser writing apparatus typically comprises a laser scanning unit 20, illustrated in FIG. 2, which writes a latent image 21 onto a photoreceptor 22, which is typically located on the cylindrical surface of a drum 23.

The photoreceptor 22, bearing the latent image 21, receives toner from a toner hopper 24 via a developer roller 26 and transfers the toner onto a substrate 28 with the assistance of a transfer corotron 30. The toner is fused onto the substrate by a fuser 32. A discharge lamp 34 serves to discharge the photoreceptor 22. Downstream of discharge lamp 34, a charge corotron 36 uniformly charges the photoreceptor, upstream of impingement thereon of laser beams 37 from laser scanning unit 20, which selectively discharges regions on the photoreceptor, thus creating the latent image 21.

Figure 2:
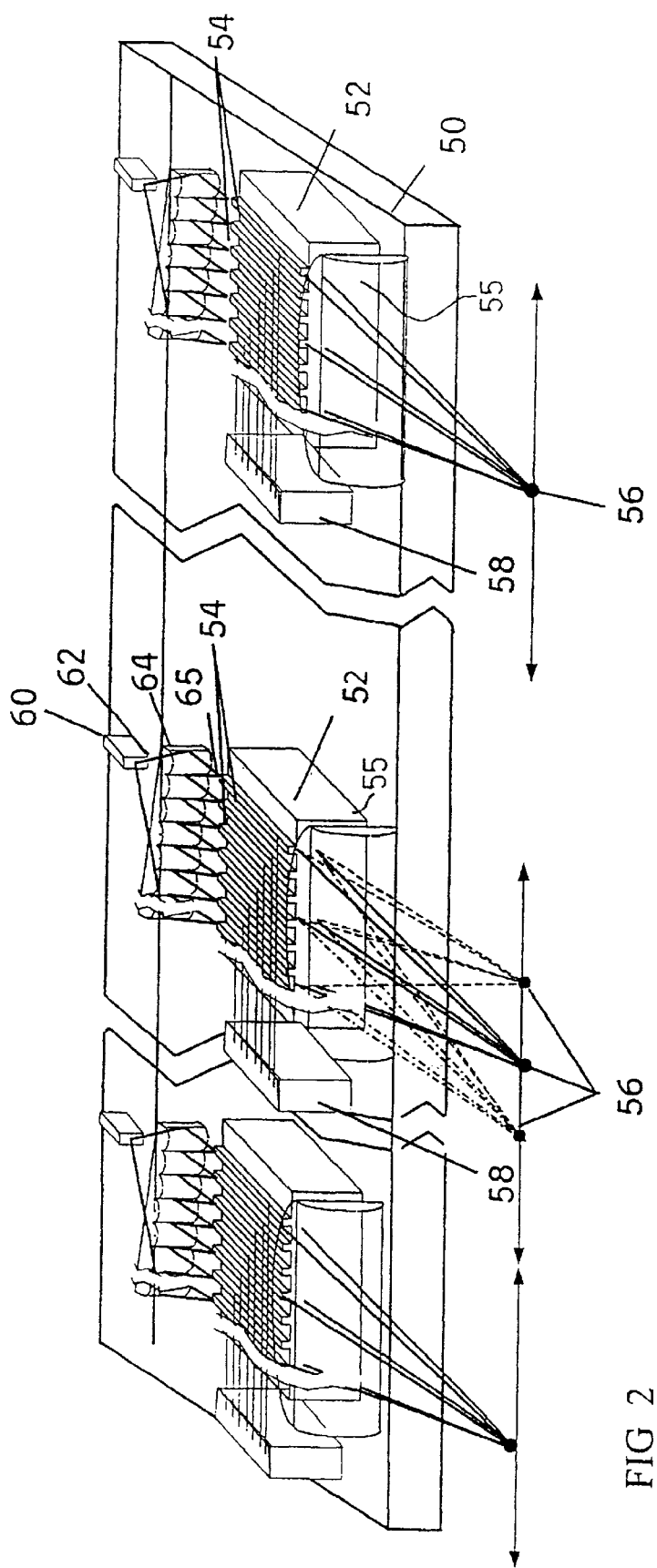
FIG. 2 is a simplified illustration of a scanning engine suitable for use in the laser writing apparatus of FIG. 1.

It is a particular feature of the present invention that the laser scanning unit 20, as illustrated in FIG. 2, comprises a selectably directable optical beam deflector including a base 50 onto which are mounted a plurality of substrates 52, each having formed thereon a multiplicity of waveguides 54, preferably 256 in number, each waveguide 54 preferably receiving light and emitting light having a selectable phase, intensity or a combination thereof. The totality of light emitted by the multiplicity of waveguides 54 on each substrate 52 is supplied to an output lens 55, which produces a selectably directable output beam 56, which covers a given sector of the photoconductor. The various substrates cooperate to cover the entire useful area of the photoconductor.

It is a particular feature of the present invention that the substrates 52 need not be aligned on base 50 to a very high degree of accuracy, inasmuch as the orientations of beams 56 produced thereby are electronically determined and adjustable, inter alia to take misalignment into account.

At least one sequential multiplexer 58 applies electrical inputs to each substrate 52 for individually controlling the light emitted by each of the multiplicity of waveguides 54, thereby governing the orientation of said selectably directable output beam 56. Preferably, the sequential multiplexer 58 is a phase controller which controls the phase of the light emitted by each of the multiplicity of waveguides. Alternatively multiplexer 58 may be an intensity controller or a combination phase/intensity controller. Multiplexer 58 may be on a substrate separate from or integral with substrate 52.

An input light source 60, such as a diode laser or an optical fiber, provides a light beam 62 which impinges on an input lens assembly 64, a preferred embodiment of which is illustrated in FIG. 7. The input lens assembly 64 provides a multiplicity of focused beams 65, each of which impinges on one of the waveguides 54 on substrate 52.

As seen in FIG. 7, the input lens assembly 64 typically comprises a combination of a cylindrical lens 66 and an array of cylindrical microlenses 67 bonded thereto. The output lens 55 typically comprises mutually perpendicularly aligned cylindrical lenses 68 and 69.

Reference is now made to FIGS. 3A and 3B, which illustrate two alternative embodiments of an integrated optics scanning unit forming part of the scanning engine of FIG. 2. In the embodiment of FIG. 3A, an input laser 70, such as a diode laser, receives a laser control signal from content control electronics (not shown) and provides a laser beam 72 which impinges on an input lens assembly 74, a preferred embodiment of which is illustrated in FIG. 7.

The input lens assembly 74 provides a multiplicity of focused beams 76, each of which impinges on one of the waveguides 54 on substrate 52. Each waveguide 54 receives an electrical input via a corresponding conductor 78, which extends from the waveguide to a corresponding connector pad 80 which is also formed on substrate 52. A sequential multiplexer 58 (FIG. 2), formed on a separate substrate 82, receives address information via an address bus 84 and a phase, intensity, or phase/intensity input via an input line 86 from control electronics (not shown) and supplies a phase, intensity, or phase/intensity control signal to each waveguide 54 via a conductor 88 and a corresponding connector pad 80 and conductor 78.

The phase, intensity or phase/intensity controlled outputs 90 of each of the waveguides 54 are combined in an output lens 92 and produce a focused output beam 94, whose direction is controlled by the phase, intensity or phase/intensity inputs supplied via multiplexer 58.

The embodiment of FIG. 3B is identical to that of FIG. 3A other than in that multiplexer 58 (FIG. 2) is not embodied on a separate substrate from that on which the waveguides 54 are formed, as in FIG. 3A. In the embodiment of FIG. 3B, waveguides 54 and sequential multiplexer 58 are both embodied on a single substrate 100 and thus connector pads 80 may be eliminated. The remaining elements of FIG. 3B may be identical to those in FIG. 3A and are indicated by the same reference numerals.

According to an alternative embodiment of the present invention, input and output lenses 74 and 92 may be eliminated. Other types of optical couplers, known in the art, may be employed instead.

Figure 4:
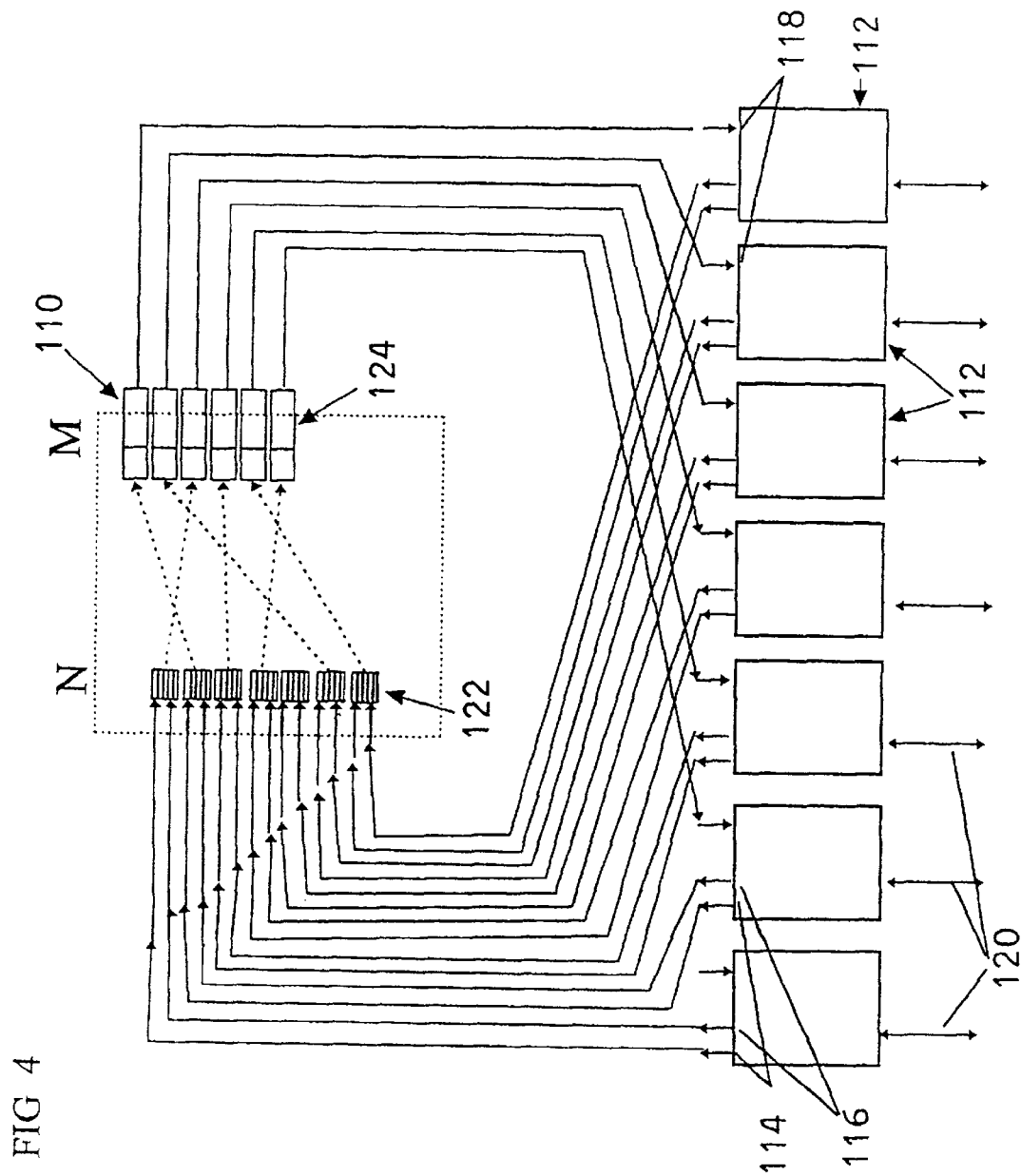
FIG. 4 is a simplified illustration of optical switching apparatus constructed and operative in accordance with a preferred embodiment of the present invention.

Reference is now made to FIG. 4, which is a simplified illustration of optical switching apparatus constructed and operative in accordance with a preferred embodiment of the present invention. The optical switching apparatus preferably comprises an optical interconnect unit 110 which is connected to a multiplicity of ports 112, most or each of which has a data output line 114, an address output line 116 and a data input line 118, as well as a, preferably duplex, information conduit 120 which can be of any suitable form, such as, for example, copper or fiber and which can receive data in any suitable format. Some of the ports 112 may lack a data input line or may lack a data output line and an address output line.

When optical fibers are employed as data output lines 114, it is preferred that polarization maintaining fibers be employed in conjunction with polarized lasers or other polarized light sources. This eliminates polarization sensitivity of the beam deflection.

Preferably clock synchronization is maintained between the input and output portions of each of ports 112 and between the various ports 112.

Figure 5:
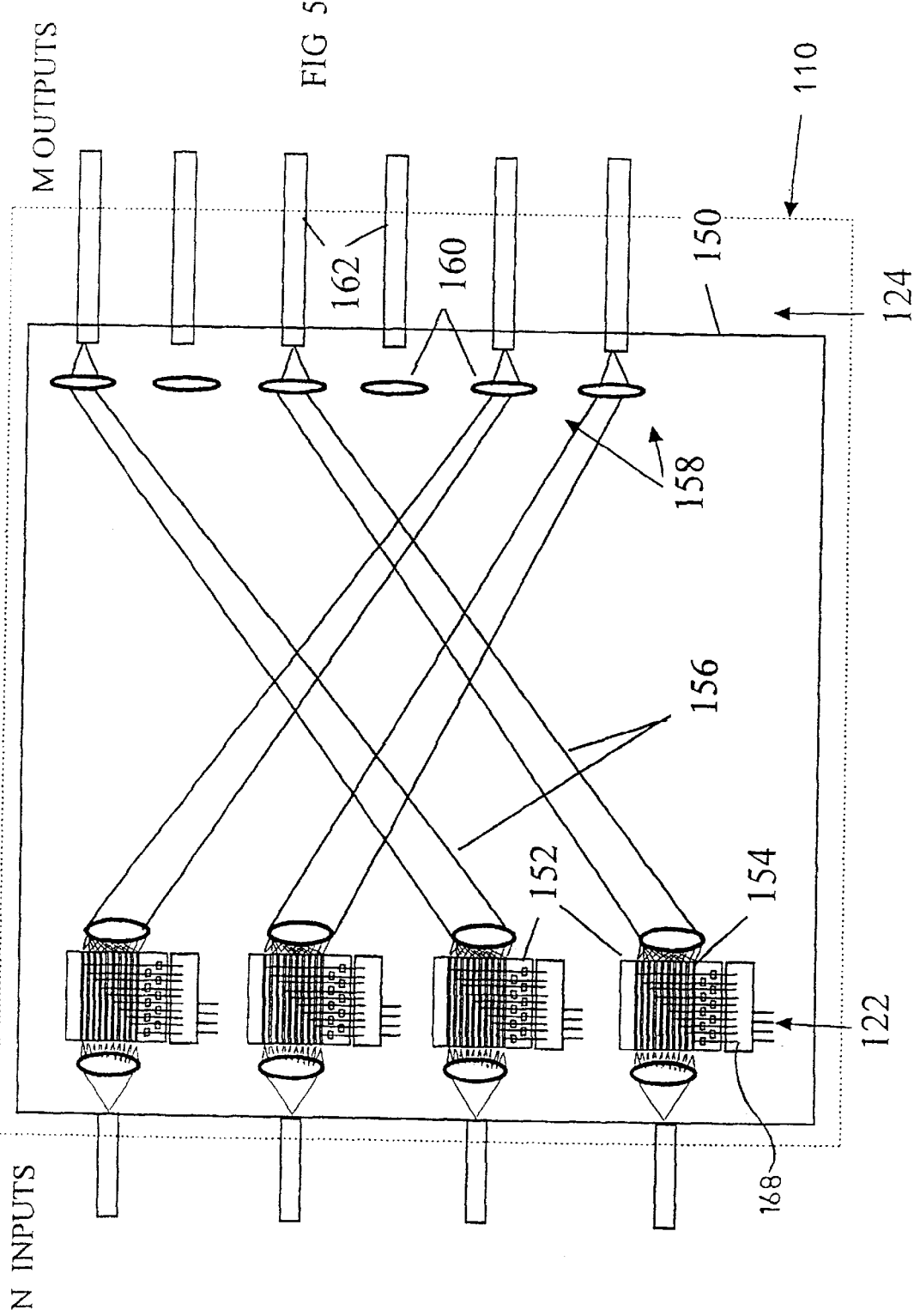
FIG. 5 is a simplified illustration of an optical cross-connect assembly suitable for use in the optical switching apparatus of FIG. 4.

The optical interconnect unit 110, a preferred embodiment of which is illustrated in FIG. 5, comprises a beam deflector assembly array 122 and a beam receiving assembly array 124. Each beam deflector assembly in array 122 receives data and address inputs from a port 112 and each beam receiving assembly in array 124 provides a data input to a port 112.

It is a particular feature of the present invention that the optical interconnect unit 110, as illustrated in FIG. 5, comprises a selectably directable optical beam deflector including a base 150 onto which are mounted a plurality of substrates 152, each having formed thereon a multiplicity of waveguides 154, preferably 256 in number, each waveguide 154 preferably receiving light and emitting light having a selectable phase. The totality of light emitted by the multiplicity of waveguides 154 on each substrate 152 produces a selectably directable output beam 156.

Also preferably mounted on base 150 is the beam receiving assembly array 124. Each beam receiving assembly 158 preferably comprises a beam receiving lens 160 which couples a received beam onto an output fiber 162, which is preferably a flexible fiber. Alternatively, the output fiber 162 may be replaced by a suitable light detector.

It is a particular feature of the present invention that the substrates 152 and the beam receiving assemblies 158 need not be aligned on base 150 to a very high degree of accuracy, inasmuch as the orientations of beams. 156 produced thereby is electronically determined and adjustable, inter alia to take into misalignment into account.

At least one sequential multiplexer 168 applies electrical inputs to each substrate 152 for individually controlling the light emitted by each of the multiplicity of waveguides 154, thereby governing the orientation of the selectably directable output beam 156.

Preferably, the sequential multiplexer 168 is a phase controller which controls the phase of the light emitted by each of the multiplicity of waveguides. Alternatively, multiplexer 168 is an intensity or phase/intensity controller.

Figure 6A:
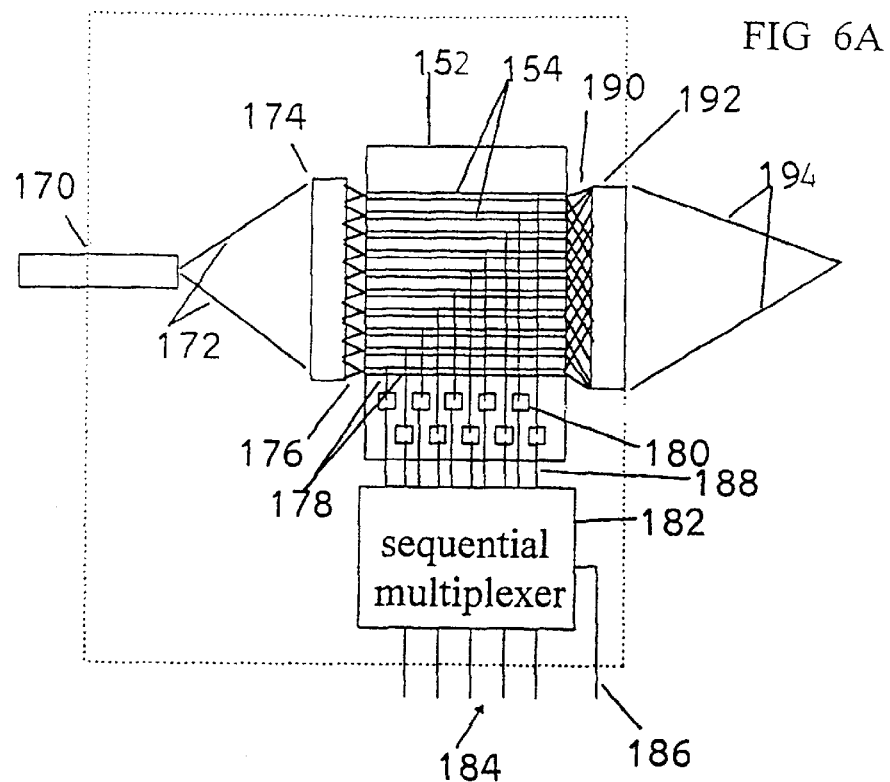
FIGS. 6A and 6B illustrate two alternative embodiments of an integrated optics switching unit forming part of the cross-connect assembly of FIG. 5.
Figure 6B:
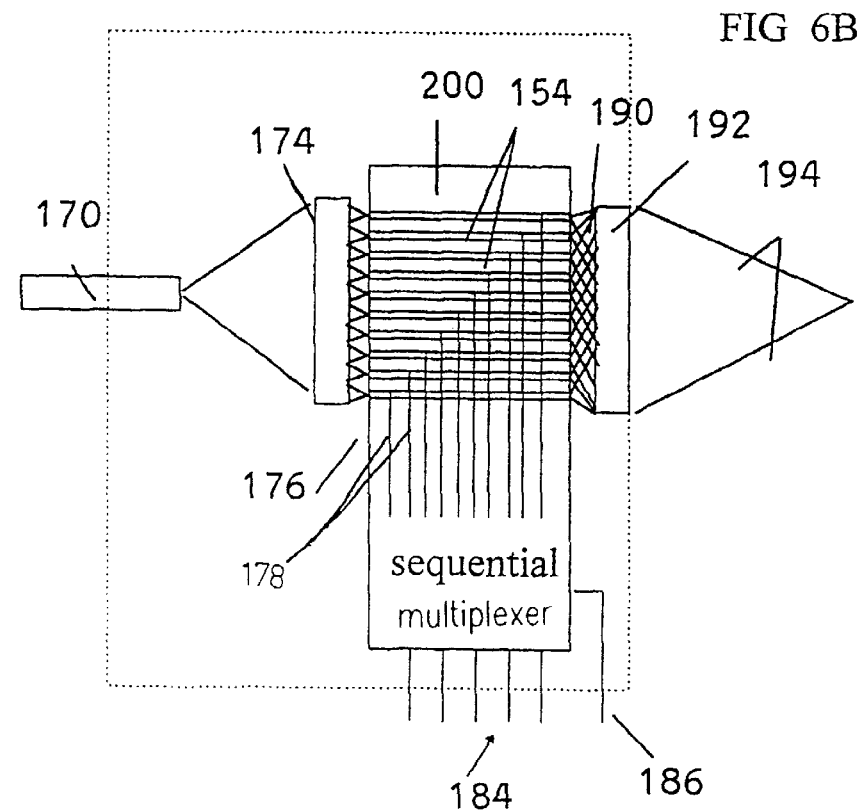

Reference is now made to FIGS. 6A and 6B, which illustrate two alternative embodiments of an integrated optics switching unit forming part of the cross-connect assembly of FIG. 5. In the embodiment of FIG. 6A, an input optical fiber 170 provides a beam 172 which impinges on an input lens assembly 174, a preferred embodiment of which is illustrated in FIG. 7.

The input lens assembly 174 provides a multiplicity of focused beams 176, each of which impinges on one of the waveguides 154 on substrate 152. Each waveguide 154 receives an electrical input via a corresponding conductor 178, which extends from the waveguide to a corresponding connector pad 180 which is also formed on substrate 152. A sequential multiplexer 168 (FIG. 5), formed on a separate substrate 182, receives address information via an address bus 184 and a phase, intensity or phase/intensity input via an input line 186 from control electronics (not shown) and supplies a phase, intensity or phase/intensity control signal to each waveguide 154 via a conductor 188 and a corresponding connector pad 180 and conductor 178.

The phase, intensity or phase/intensity controlled outputs 190 of each of the waveguides 154 are combined in an output lens 192 and produce a focused output beam 194, whose direction is controlled by the phase, intensity or phase/intensity inputs supplied via multiplexer 168.

The embodiment of FIG. 6B is identical to that of FIG. 6A other than in that sequential multiplexer 168 (FIG. 5) is not embodied on a separate substrate from that on which the waveguides 154 are formed, as in FIG. 6A. In the embodiment of FIG. 6B, waveguides 154 and sequential multiplexer 168 are both embodied on a single substrate 200 and thus connector pads 180 may be eliminated. The remaining elements of FIG. 6B may be identical to those in FIG. 6A and are indicated by the same reference numerals.

Figure 8A:
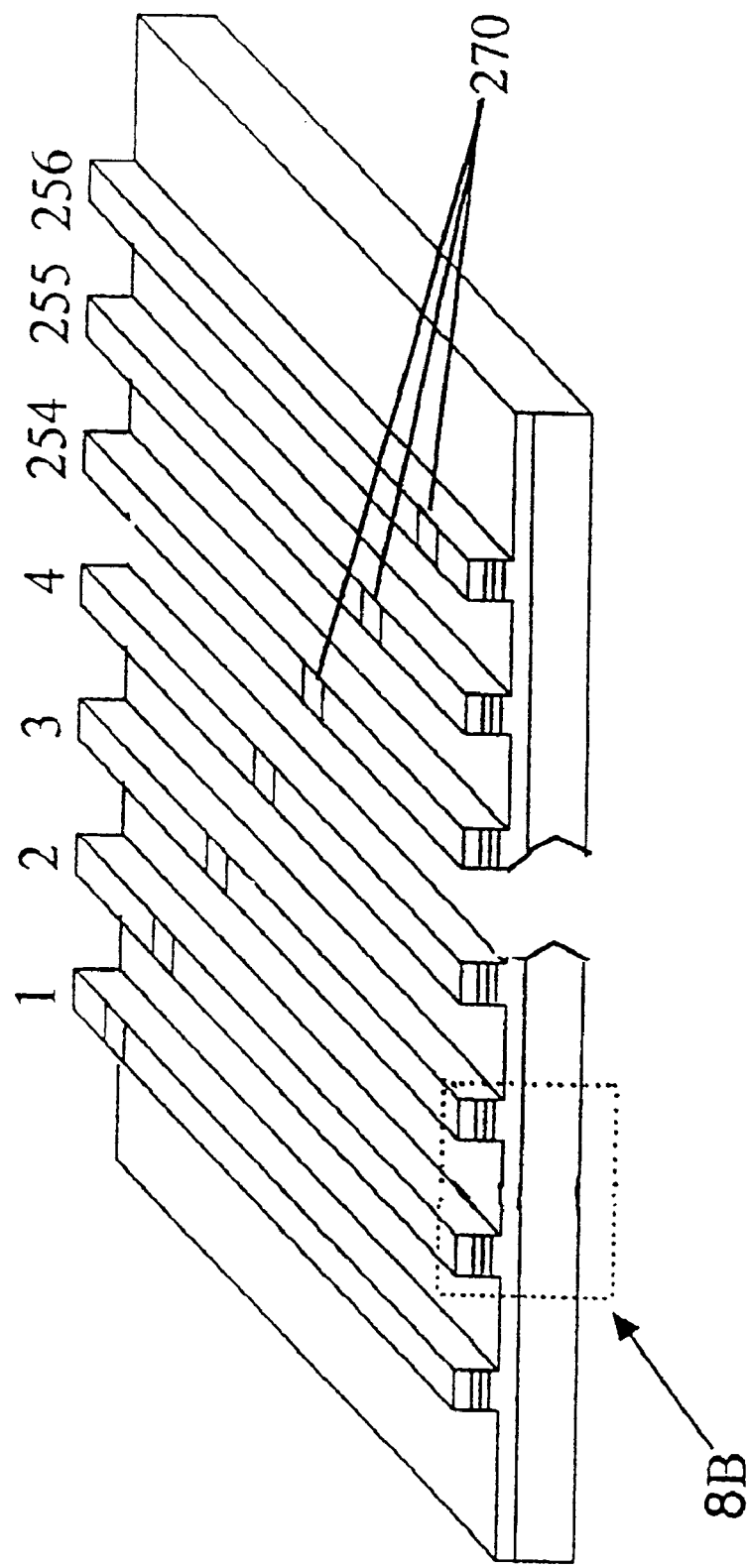
FIGS. 8A and 8B illustrate a waveguide unit useful as part of the integrated optics beam deflection unit of FIG. 7.
Figure 8B:
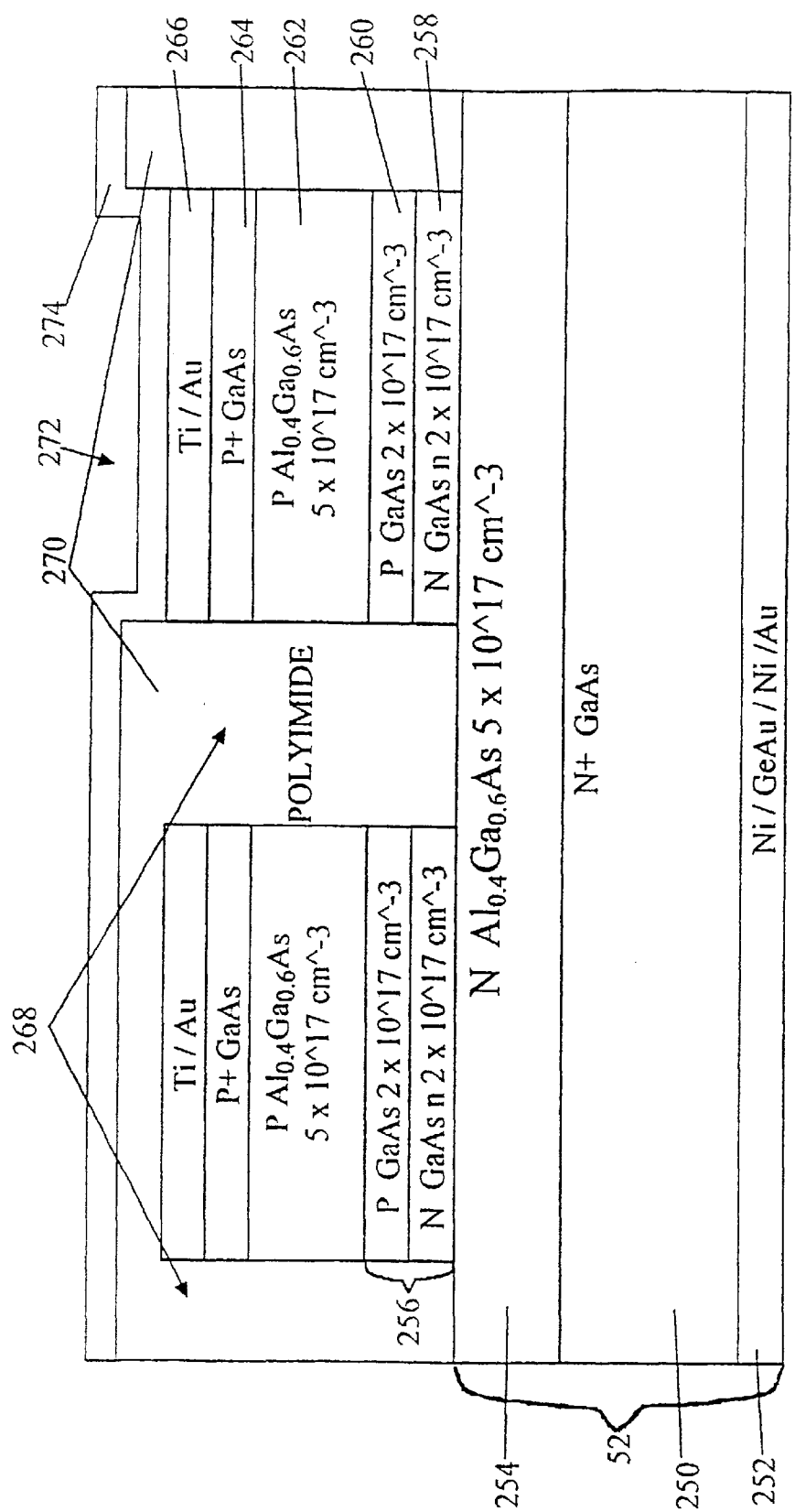

Reference is now made to FIGS. 8A and 8B. FIG. 8A is a perspective illustration of a waveguide unit useful as part of the integrated optics beam deflection unit of FIG. 7, while FIG. 8B is a detailed sectional illustration of a pair of waveguides forming part of the waveguide unit of FIG. 8A. It is seen from a consideration of FIGS. 8A and 8B that substrate 52 (FIGS. 2 & 7) is preferably formed of an N doped GaAs layer 250 having formed on the bottom thereof an N-type ohmic contact 252, typically comprising evaporated Ni/GeAu/Ni/Au. Formed over layer 250 is a cladding layer 254, preferably formed of N doped AlGaAs.

The waveguide 54 is based on layer 254 and includes a core layer 256 comprising a GaAs PN junction defined by an N layer 258 and a P layer 260. A cladding layer 262, preferably formed of P doped AlGaAs, is preferably formed over layer 260. A cap layer 264, preferably formed of P+ doped GaAs, is preferably formed over layer 262.

Along the length of the waveguides there are provided P-type ohmic contacts 266, typically formed of Ti/Au. Adjacent waveguides 54 are separated from each other by etching. The resultant gaps are indicated by reference numeral 268.

A polyimide insulative layer 270 is preferably formed over layer 266, fills gaps 268; and defines intermittent discrete apertures 272. Intermitted strips of a metal layer 274 are formed over the polyimide insulative layer 270 and contact the ohmic contacts 266 through discrete apertures 272 in the polyimide layer 270. The intermittent strips provide individual mutually insulated electrical pathways communicating with each of the waveguides 54 separately. These pathways are designated by reference numeral 78 in FIGS. 3A and 3B and by reference numeral 178 in FIGS. 6A and 6B.

It is appreciated that the depth of gaps 268 defined by etching may vary such that layers 250, 254, 258 and 260 may or may not be etched to define gaps and waveguides. It is to be appreciated that waveguides 54 may also be provided by any other suitable technique, such as, for example, ion implantation.

Waveguide structures of this general type are described in the following publication, and the references cited therein, the disclosures of which are hereby incorporated by reference:

J. G. Mendoza-Alvarez et al, Analysis of Depletion Edge Translation Lightwave Modulators, IEEE Journal of Lightwave Technology Vol. 6, No. 6, June 1988, pp. 793–808.

Reference is now made to FIGS. 9A, 9B, 9C and 9D, which are graphs illustrating a simulation of the far-field diffraction and interference pattern produced by an optical beam deflector constructed and operative in accordance with a preferred embodiment of the present invention for different applied voltages. The simulation is for an optical beam deflector which includes 256 waveguides having a pitch between adjacent waveguides of 9 microns. The width of each waveguide is 3 microns and the wavelength of the light passing through the deflector is 1.3 microns.

FIGS. 9A, 9B, 9C and 9D illustrate the far-field diffraction and interference patterns for phase shifts between adjacent waveguides of 0; $\pi/2$; $\pi$; and $3\pi/2$, respectively.

It can be seen from a consideration of FIGS. 9A–9D that the relative phase of each of the waveguides determines the angular location of given lobes of the interference pattern, while the diffraction pattern defines an intensity envelope which does not vary with phase but causes different angular locations to have different intensities.

It is a particular feature of the present invention that the ratio between the angular width of each of the lobes and the angular separation between adjacent lobes is very substantial, due to the fact that the invention enables a very large number of waveguides (typically 256) to be formed on a substrate and individually operated.

This high ratio enables a correspondingly high level of resolution to be realized in various applications, such as scanning and switching, providing a high number of individually addressable scanning and switching locations.

It may also be appreciated by persons skilled in the art that the peak signal to background ratio is very high due to large number of waveguides employed.

Figure 10:
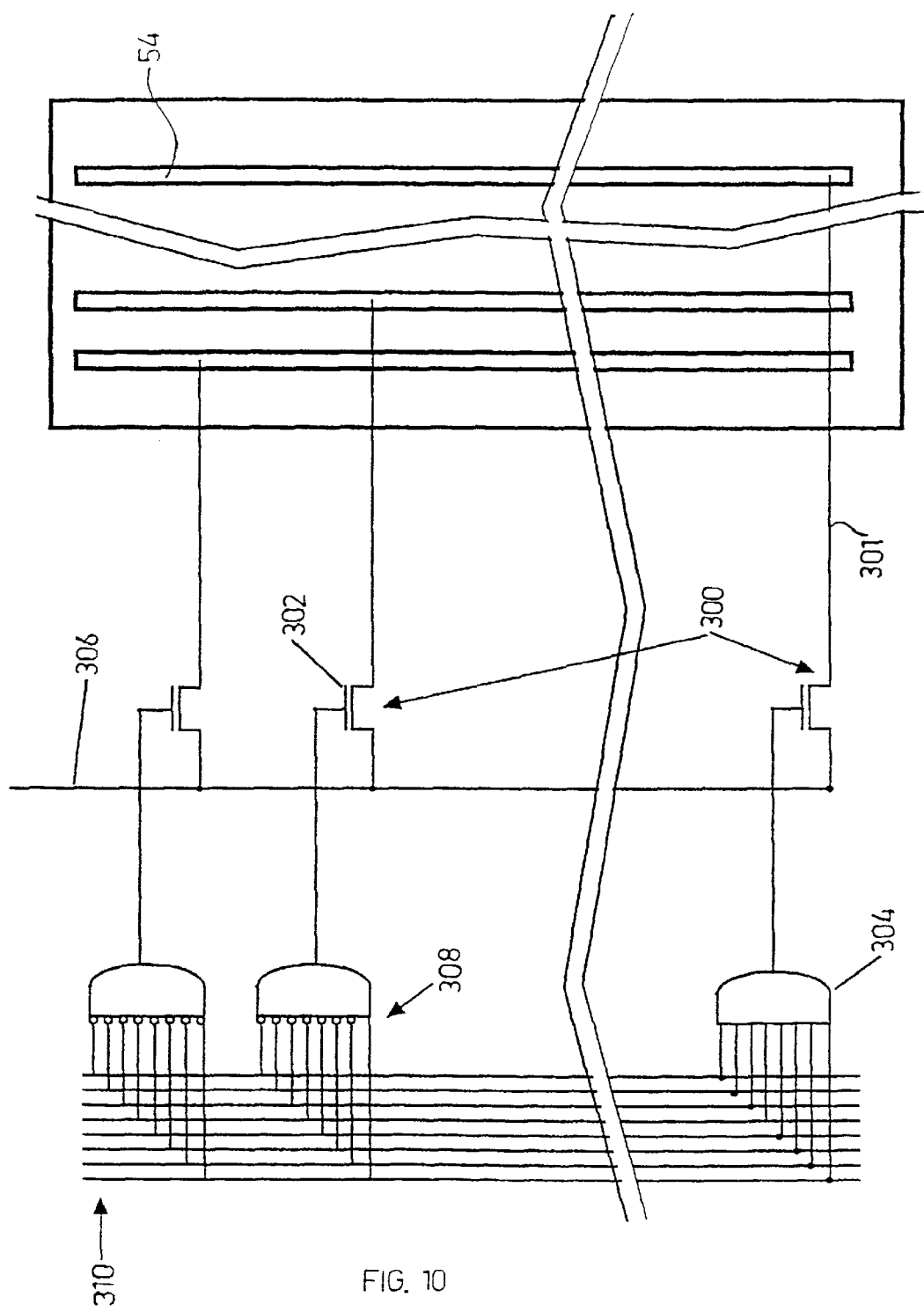
FIG. 10 is a simplified illustration of a multiplexer providing sequential voltage inputs to multiple waveguides forming part of a beam deflection unit in accordance with a preferred embodiment of the present invention.

Reference is now made to FIG. 10 which is an illustration of an optical multiplexer providing sequential voltage inputs to multiple waveguides forming part of a beam deflection unit in accordance with a preferred embodiment of the present invention.

As seen in FIG. 10, each waveguide 54 intermittently receives an electrical input via an electrical pathway, such as pathway 78 (FIGS. 3A and 3B) or 178 (FIGS. 6A and 6B). The electrical input is preferably supplied from the drain 301 of a FET transistor 300 whose gate 302 is coupled to the output of an AND gate 304. The source of each FET transistor 300 receives a phase, intensity or phase/intensity input from an analog voltage line 306, identified by reference numeral 86 in FIGS. 3A and 3B and by reference numeral 186 in FIGS. 6A and 6B.

Each AND gate 304 receives a plurality of digital address inputs via NOT gates 308 from an address bus 310, which is identified by reference numeral 84 in FIGS. 3A and 3B and by reference numeral 184 in FIGS. 6A and 6B. Each AND gate 304 is differently configured such that every available combination of address inputs causes a different single AND gate to provide an electrical output to a corresponding gate of a corresponding FET transistor 300.

It is a particular feature of the present invention that the multiplexer sequentially provides individual phase, intensity or phase/intensity inputs to the individual waveguides, using digital address coding, thus enabling a very large number of waveguides to be individually addressed.

Figure 11:
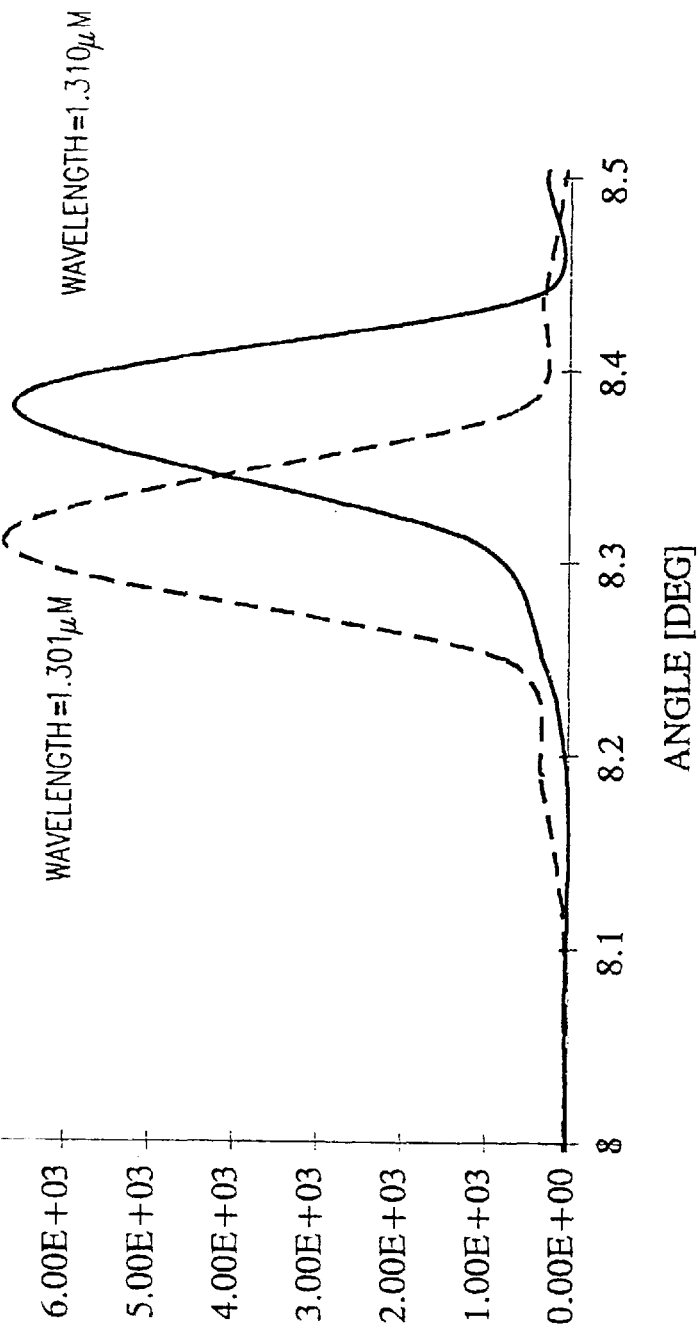
FIG. 11 is a graph illustrating the wavelength dependency of the angular location of diffraction produced in accordance with a preferred embodiment of the present invention.

Reference is now made to FIG. 11, which illustrates the wavelength dependency of the angular location of the diffraction orders. This wavelength dependency may be employed advantageously in accordance with a preferred embodiment of the present invention to provide wavelength division multiplexing (WDM). In this manner multiple information channels may be sent over a single physical fiber by transmitting each channel along a separate wavelength.

Figure 12:
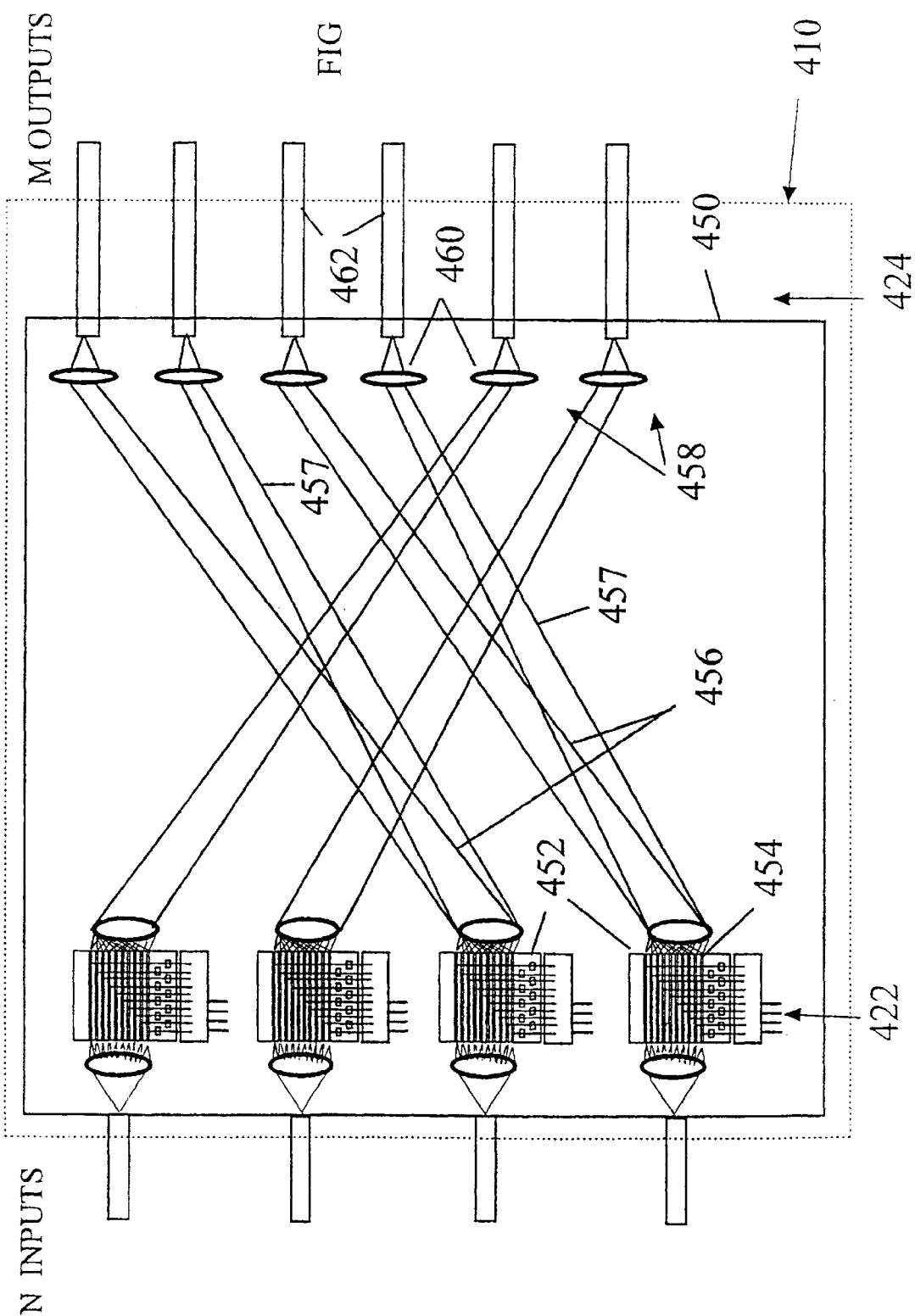
FIG. 12 is a simplified illustration of wave division multiplexing apparatus constructed and operative in accordance with a preferred embodiment of the present invention.

Reference is now made to FIG. 12, which illustrates wavelength division multiplexing apparatus constructed and operative in accordance with a preferred embodiment of the present invention.

The wavelength division multiplexing apparatus 410 preferably comprises a beam diffractor assembly array 422 and a beam receiving assembly array 424. Each beam diffractor assembly in array 422 receives data and address inputs from a port and produces a light beam having multiple wavelength components and each beam receiving assembly in array 424 provides a data input to a port.

It is a particular feature of the present invention that the wavelength division multiplexing unit 410, as illustrated in FIG. 12, comprises an optical beam diffractor, which preferably also operates as a selectably directable optical beam deflector and includes a base 450 onto which are mounted a plurality of substrates 452, each having formed thereon a multiplicity of waveguides 454, preferably 256 in number, each waveguide 454 preferably receiving light and emitting fight in a plurality of beams according to their wavelength. The totality of light emitted by the multiplicity of waveguides 454 on each substrate 452 preferably produces a plurality of selectably directable output beams, here indicated as beams 456 and 457.

Also preferably mounted on base 450 is the beam receiving assembly array 424. Each beam receiving assembly 458 preferably comprises a beam receiving lens 460 which couples a received beam onto an output fiber 462, which is preferably a flexible fiber. Alternatively, the output fiber 462 may be replaced by a suitable light detector. Each beam receiving assembly preferably receives a beam of a different wavelength.

It is a particular feature of the present invention that the substrates 452 and the beam receiving assemblies 458 need not be aligned on base 450 to a very high degree of accuracy, inasmuch as the orientations of beams 456 produced thereby is electronically determined and adjustable, inter alia to take into misalignment into account.

Figure 13:
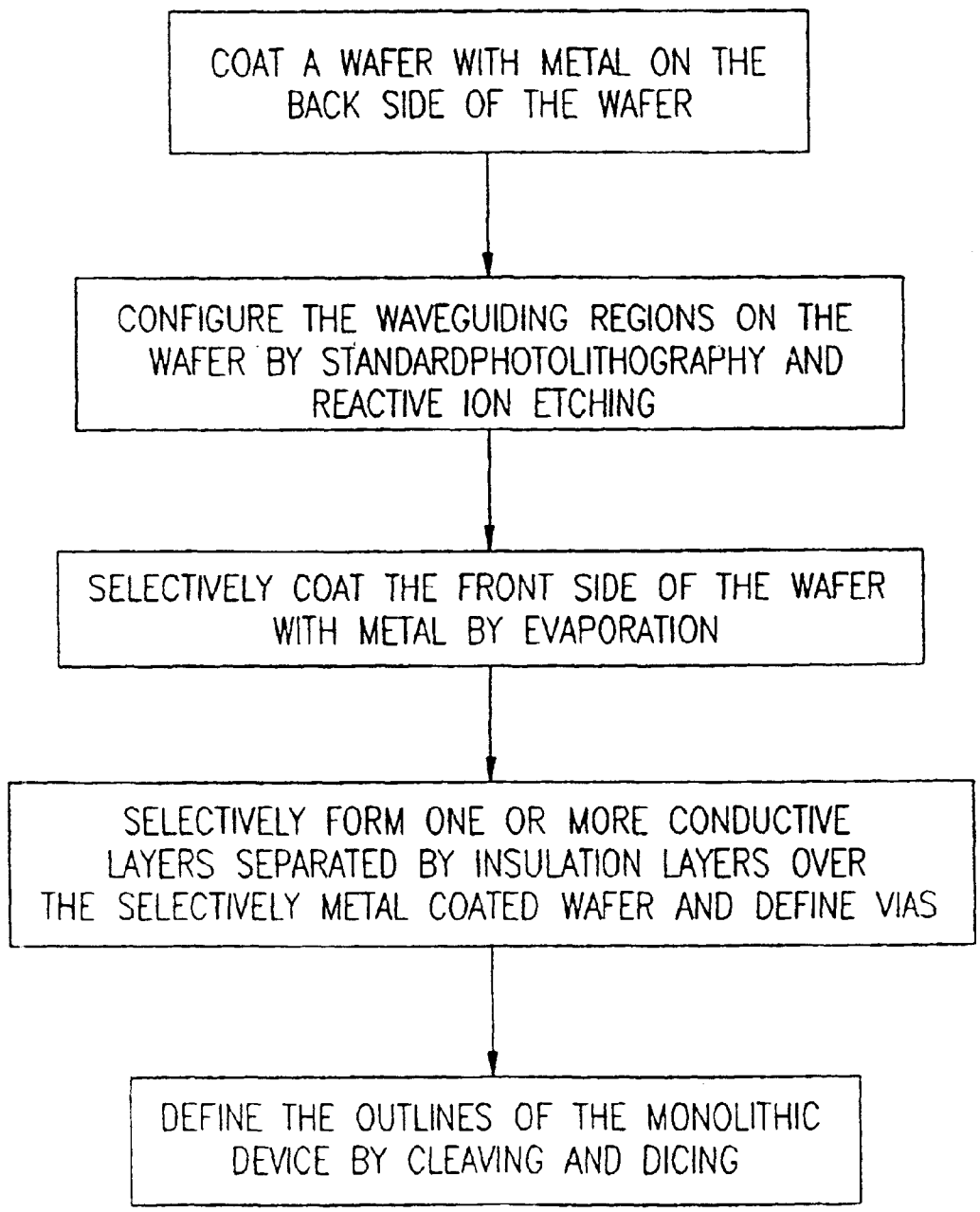
FIG. 13 is a simplified flowchart illustrating the manufacture of a waveguide device in accordance with a preferred embodiment of the present invention.
Figure 14A:
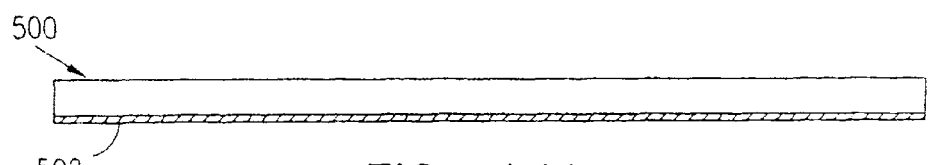
FIGS. 14A, 14B, 14C, 14D and 14E are illustrations of various stages in the manufacture of the waveguide device in accordance with the steps set forth in FIG. 13.

Reference is now made to FIG. 13, which is a simplified flowchart illustrating the manufacture of a waveguide device of the type shown in FIG. 8B, in accordance with a preferred embodiment of the present invention. As indicated in FIG. 13 a multi-layer gallium arsenide wafer, such as that illustrated in FIG. 8B and including layers 250, 254, 258, 260, 262 and 264, is coated with metal to provide a layer such as layer 252 (FIG. 8B). This initial stage is illustrated in FIG. 14A, wherein the wafer is designated by reference numeral 500 and the metal layer is illustrated by reference numeral 502.

Figure 14B:
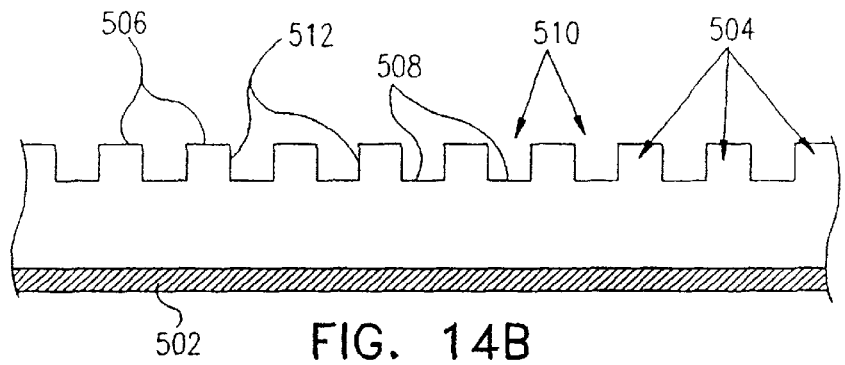

The waveguiding regions of the waver, e.g. layers 258, 260, 262 and 264 (FIG. 8B) are configured preferably by standard photolithography and reactive ion etching. This stage is illustrated in FIG. 14B, where the waveguiding regions are indicated by reference numeral 504.

Figure 14C:
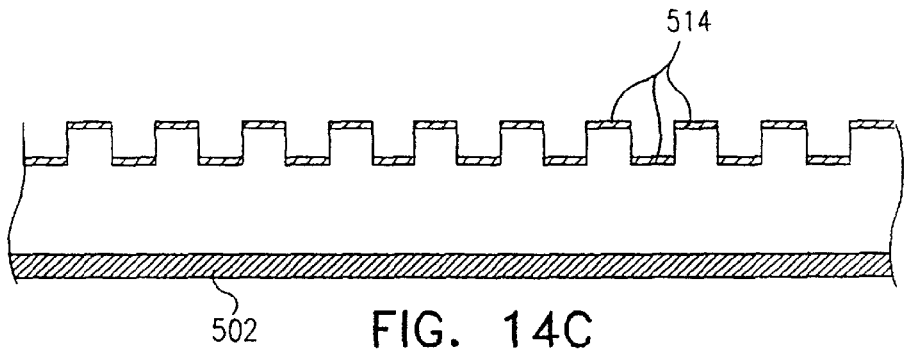

It is a particular feature of the invention that the front side of the wafer, i.e. the top surfaces 506 of waveguiding regions 504 and the top surfaces 508 of the recesses 510 therebetween, is selectively coated with metal by evaporation in a direction generally perpendicular thereto, the direction being selected with respect to interconnecting surfaces 512 which interconnect the upper and lower surfaces 506 and 508 respectively such that metal is not substantially coated onto the interconnecting surfaces 512, whereby electrical connections between the upper and lower surfaces 506 and 508 via the interconnecting surfaces 512 are not formed by the metal coating. The metal layer, which is designated by reference numeral 266 in FIG. 8B, is indicated by reference numeral 514 in FIG. 14C.

Figure 14D:
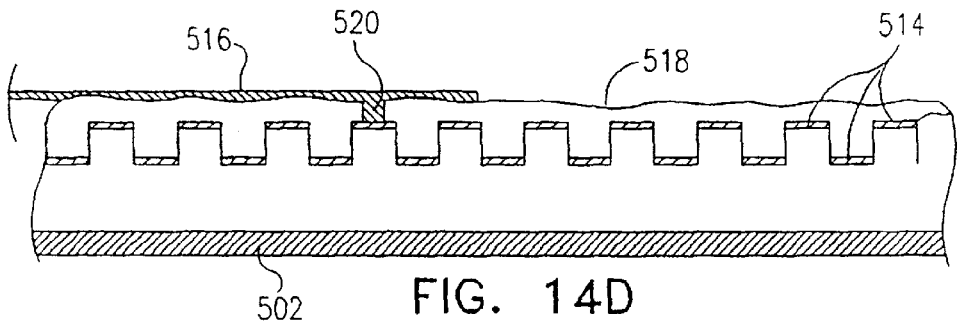
Figure 14E:
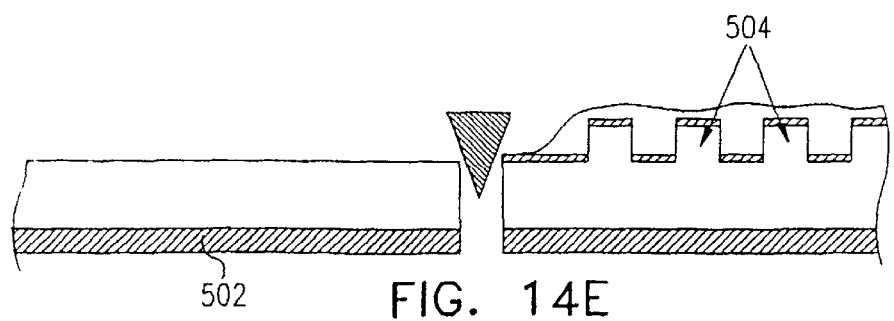

Following formation of 514 by evaporation as aforesaid, one or more conductive layers, separated from each other and from metal layer 514 by insulative layers, are preferably provided. A conductive layer is indicated in FIG. 8B by reference numeral 274 and in FIG. 14D by reference numeral 516 and an insulative layer is indicated in FIG. 8B by reference numeral 270 and in FIG. 14D by reference number 518. Vias 520 are preferably provided to interconnect conductive layers, such as layer 516, with layer 514 through insulative layer 518. As seen in FIG. 14E, the outlines of the monolithic device may then be defined by cleaving and dicing.

Figure 15:
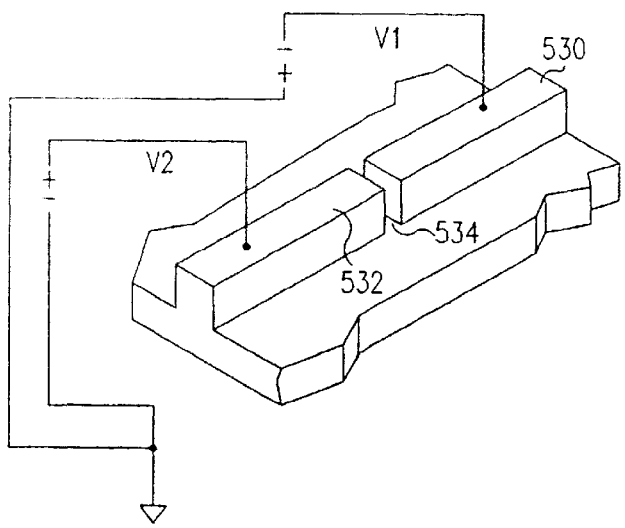
FIG. 15 is a simplified illustration of a polarization-independent waveguide constructed and operative in accordance with a preferred embodiment of the present invention.

Reference is now made to FIG. 15, which is a simplified illustration of a polarization-independent waveguide constructed and operative in accordance with a preferred embodiment of the present invention. The waveguide of FIG. 15 is characterized in that it is formed of at least two elongate portions 530 and 532, separated by a gap 534. Gap 534 is preferably smaller than the wavelength of the light guided by the waveguide. A DC voltage V1 of a first polarity is applied to elongate portion 530, while a DC voltage V2 of a second polarity, opposite to the first polarity, is applied to elongate portion 532. Gap 534 need not be a cut or other physical separation, but may be only an electrical or conductive separation.

It is known that the presence of an electric field in a gallium arsenide waveguide changes the phase of light passing through the waveguide. The resulting change in phase differs with the polarization of the light, whereby for a given electric field light of one polarization, such as light in a TE mode is phase shifted more than light of polarization perpendicular thereto, such as light in a TM mode.

Figures 16A, 16B:
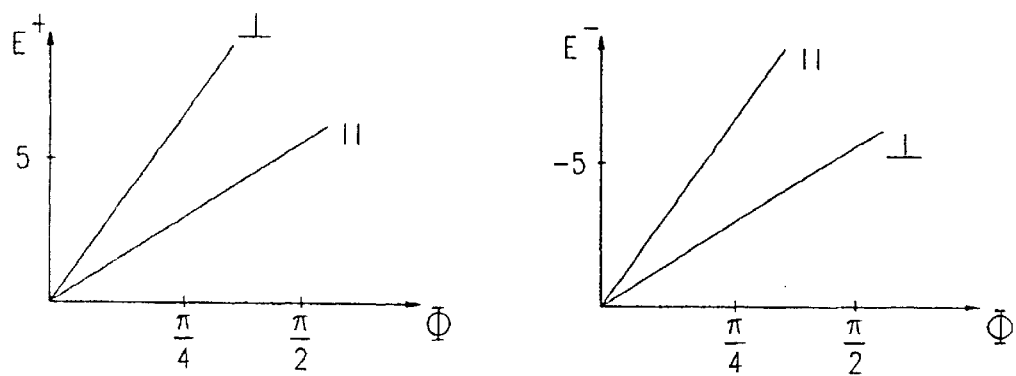
FIGS. 16A, 16B and 16C are illustrations of the operational parameters of the waveguide of FIG. 15.

It has been appreciated by the present inventors that by switching the direction of the electric field, the effect thereof on light in the TE and TM modes is reversed. This can be seen from a consideration of FIGS. 16A and 16B, which illustrate the phase shifts produced in mutually perpendicularly polarized light by electric fields of opposite polarity.

Thus, if an electric field in a first direction causes a greater phase change for light in a TE mode than for light in a TM mode, an electric field in a second direction, opposite to the first direction, causes a greater phase change for light in a TM mode than for light in a TE mode.

Figure 16C:
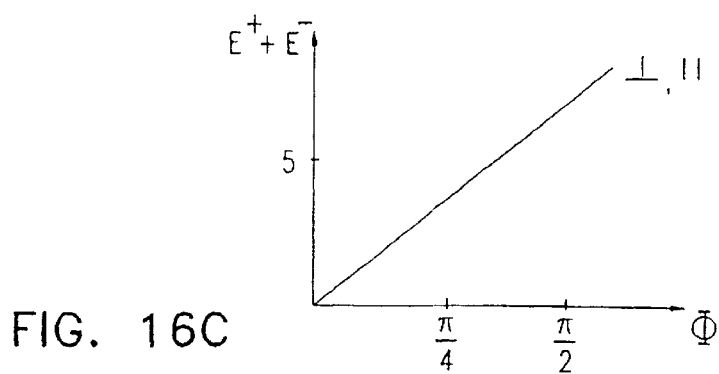

Accordingly, by first applying an electric field in a first direction to light guided along the waveguide and then applying an electric field in a second direction, opposite to the first direction, to that light, the effect of polarization on the phase change of the light is neutralized. This is visualized in FIG. 16C.

It is appreciated that the two electrical fields need not necessarily be opposite in order to neutralize the effect of polarization as aforesaid. The desired neutralization may be realized empirically even with electric fields which are not opposite.

Figure 17:
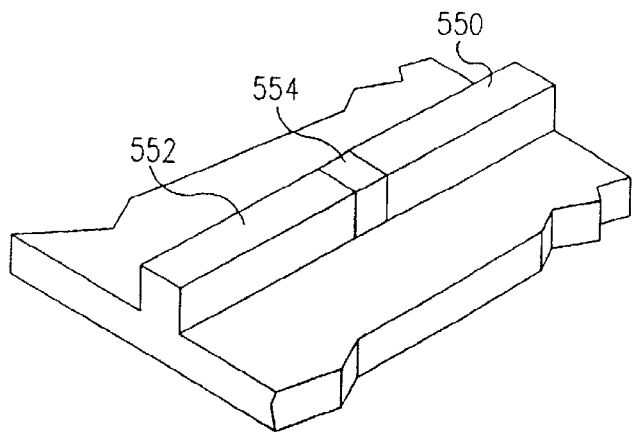
FIG. 17 is a simplified illustration of a polarization-independent waveguide constructed and operative in accordance with another preferred embodiment of the present invention.

Reference is now made to FIG. 17, which is a simplified illustration of a polarization-independent waveguide constructed and operative in accordance with another preferred embodiment of the present invention. The waveguide of FIG. 17 is characterized in that it is formed of two elongate portions 550 and 552 of identical length, separated by a quarter wave plate 554. The quarter wave plate is operative to rotate the polarization direction of light guided along the waveguide by 90 degrees, therefore shifting the TM component to a TE component and vice versa.

Thus light traveling along the entire waveguide has the same phase change irrespective of its polarization upon entry to the waveguide.

Figure 18:
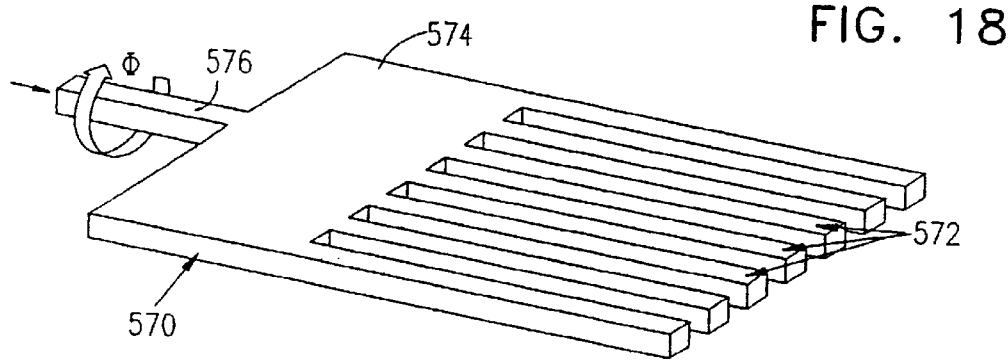
FIG. 18 is a simplified illustration of a polarization-independent waveguide constructed and operative in accordance with yet another preferred embodiment of the present invention.

Reference is now made to FIG. 18, which is a simplified illustration of a poiization-independent waveguide constructed and operative in accordance with yet another preferred embodiment of the present invention. In this embodiment, there is provided a selectably directable optical beam deflecting device comprising a substrate 570 having formed thereon a multiplicity of electrically controlled, phase-shifting waveguides 572, such as waveguides of the type described hereinabove with reference to FIGS. 8A and 8B.

In accordance with a preferred embodiment of the present invention there is also formed on substrate 570 a light receiver 574 for directing light into the multiplicity of waveguides 572. Preferably, the light receiver comprises a selectable polarization rotator 576. In accordance with a preferred embodiment of the present invention, the selectable polarization rotator is automatically operative to rotate the polarization so as to provide an optimized light output from the multiplicity of waveguides.

Preferably, the selectable polarization rotator is responsive to an output of the multiplicity of waveguides. Alternatively, the selectable polarization rotator is responsive to the polarization of an input to the multiplicity of waveguides.

The selectable polarization rotator is preferably embodied in a gallium arsenide voltage controlled waveguide, which may be constructed in a manner similar or identical to that described hereinabove.

Figure 19:
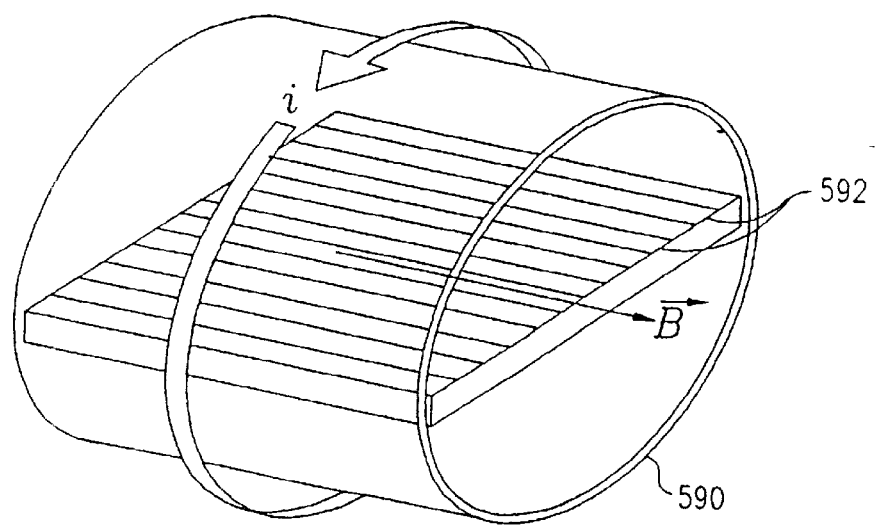
FIG. 19 is a simplified illustration of a polarzation-independent waveguide constructed and operative in accordance with still another preferred embodiment of the present invention.

Reference is now made to FIG. 19, which is a simplified illustration of a polarization-independent waveguide constructed and operative in accordance with still another preferred embodiment of the present invention. This embodiment is characterized in that a polarization rotator 590 rotates the polarization of light passing through a multiplicity of electrically controlled, phase-shifting waveguides 592 by 90 degrees. Preferably, the polarization rotator 590 comprises a magnetic field source pro-ducing a magnetic field B, whose axis lies parallel to the longitudinal axes of the waveguides 592. The magnetic field B is typically produced by the flow of an electric current i, as shown in FIG. 19.

In this way, light guided along the waveguide has its polarization shifted by 90 degrees, therefore shifting the TM component to a TE component and vice versa.

Thus light traveling along the entire waveguide has the same phase change irrespective of its polarization upon entry to the waveguide.

As in the embodiment of FIG. 18, in accordance with a preferred embodiment of the present invention the selectable polarization rotator 590 is automatically operative to rotate the polarization so as to provide an optimized light output from the multiplicity of waveguides 592.

Preferably, the selectable polarization rotator 590 is responsive to an output of the multiplicity of waveguides 592. Alternatively, the selectable polarization rotator 590 is responsive to the polarization of an input to the multiplicity of waveguides 592.

Figure 20:
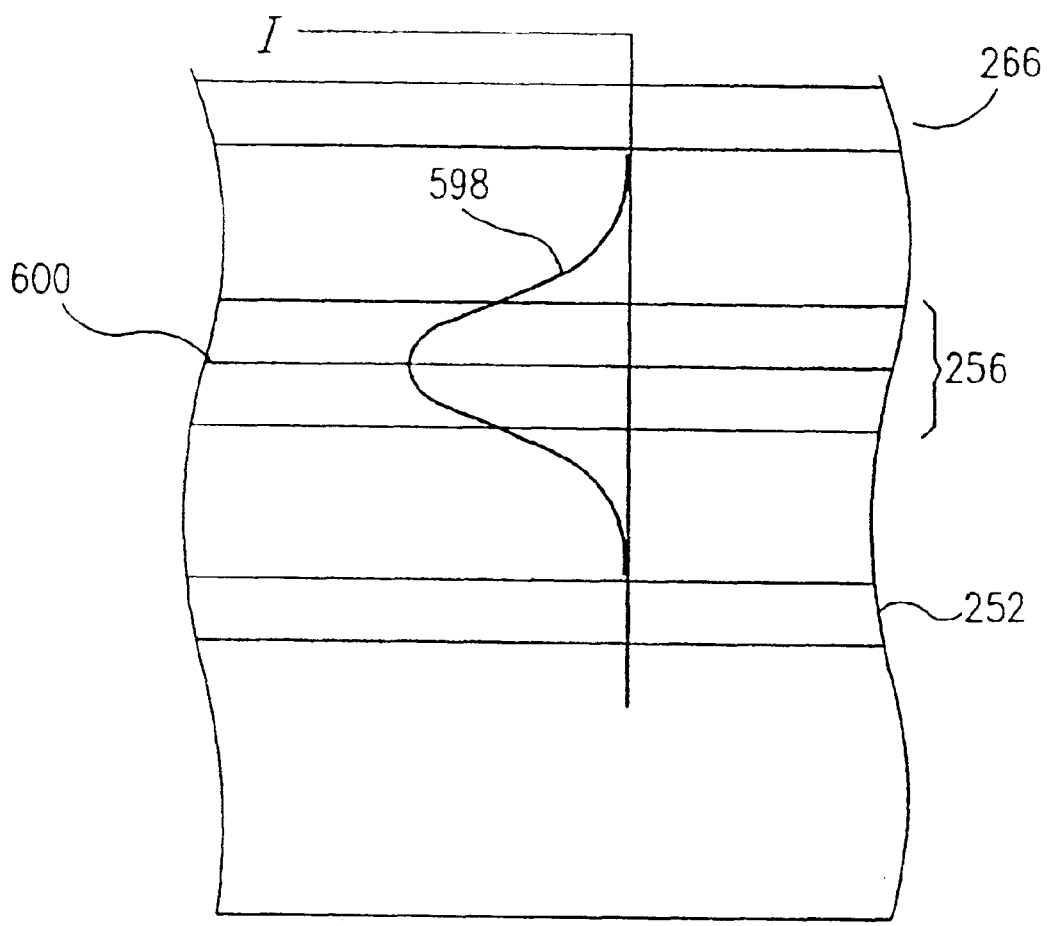
FIG. 20 is a simplified illustration of an optimal waveguide structure for a given wavelength in accordance with a preferred embodiment of the present invention.

Reference is now made to FIG. 20, which is a simplified illustration of an optimal waveguide structure for a given wavelength in accordance with a preferred embodiment of the present invention. FIG. 20 illustrates an optimal distribution of light in the waveguide of FIG. 8B. The light intensity is illustrated by trace 598. Preferably, the waveguide is constructed such that most of the light is confined in layers 256 (FIG. 8B). Little or no light is to be allowed in conductive layers 266 and 252. Techniques for confining light in layers 256 are well known in the art and need not be described herein.

It is additionally preferred that a P-N junction 600 be defined in layers 256 as indicated in FIG. 8B.

Figure 21:
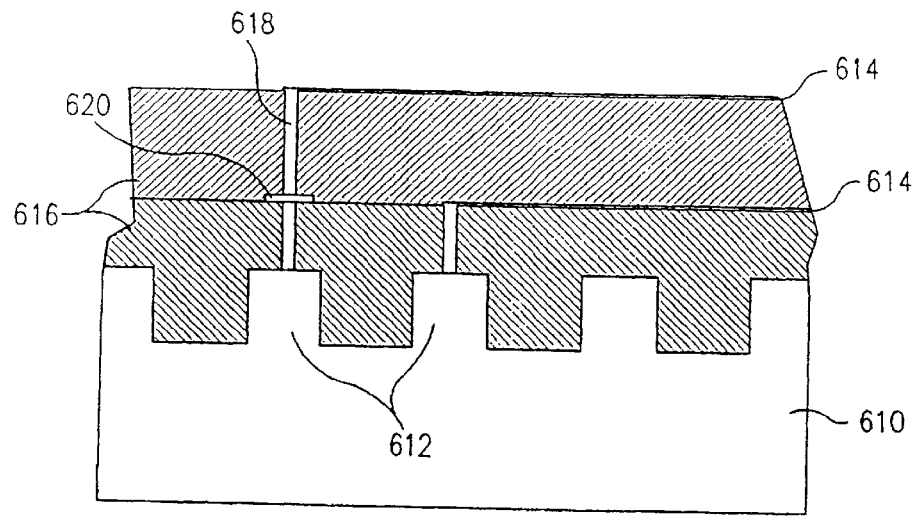
FIG. 21 is a simplified illustration of part of a waveguide device having multiple conductors constructed and operative in accordance with a preferred embodiment of the present invention.

Reference is now made to FIG. 21, which is a simplified illustration of part of a waveguide device having multiple conductors constructed and operative in accordance with a preferred embodiment of the present invention. In the embodiment of FIG. 21, there is provided a substrate 610 having formed thereon a multiplicity of phase-shifting waveguides 612. A light receiver (not shown) directs light into the multiplicity of waveguides The substrate 610 comprises multiple mutually insulated conductor layers 614, which are insulated by insulative layers 616 and are connected to said waveguides by vias 618. Vias 618 are constructed layer by layer and are interconnected via pads 620.

Figure 22:
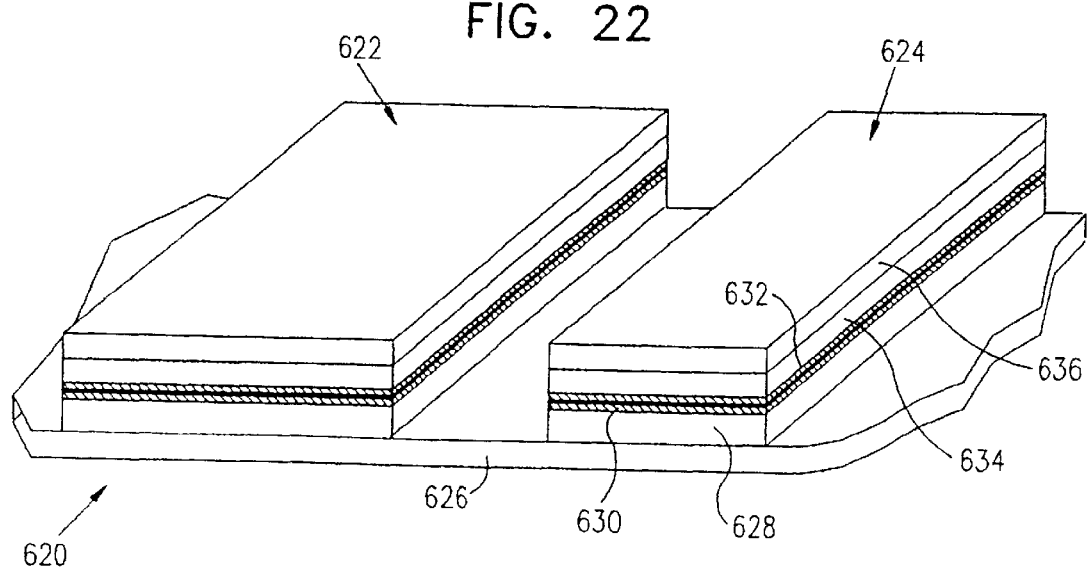
FIG. 22 is a simplified illustration of a monolithic laser and waveguide structure constructed and operative in accordance with a preferred embodiment of the present invention.

Reference is now made to FIG. 22, which is a simplified illustration of part of a monolithic laser and waveguide structure constructed and operative in accordance with a preferred embodiment of the present invention. Such monolithic structure are believed to be novel. The structure of FIG. 22 preferably comprises a substrate 620 having formed thereon a multiplicity of waveguides 622, of which only one is shown, and a laser 624, monolithically formed on the substrate 620 and providing light to the multiplicity of waveguides 622.

The laser 624 preferably is constructed in accordance with the foregoing description of FIG. 8B and includes:
  an N-doped gallium arsenide substrate 626;
  an N-doped aluminum gallium arsenide layer 628 formed over substrate 626;
  an N-doped gallium arsenide layer 630 formed over the N-doped aluminum gallium arsenide layer 628;

a P-doped gallium arsenide layer 632 formed over the N-doped gallium arsenide layer 630;

a P-doped aluminum gallium arsenide layer 634 formed over the P-doped gallium arsenide layer 632; and a P-doped gallium arsenide layer 636 formed over the P-doped aluminum gallium arsenide layer 634.

It is a particular feature of the present invention that the fact that the waveguide structure of FIG. 8B can be operated as a light source, enables greatly enhanced ease of alignment of the waveguide with respect to external optics, since the waveguide can produce a beam of light during alignment thereof.

Figure 23:
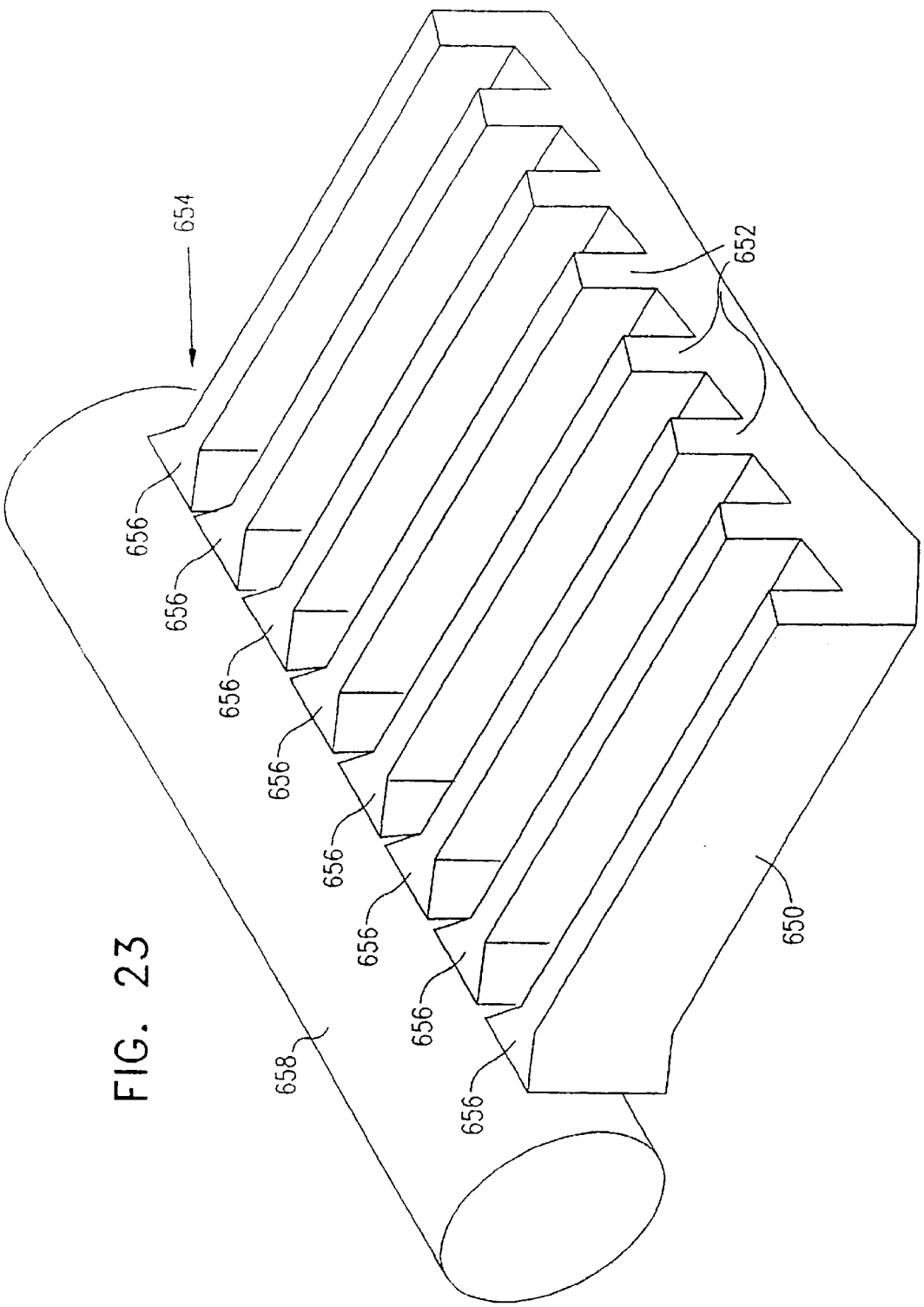
FIG. 23 is a simplified illustration of part of a waveguide device having tapered inputs.

Reference is now made to FIG. 23, which is a simplified illustration of part of a waveguide device having tapered inputs. The structure of FIG. 23 can be used as part of a selectably directable optical beam deflecting device and includes a substrate 650 having formed thereon a multiplicity of waveguides 652 and a light receiver 654 directing light into the multiplicity of waveguides at first ends thereof. The structure is characterized particularly in that the multiplicity of waveguides 652 are outwardly tapered at said first ends thereof 656 at which light enters the waveguides. Preferably, the light receiver employs a cylindrical lens 658. It is appreciated that the structure of FIG. 23 may be used as a light output structure and not only as a light input structure.

Figure 24:
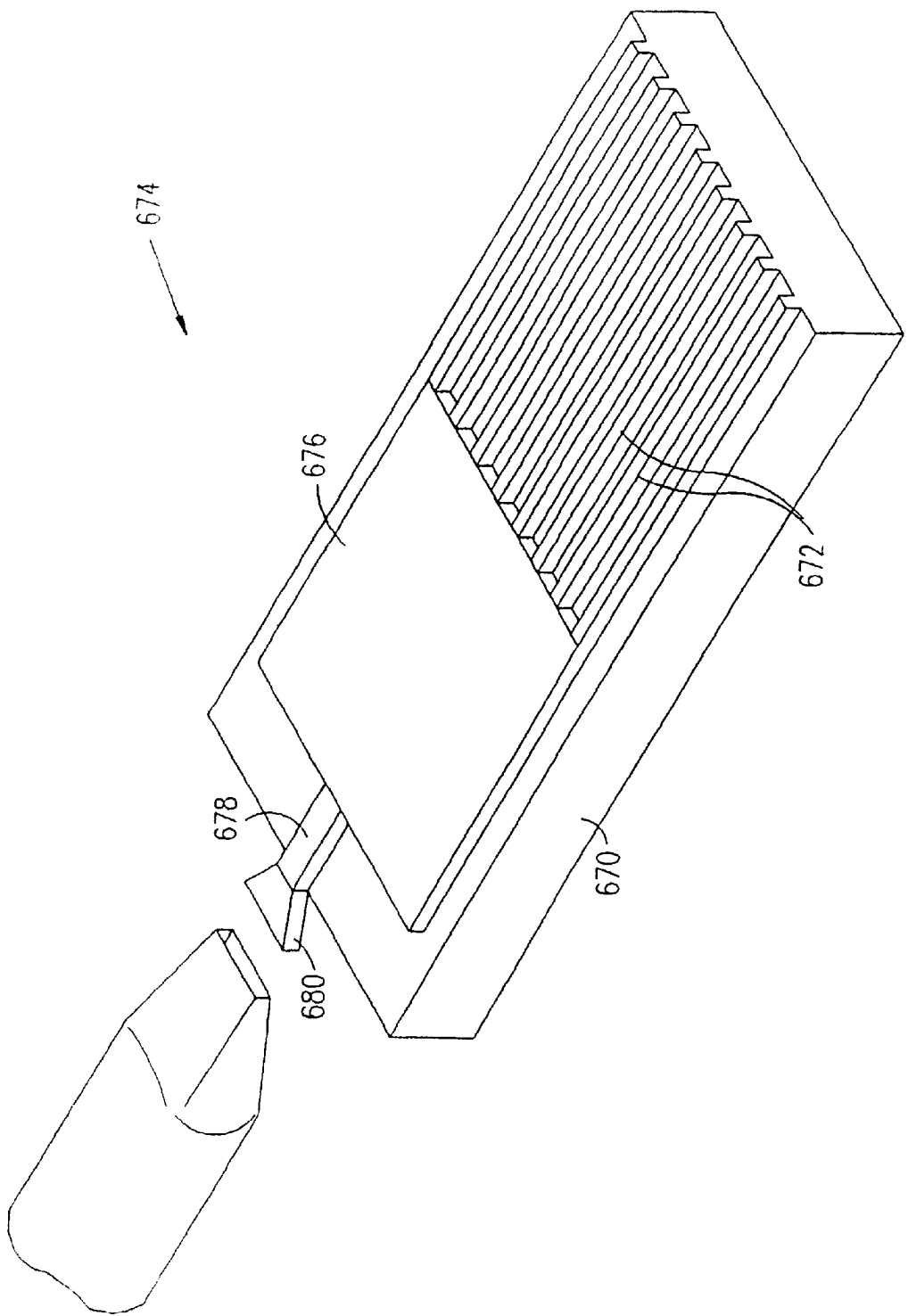
FIG. 24 is a simplified illustration of a waveguide device having a multi-mode interference coupler including a tapered input waveguide.

Reference is now made to FIG. 24, which is a simplified illustration of a waveguide device having a multi-mode interference coupler including a tapered input waveguide. The structure of FIG. 24 is an alternative to the structure of FIG. 23 and includes a substrate 670 having formed thereon a multiplicity of waveguides 672. Here a light receiver 674 comprising a multi-mode interference coupler 676 directs light into the multiplicity of waveguides 672.

Preferably, the multi-mode interference coupler comprises a light receiving waveguide 678 which includes a light receiving end 680 which may be outwardly tapered. Light which is received at light receiving end 680 is typically coupled from an optical fiber 682. The optical fiber 682 has preferably a matching output end 683 for coupling to the receiving end 680.

Figure 25:
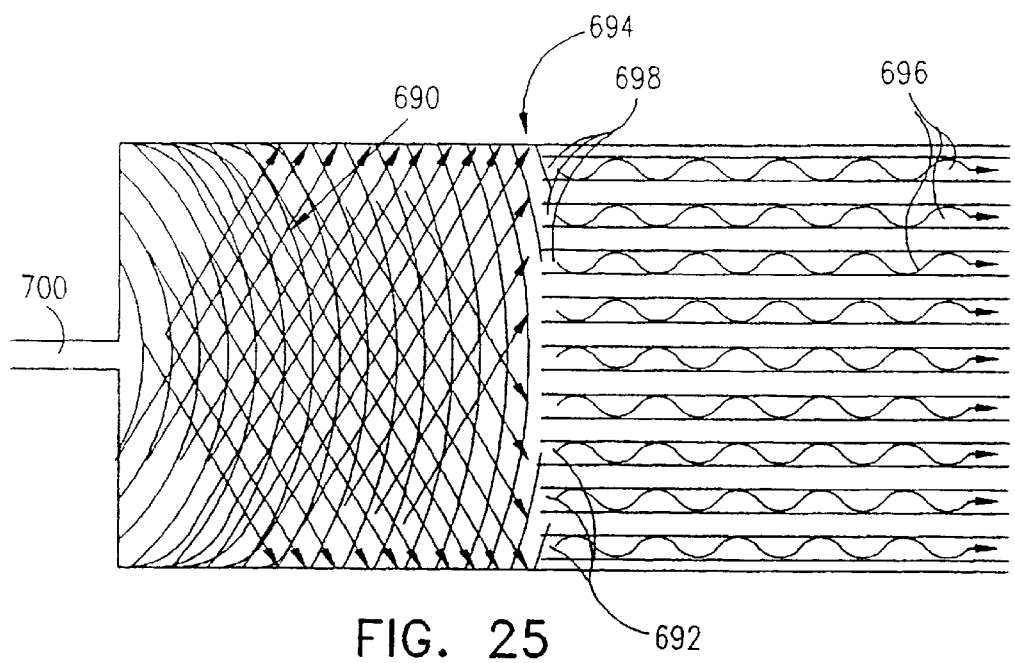
FIG. 25 is a simplified illustration of wave propagation in a waveguide device having a multi-mode interference coupler.

Reference is now made to FIG. 25, which is a simplified illustration of wave propagation in a waveguide device of the type shown in FIG. 24, having a multi-mode interference coupler. It is seen that in the multi-mode interference coupler, designated by reference numeral 690, the waves interfere both constructive and destructively. By suitably selecting the dimensions of the multi-mode interference coupler 690, as well known in the art, it can be ensured that constructive interference takes place at a number of locations 692 at the interface 694 between the multi-mode interference coupler and the waveguide.

In accordance with a preferred embodiment of the present invention the waveguides 696 are constructed such that their entrances 698 are aligned with locations 692, thereby maximizing the coupling efficiency between the multi-mode interference coupler 690 and the waveguides 696.

In accordance with a preferred embodiment of the present invention, the input waveguide 700 to the multi-mode interference coupler 690 may be operative as an electro-absorption modulator, the functionality of which is well-known in the art.

Figure 26:
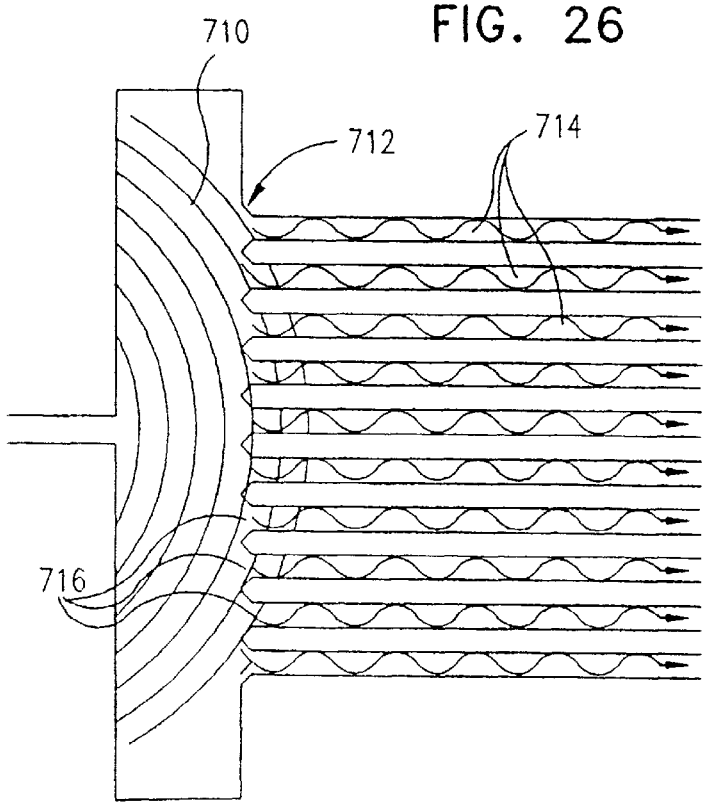
FIG. 26 is a simplified illustration of wave propagation in a waveguide device having a free-space input coupler.

Reference is now made to FIG. 26, which is a simplified illustration of wave propagation in a waveguide device having a free-space input coupler 710. The waveguide device may be identical to that of FIGS. 24 and 25 in structure and function other than in that the dimensions of the free-space input coupler 710 are not such that interference occurs therewithin. Rather the light propagates freely therethrough as shown to the interface 712 with waveguides 714. In accordance with a preferred embodiment of the present invention, the entrance 716 of each waveguide 714 is outwardly tapered, so as to enhance coupling efficiency.

Figure 27:
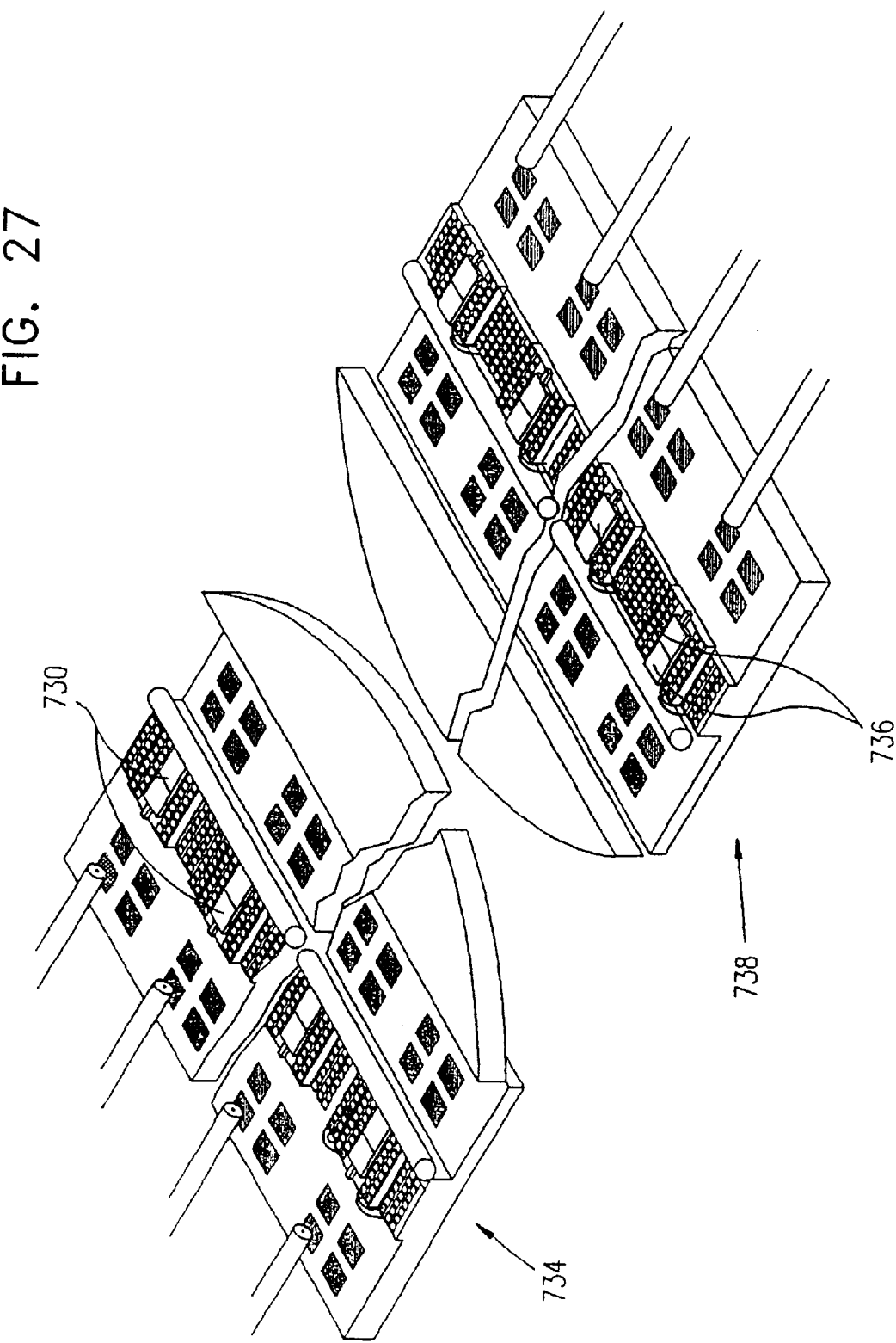
FIG. 27 is a simplified illustration of an optical cross-connect assembly constructed and operative in accordance with a preferred embodiment of the present invention.

As seen in FIG. 27, the waveguide devices described hereinabove with reference to FIGS. 23, 24, 25 and 26 may be employed in optical switches both as selectably directable optical beam deflection devices 730 at the input end 734 and as selectably directable receiving devices 736 at the output end 738.

Figure 28:
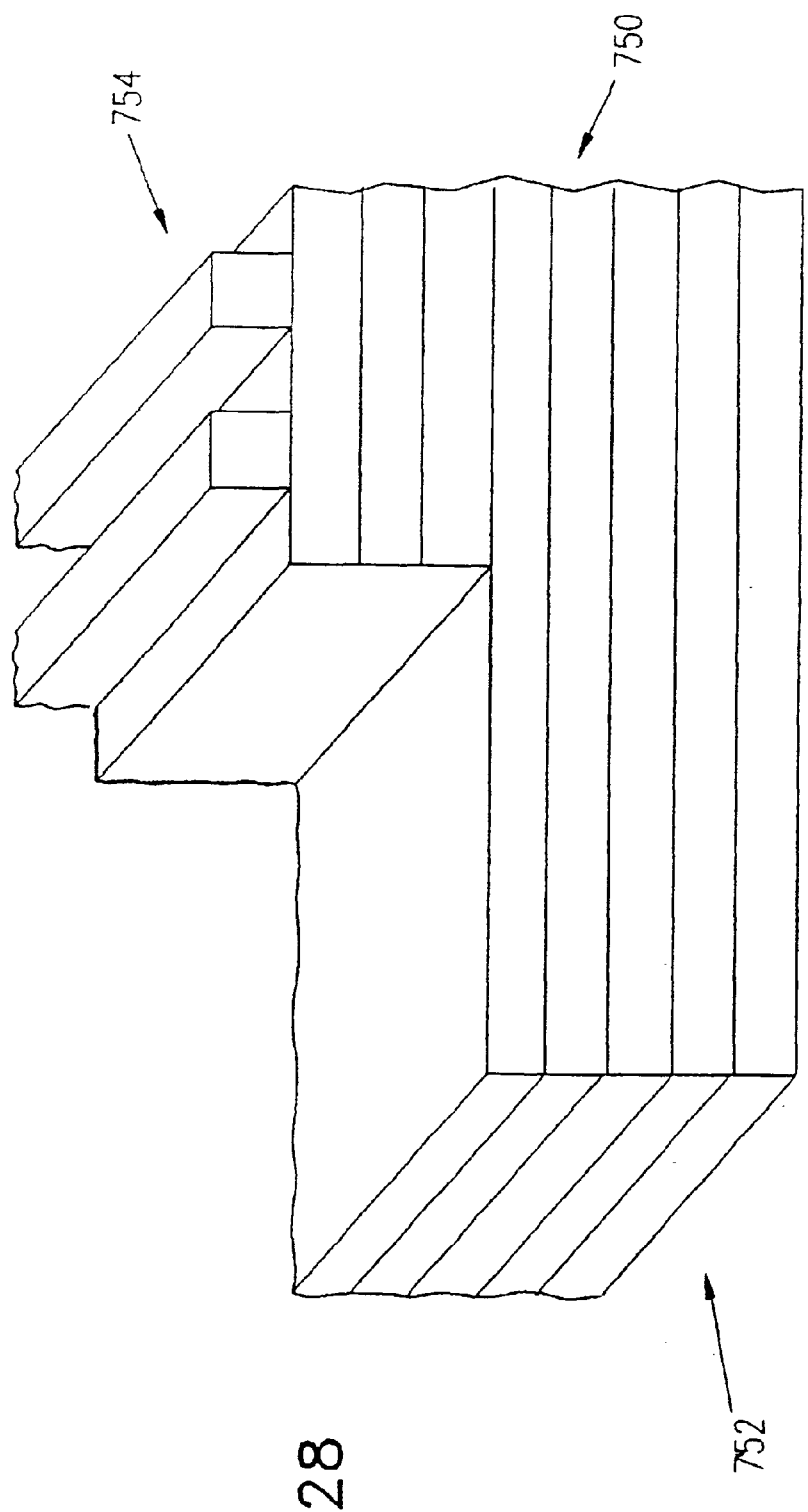
FIG. 28 is a simplified illustration of a monolithic device having both electronic and optical functionality.

Reference is now made to FIG. 28, which is a simplified illustration of a monolithic device having both electronic and optical functionality. The embodiment of FIG. 28 provides an active optical beam transmission device comprising at least one substrate 750 having formed thereon a multiple layer integrated electronic circuit 752 and a multiplicity of electrically controlled waveguides 754.

In accordance with a preferred embodiment of the present invention, the waveguides 754 emit a selectably directable beam of light or selectably receive a beam of light.

Reference is now made to FIG. 29, which is a simplified illustration of part of an optical switch including a monolithic plurality of selectably directable optical beam deflecting devices 760 in accordance with one preferred embodiment of the present invention. It is thus appreciated that in the embodiment of FIG. 29 all of the devices 760 are formed on a single substrate 762. Each of devices 760 may be substantially identical to the devices described hereinabove with reference to either of FIGS. 23 and 24.

In the embodiment of FIG. 29, the electronic connection pads 764 are located adjacent each individual device 760.

FIG. 30 is a simplified illustration of part of an optical switch including a monolithic plurality of selectably directable optical beam deflecting devices in accordance with another preferred embodiment of the present invention. It is similar to the embodiment of FIG. 29 other than in that the electronic connection pads 774 for all of the selectably directable optical beam deflecting devices 776 are all located adjacent the edges 778 of the common substrate 780.

Reference is now made to FIG. 31, which is a simplified illustration of part of an optical switch including a monolithic plurality of selectably directable optical beam deflecting devices in accordance with yet another preferred embodiment of the present invention. Here, the electrical connection pads 794 are formed over part of the selectably directable optical beam deflecting waveguide devices 796.

Figure 32:
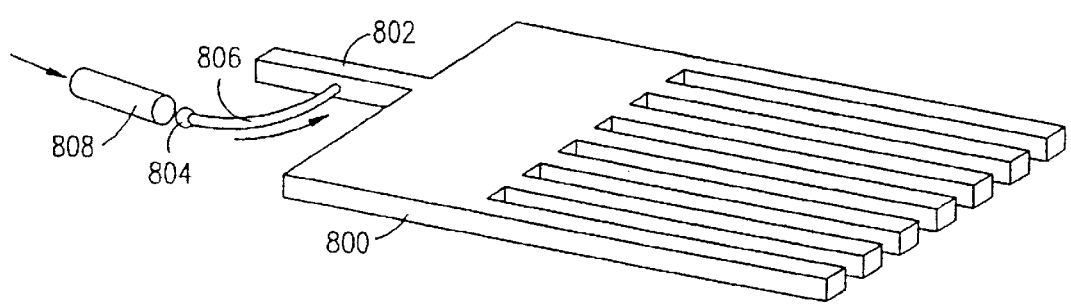
FIG. 32 is a simplified illustration of a waveguide device having a light coupler including a modulator associated with an input waveguide.

Reference is now made to FIG. 32, which is a simplified illustration of a waveguide device having a light coupler 800, of the type described hereinabove with reference to any of FIGS. 24–26 including an input waveguide 802 functioning as an electro-absorption modulator. The embodiment of FIG. 32 also includes a light detector 804 providing a modulating output 806 to the electro-absorption modulator waveguide 802. Preferably, the light detector 804 receives a light input from an information carrying modulated light source 808.

The electro-absorption modulator waveguide 802 of FIG. 32 may serve as an electro-absorption modulator in the embodiments of FIGS. 24–26. The light detector 804 is preferably monolithically formed together with the electro-absorption modulator waveguide 802 on the same substrate.

Figure 33:
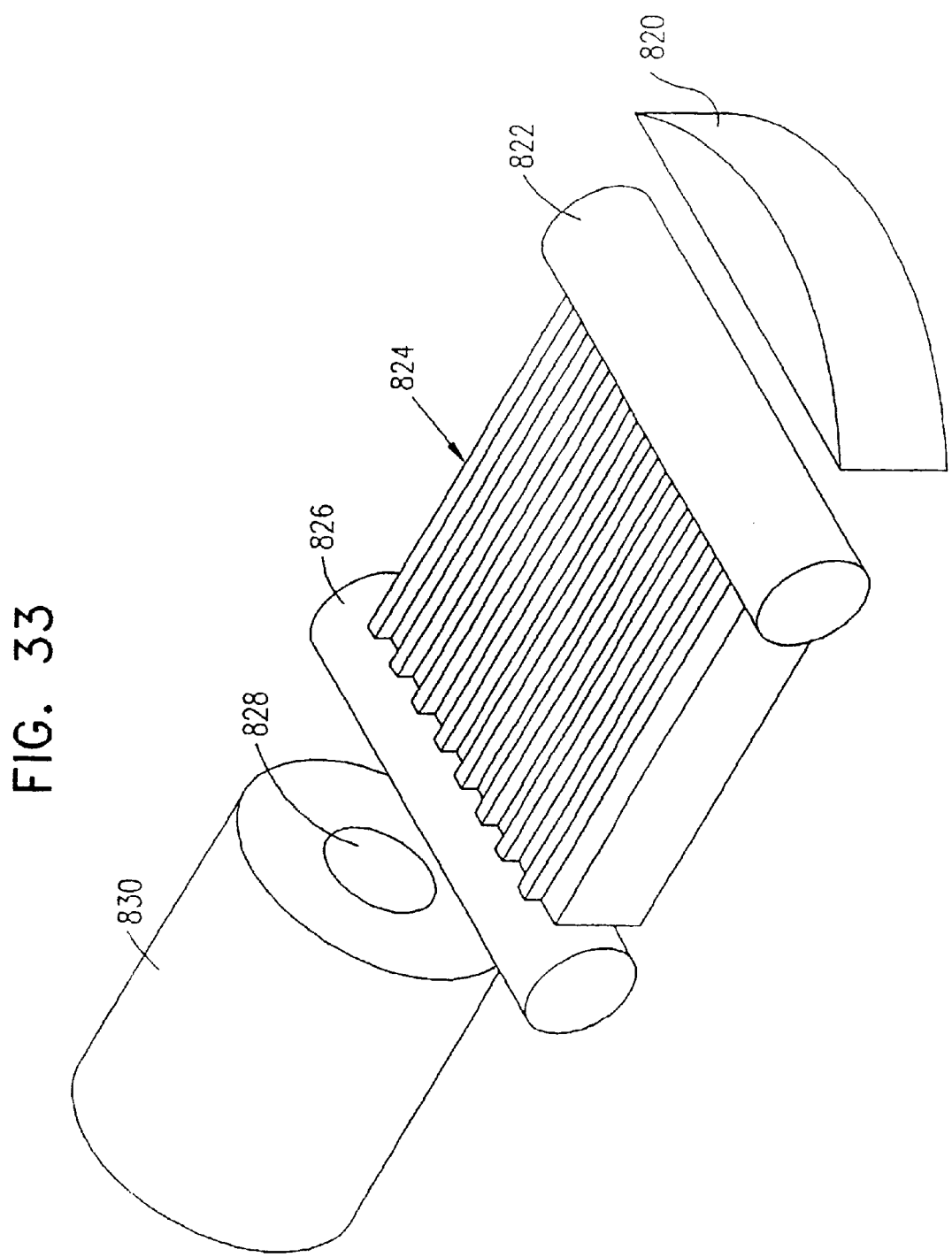
FIG. 33 is a simplified illustration of a beam deflector including a waveguide structure in accordance with a preferred embodiment of the present invention.

Reference is now made to FIG. 33, which is a simplified illustration of a beam deflector including a waveguide structure in accordance with a preferred embodiment of the present invention. The beam deflector of FIG. 33 is characterized in that it includes a spherical output lens 820 which receives light from a cylindrical lens 822. Cylindrical lens 822 is optically coupled to a multiplicity of waveguides 824 and is operative to direct the light received from waveguides 824 in a direction perpendicular to the plane of waveguides 824. The spherical output lens 820 focuses the light received from the cylindrical lens 822.

Similarly to the structure described above with reference to FIG. 23, the waveguides 824 receive light from a cylindrical lens 826 which, in turn, receives light from the end 828 of an optical fiber 830. Alternatively, the input structure of the waveguides 824 may be similar to that described above with reference to FIG. 24.

Figure 34:
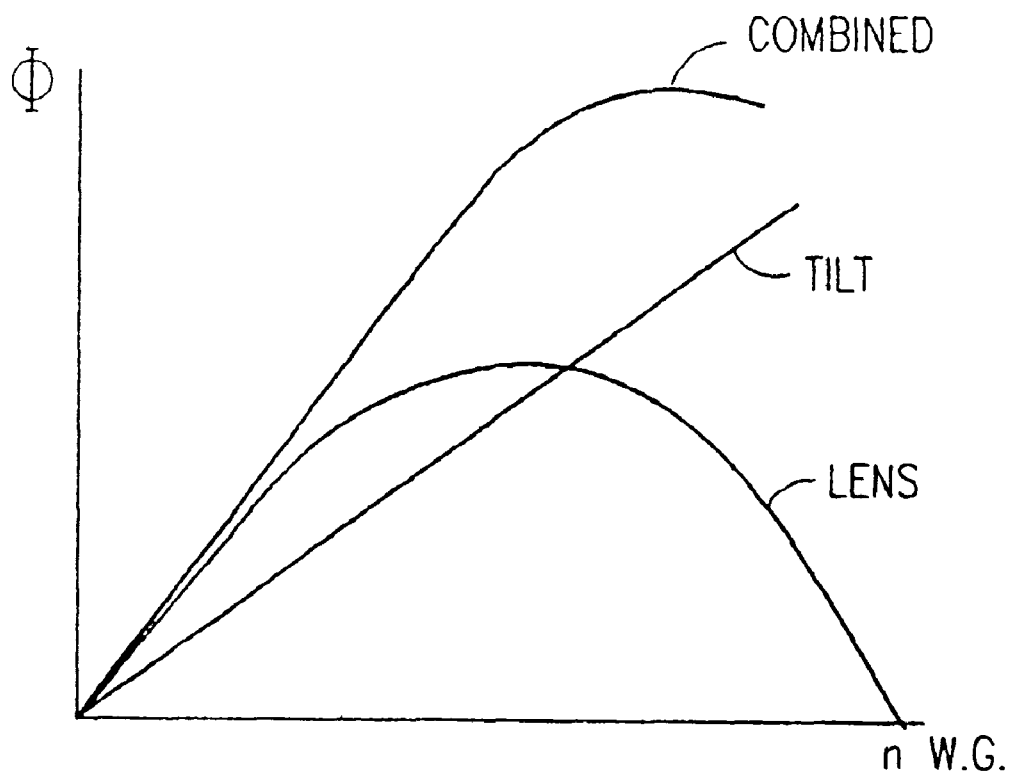
FIG. 34 is an illustration of operational parameters of a waveguide device having lens functionality in accordance with a preferred embodiment of the present invention.

Reference is now made to FIG. 34, which is an illustration of operational parameters of a waveguide device having lens functionality in accordance with a preferred embodiment of the present invention. FIG. 34 indicates that by suitable selection of the electrical inputs to the waveguide device of FIG. 33, the focusing functionality of the spherical lens 820 can be provided by the waveguides 824 and the spherical lens 820 can be obviated.

Thus, it is appreciated that there is thus provided an optical waveguide-lens including a substrate having formed thereon a multiplicity of electrically controlled, phase-shifting waveguides and an electrical control signal source providing electrical signals to the multiplicity of waveguides to cause them to have a desired lens functionality.

FIG. 34 shows the phase shift produced by the electrical control signal as a function of the waveguide number. It is seen that a lens functionality, a tilt functionality and a combined lens and tilt functionality may be realized by suitable selection of electrical control signals. It is appreciated that the lens functionality, taken alone, or in combination with the tilt functionality may be employed in any and all of the embodiments of the invention described herein.

The present invention also provides an optical switch comprising a plurality of selectably directable optical beam deflecting devices and a plurality of optical beam receiving devices.

Figure 35:
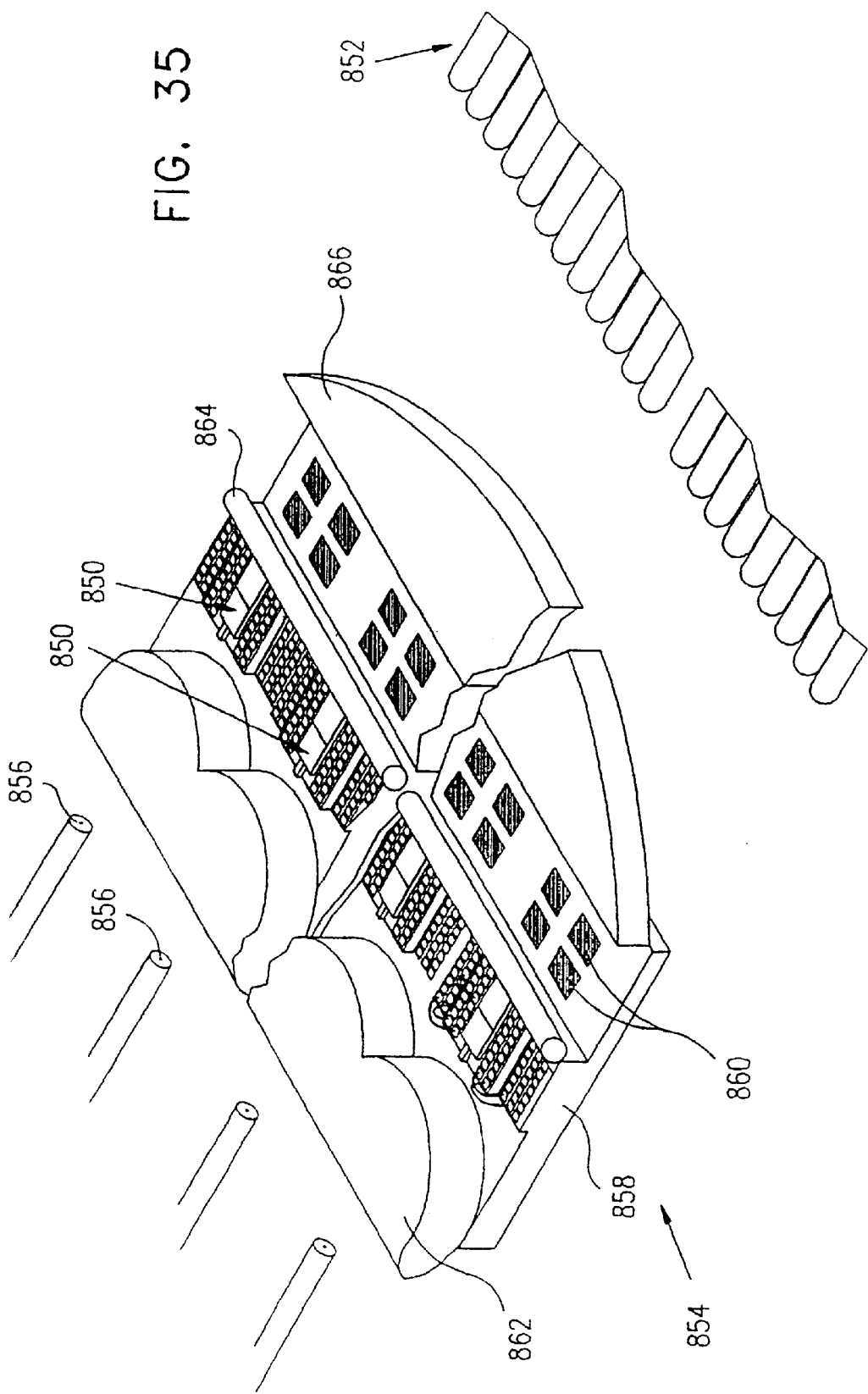
FIG. 35 is a simplified illustration of part of an optical cross-connect assembly constructed and operative in accordance with a preferred embodiment of the present invention.

Reference is now made to FIG. 35, which is a simplified illustration of part of an optical cross-connect assembly constructed and operative in accordance with a preferred embodiment of the present invention. The embodiment of FIG. 35 is particularly characterized in that it includes a plurality of selectably directable optical beam deflecting devices 850, each comprising at least one substrate having formed thereon a multiplicity of waveguides. Optical beam deflecting devices of this type are described hereinabove with reference to FIGS. 23 and 24.

The embodiment of FIG. 35 is also particularly characterized in that it includes a plurality of optical beam receivers 852. Optical beam receivers 852 may be optical fiber ends, as seen in FIG. 35. The optical fibers may be single mode or multi-mode fibers and their ends may have small numerical apertures Alternatively, optical beam receivers 852 may be light detectors or selectably directable light receivers, as described hereinabove with reference to FIG. 27.

In the embodiment of FIG. 35, at an input side 854, a plurality of selectably directable optical beam deflecting devices 850 is arranged, each to receive light from a suitably positioned optical fiber end 856. It is noted that devices 850 are mounted on a substrate 858, such as a multi-layer ceramic substrate, onto which are also mounted control electronics 860.

Light coupling between optical fiber ends 856 and beam deflection devices 850 may be achieved using a microlens array 862, as shown. The microlens array 862 may comprise a combination of cylindrical lenses arranged in two perpendicular directions. The microlens array 862 provides focusing in two mutually perpendicular directions with different optical power. Where devices 850 are similar to those described in FIG. 23, the microlens array 862 provides output beams which are collimated in a direction parallel to the plane of the devices 850. Where devices 850 are similar to those described in FIG. 24, the microlens array 862 provides output beams which are focused in a direction parallel to the plane of the devices 850.

Although a single row of cylindrical lenses is shown in FIG. 35, it is appreciated that a double row of cylindrical lenses may alternatively be employed.

Alternatively, the microlens array 862 may be obviated and individual lenses may be formed or mounted onto the optical fiber ends 856.

Downstream of the plurality of selectably directable optical beam deflecting devices 850 there is provided one or more cylindrical lenses 864 which have essentially the same functionality as that provided by cylindrical lens 822 in the embodiment of FIG. 33. A spherical lens 866 receives light from the one or more cylindrical lenses 864 and has the functionality of spherical lens 820 in the embodiment of FIG. 33. Similarly to spherical lens 820, it may be obviated in a case where the plurality of selectably directable optical beam deflecting devices 850 are provided with a lens functionality.

It is appreciated that the input side 854 may function as an output side rather than an input side. In such a case, the structures, such as optical fiber ends, functioning as light receivers 852 may function instead as light transmitters. The light transmitters may be static or directable.

Figure 36:
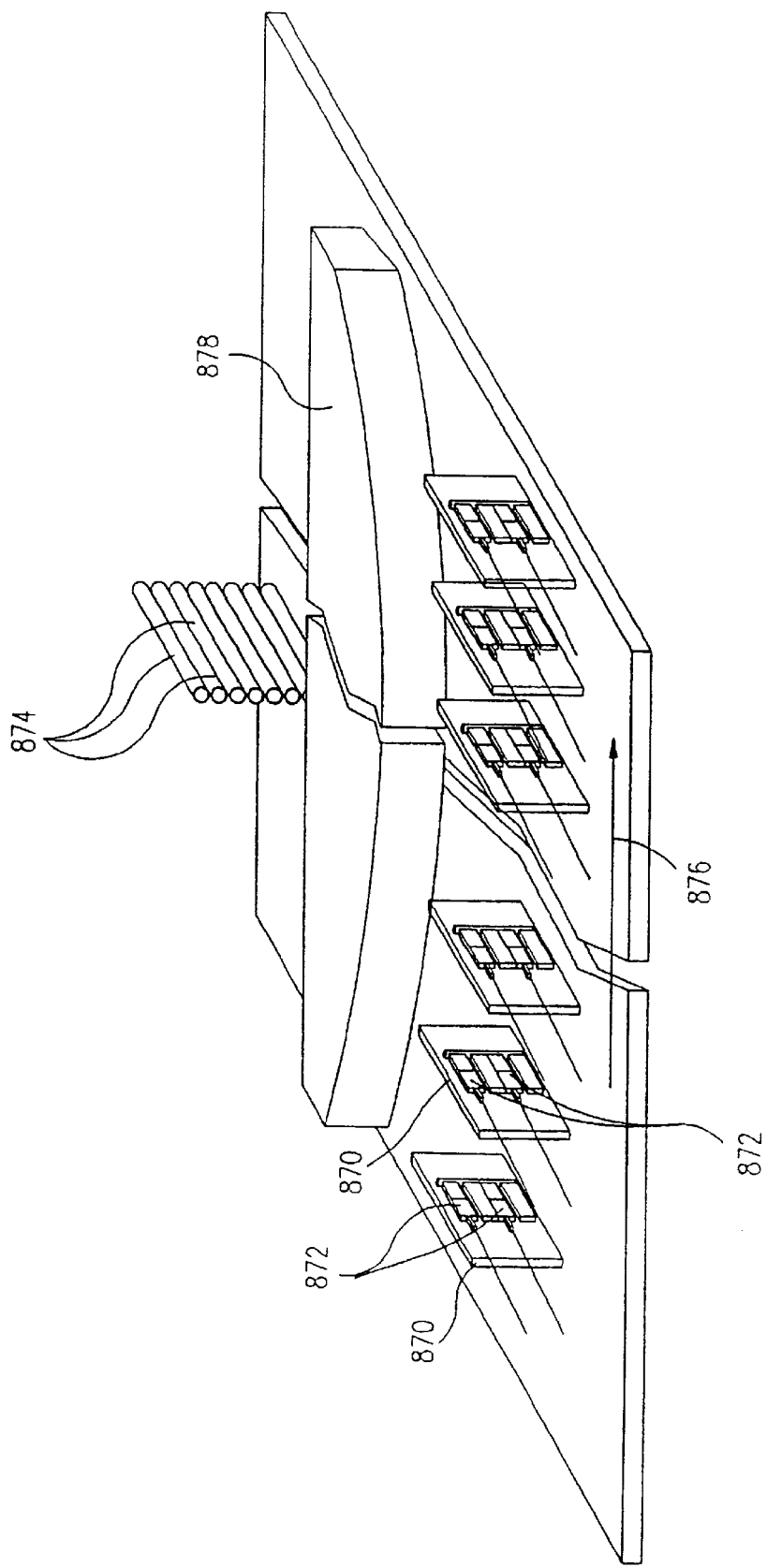
FIG. 36 is a simplified illustration of an optical cross-connect assembly constructed and operative in accordance with another preferred embodiment of the present invention.

Reference is now made to FIG. 36, which is a simplified illustration of an optical cross-connect assembly constructed and operative in accordance with another preferred embodiment of the present invention. The optical cross-connect assembly of FIG. 36 is particularly characterized in that it includes a plurality of monolithic pluralities 870 of selectably directable optical beam deflecting devices 872, as well as a plurality of optical beam receiving devices 874. The selectably directable optical beam deflecting devices 872 may be any of the devices described herein with reference to FIGS. 23–34. The monolithic pluralities 870 may be any of the structures described hereinabove with reference to FIG. 35.

In accordance with a preferred embodiment of the present invention, the plurality of monolithic pluralities 870 of beam deflecting devices 872 are arranged generally parallel to one another along an axis 876 perpendicular to a plane in which selectable deflection of a light beam is produced thereby, which is the plane of each of the plurality of monolithic pluralities 870.

A focusing lens 878 receives light from the plurality of monolithic pluralities 870 of beam deflecting devices 872 and focuses it onto the light receiving devices 874. The lens 878 may be one or more lenses and may have the functionality of lens 820 in the embodiment of FIG. 33. As such, it may be obviated by inclusion of lens functionality in the plurality of monolithic pluralities 870 of beam deflecting devices 872.

It is appreciated that the plurality of monolithic pluralities 870 of beam deflecting devices 872 and lens 878 may alternatively function as light receivers rather than a light transmitter. In such a case, the structures, such as optical fiber ends, functioning as light receivers 874 may function instead as light transmitters. The light transmitters may be static or directable.

Figure 37:
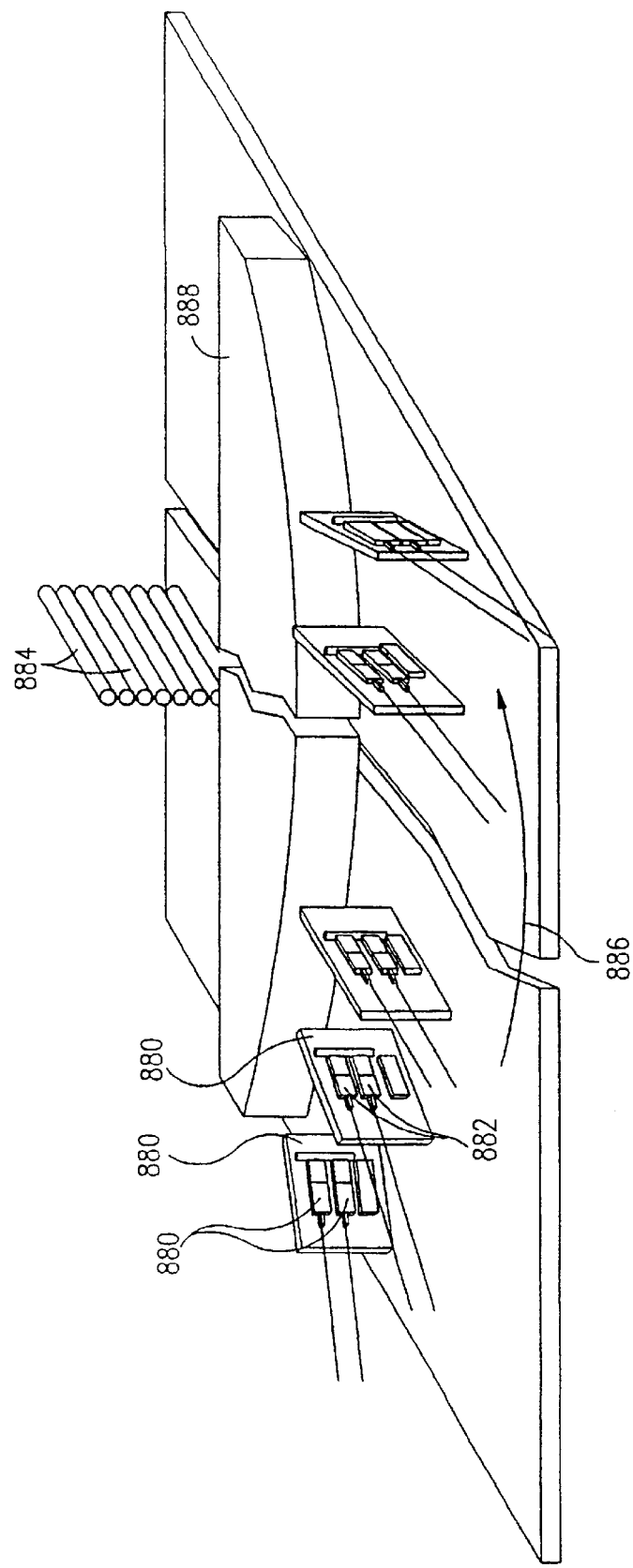
FIG. 37 is a simplified illustration of an optical cross-connect assembly constructed and operative in accordance with yet another preferred embodiment of the present invention.

Reference is now made to FIG. 37, which is a simplified illustration of an optical cross-connect assembly constructed and operative in accordance with yet another preferred embodiment of the present invention. The optical cross-connect assembly of FIG. 37 is particularly characterized in that it includes a plurality of monolithic pluralities 880 of selectably directable optical beam deflecting devices 882, as well as a plurality of optical beam receiving devices 884. The selectably directable optical beam deflecting devices 882 may be any of the devices described herein with reference to FIGS. 23–34. The monolithic pluralities 880 may be any of the structures described hereinabove with reference to FIG. 35.

Here the plurality of monolithic pluralities 880 of beam deflecting devices 882 are arranged generally distributed along a curve 886 extending in a plane perpendicular to a plane in which selectable deflection of a light beam is produced there-by, which is the plane of each of the plurality of monolithic pluralities 880.

A focusing lens 888 receives light from the plurality of monolithic pluralities 880 of beam deflecting devices 882 and focuses it onto the light receiving devices 884. The lens 888 may be one or more lenses and may have the functionality of lens 820 in the embodiment of FIG. 33. As such, it may be obviated by inclusion of lens functionality in the plurality of monolithic pluralities 880 of beam deflecting devices 882.

It is appreciated that the plurality of monolithic pluralities 880 of beam deflecting devices 882 and lens 888 may alternatively function as light receivers rather than a light transmitter. In such a case, the structures, such as optical fiber ends, functioning as light receivers 884 may function instead as light transmitters. The light transmitters may be static or directable.

Figure 38:
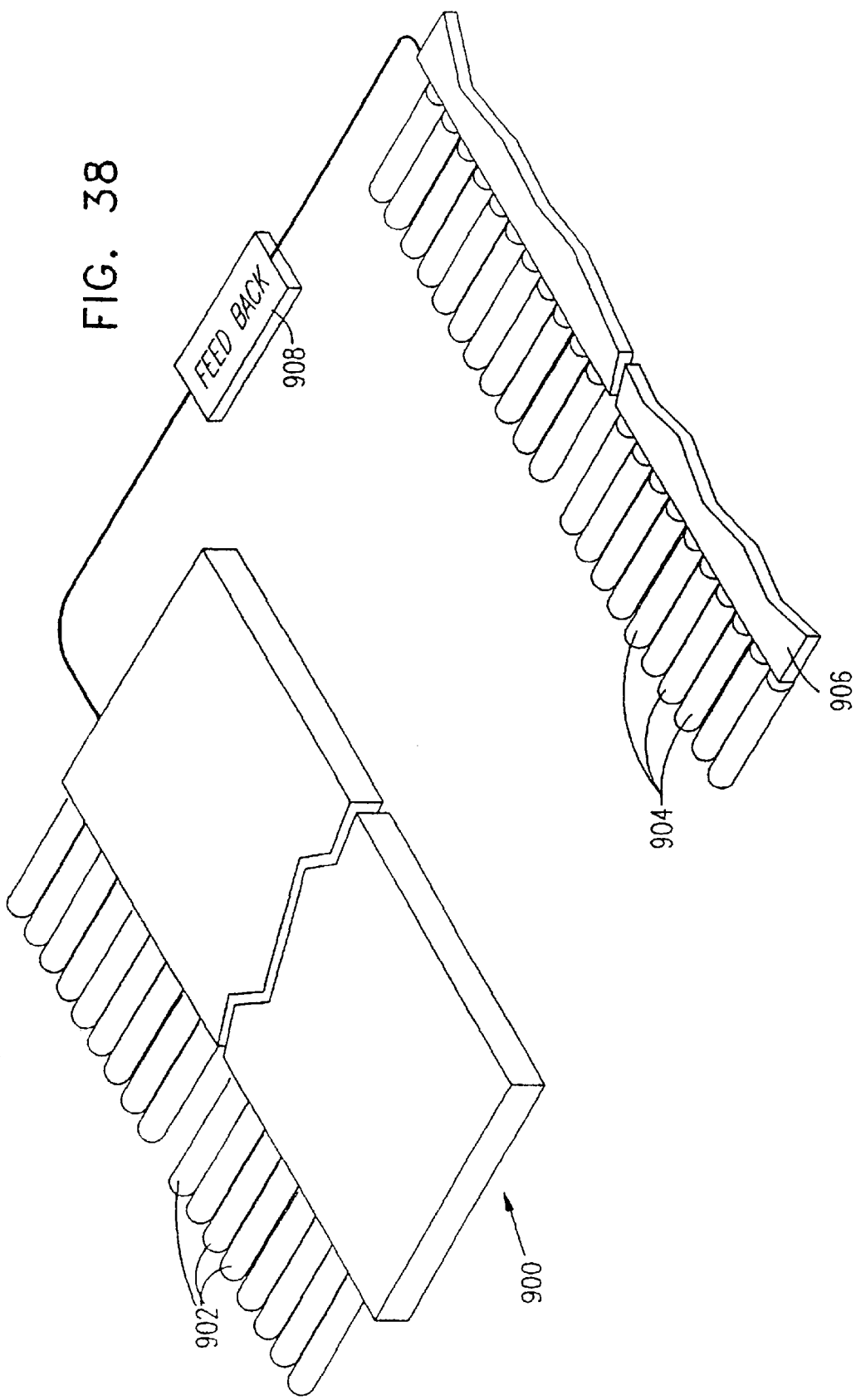
FIG. 38 is a simplified illustration of an optical cross-connect assembly of the type shown in any of FIGS. 35–37 with feedback functionality.

Reference is now made to FIG. 38, which is a simplified illustration of an optical cross-connect assembly of the type shown in any of FIGS. 35–37 with feedback functionality. The embodiment of FIG. 38 comprises an optical switch input end 900 which receives modulated light from a multiplicity of fibers 902 and selectably transmits the modulated light to a multiplicity of light receivers 904, such as optical fiber ends. The switch input end 900 may be any suitable switch input end of the type described herein with reference to any of FIGS. 35, 36 & 37.

Signal pickup devices 906 receive at least one parameter of the signals received by light receivers 904 and provide feedback input signals to a feedback processor 908. Output signals from the feedback processor 908 are operative to govern at least one parameter of the operation of the optical switch input end 900.

This feedback arrangement provides reduced crosstalk and enhanced transmission efficiency.

The feedback input signals to feedback processor 908 may represent received signal intensity and crosstalk. The parameters of operation of the optical switch input end 900 which are affected by output signals from the feedback processor include the phase shift produced by individual waveguides, the amount of rotation produced by the polarization rotator, such as rotator 576 (FIG. 18) or rotator 590 (FIG. 19). The feedback processor 908 effectively provides a feedback connection between the optical beam receiving devices and the optical beam deflecting devices.

It is appreciated that the feedback functionality need not necessarily be automatic but rather may involve some operator intervention.

Figure 39:
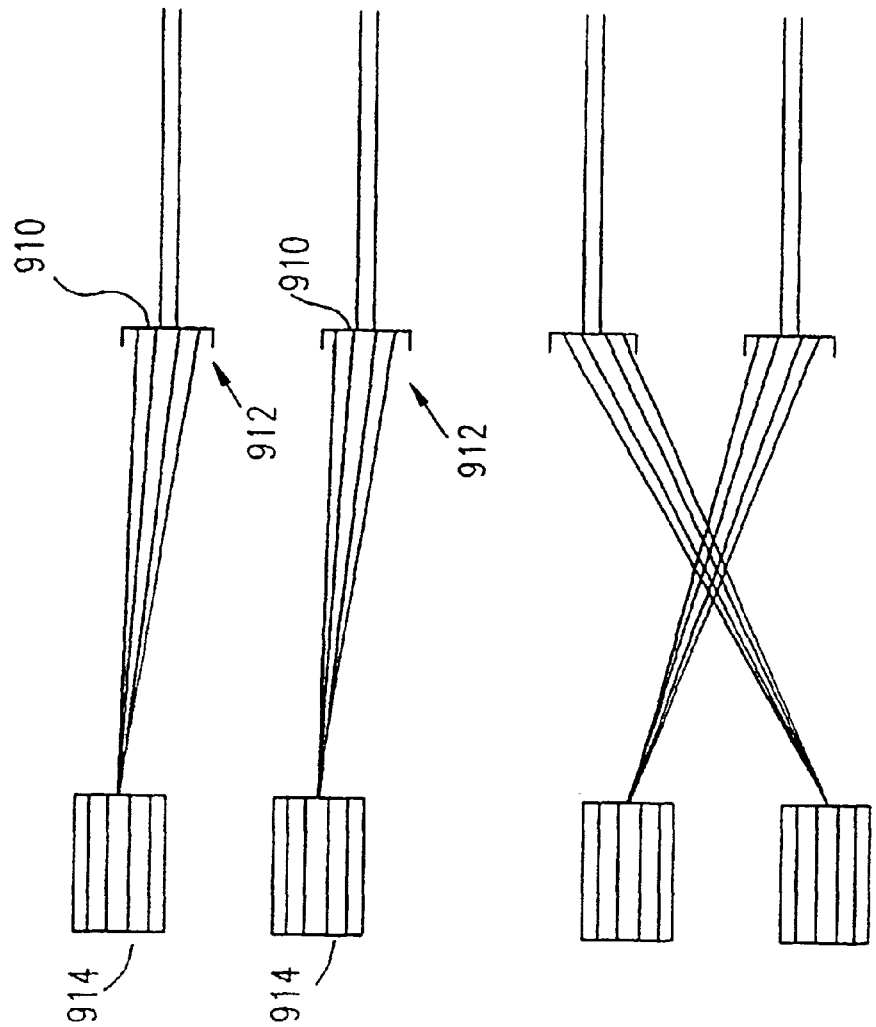
FIG. 39 is a simplified illustration of an optical cross-connect assembly constructed and operative in accordance with a preferred embodiment of the present invention.

Reference is now made to FIG. 39, which is a simplified illustration of an optical cross-connect assembly constructed and operative in accordance with a preferred embodiment of the present invention. Here optical beam receiving devices 910 are configured to receive light over a region 912 sufficiently large such that wavelength dependencies of optical beam deflectors 914 do not substantially affect the amount of light sensed by the receiving devices.

Figure 40:
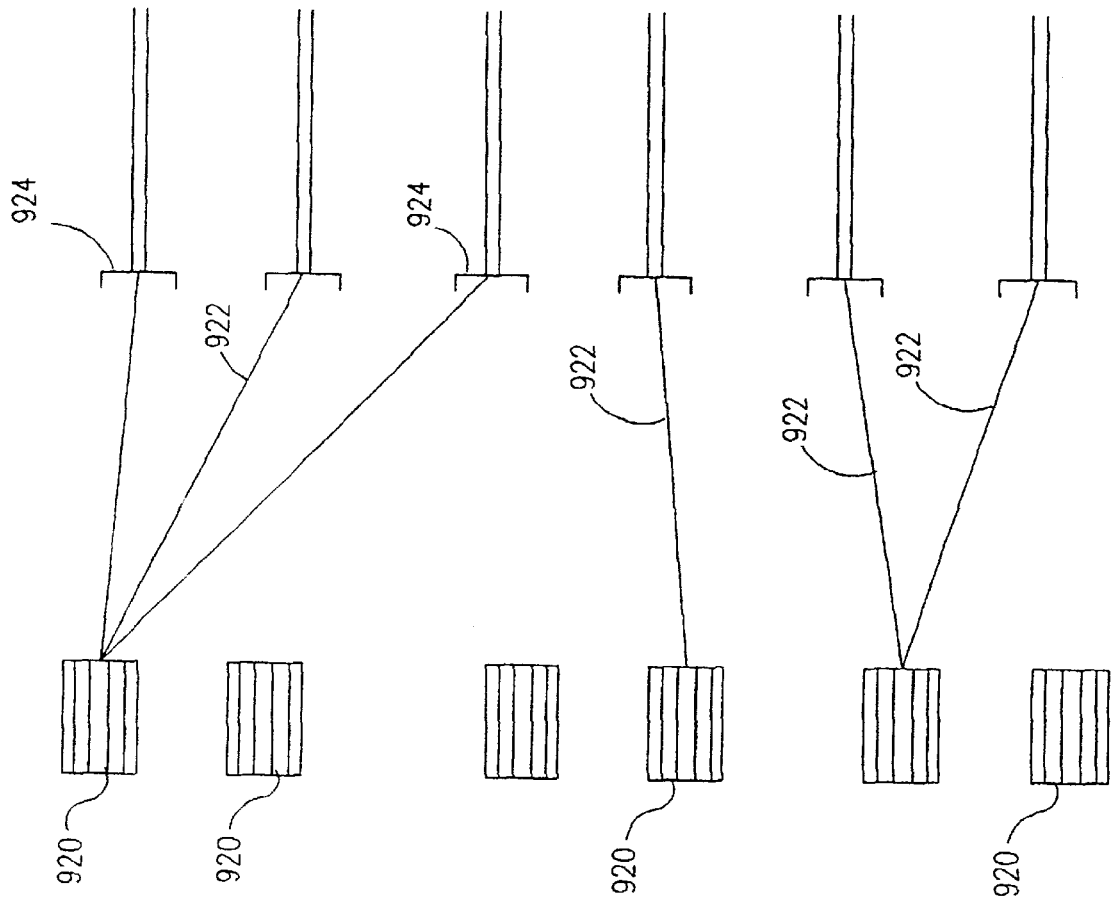
FIG. 40 is a simplified illustration of an optical cross-connect assembly constructed and operative in accordance with another preferred embodiment of the present invention.

Reference is now made to FIG. 40, which is a simplified illustration of an optical cross-connect assembly constructed and operative in accordance with a preferred embodiment of the present invention. Here a multiplicity of waveguides 920 are each operative simultaneously to deflect a plurality of optical beams 922 and to direct them to a plurality of different receivers 924.

Figure 41:
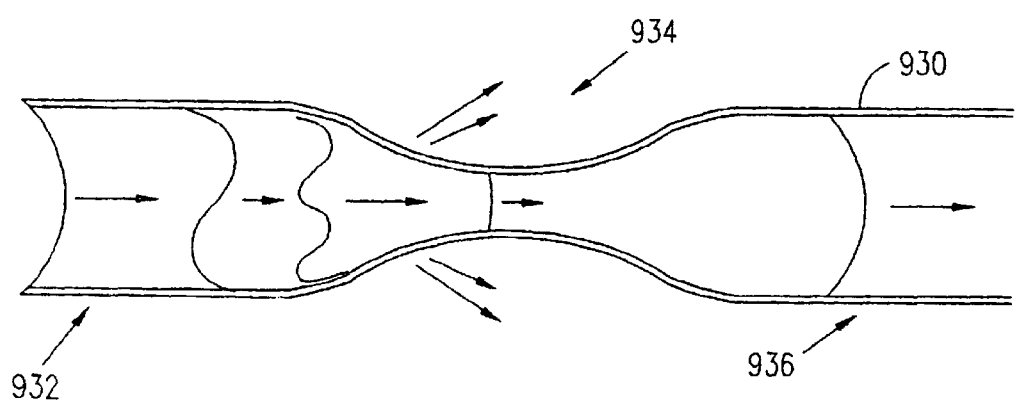
FIG. 41 is a simplified illustration of a waveguide filter constructed and operative in accordance with a preferred embodiment of the present invention.

Reference is now made to FIG. 41, which is a simplified illustration of a waveguide filter constructed and operative in accordance with a preferred embodiment of the present invention. The waveguide filter of FIG. 41 comprises a necked waveguide 930 having a relatively broad input end 932 which receives light and allows propagation of multi-mode light waves therethrough. When the multi-mode light waves encounter a narrowed neck portion 934, the higher modes radiate outside the waveguide and only the modes which can propagate through the neck portion 934 pass therethrough to a relatively broad output end 936. This filter can be used to efficiently remove higher modes which can cause crosstalk.

It is appreciated that the structures of FIGS. 39, 40 and 41 may be applied to any of the optical beam deflectors, optical beam receivers, cross-connect assemblies and optical switches described herein.

Figure 42:
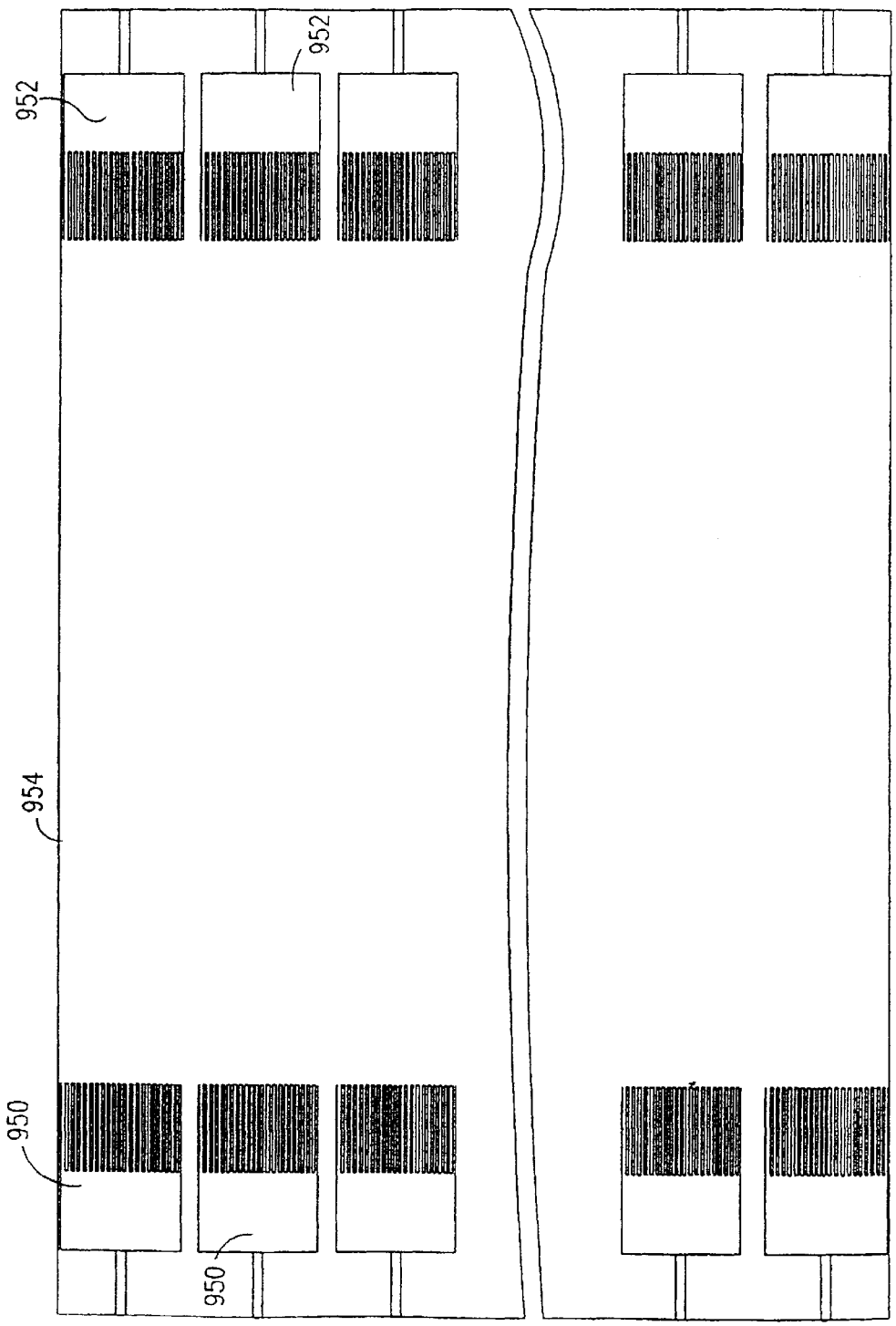
FIG. 42 is a simplified illustration of a monolithic optical cross-connect assembly constructed and operative in accordance with a preferred embodiment of the present invention.

Reference is now made to FIG. 42, which is a simplified illustration of a monolithic optical cross-connect assembly constructed and operative in accordance with a preferred embodiment of the present invention. A plurality of selectably directable optical beam deflecting devices 950 and a plurality of optical beam receiving devices 952 are all monolithically formed on the same substrate 954.

It will be appreciated by persons skilled in the art that the present invention is not limited to what has been particularly shown and described hereinabove. Rather the scope of the present invention includes both combinations and subcombinations of various features described hereinabove and shown in the drawings as well as modifications thereto and variations thereof which would occur to a person skilled in the art upon reading the description and which are not in the prior art.

What is claimed is:

1. A selectably directable optical beam deflecting device comprising:
    at least one monolithic semiconductor substrate formed of layers of materials arranged to confine an electrical field in a relatively small thickness; and
    a plurality of selectably directable optical beam deflectors formed in a single one of said at least one monolithic semiconductor substrate, each of said plurality of selectably directable optical beam deflectors comprising:
        a multiplicity of waveguides formed in said semiconductor substrate, each waveguide emitting light, the totality of light emitted by said multiplicity of waveguides producing at least one selectably directable output beam;
        at least one mode matching optical element, comprising a planar wave guide, operative to receive light from a light source and provide said light to said multiplicity of waveguides; and
        a source of electrical inputs to said at least one substrate for individually controlling the light emitted by each of the multiplicity of waveguides, thereby governing the orientation of said selectably directable output beam.

2. A selectably directable optical beam deflecting device according to claim 1, and wherein said source of electrical inputs comprises a phase controller which controls the phase of the light emitted by each of the multiplicity of waveguides.

3. A selectably directable optical beam deflecting device according to claim 1, and wherein said source of electrical inputs is an intensity controller which controls the intensity of the light emitted by each of the multiplicity of waveguides.

4. A selectably directable optical beam deflecting device according to claim 1, and wherein:
said at least one monolithic substrate comprises a plurality of monolithic substrates; and
a plurality of selectably directable optical beam deflectors are formed in a plurality of single ones of said plurality of monolithic semiconductor substrates.

5. A selectably directable optical beam deflecting device according to claim 1, and wherein said source of electrical inputs comprises at least one multiplexer.

6. A selectably directable optical beam deflecting device according to claim 1 and wherein said at least one mode matching optical element also comprises a microlens array.

7. A selectably directable optical beam deflecting device according to claim 1 and wherein said multiplicity of waveguides comprise a multiplicity of phase-shifting waveguides and said at least one substrate comprises multiple mutually insulated conductor layers including a multiplicity of conductors, at least some of which are connected to said waveguides by vias.

8. A selectably directable optical beam deflecting device according to claim 1, and also comprising wavelength division multiplexing functionality.

9. A selectably directable optical beam deflecting device according to claim 1, and wherein said multiplicity of waveguides comprises a multiplicity of polarization independent, electrically controlled waveguides.

10. A selectably directable optical beam deflecting device according to claim 1, and having selectably directable beam emitting functionality.

11. A selectably directable optical beam deflecting device according to claim 9, and wherein each one of said multiplicity of polarization independent, electrically controlled waveguides comprises first and second phase shifting waveguide portions.

12. A selectably directable optical beam deflecting device according to claim 11, and wherein said source of electrical inputs causes electric fields of different directions to be applied to said first and second phase shifting waveguide portions.

13. A selectably directable optical beam deflecting device according to claim 11, and wherein each of said multiplicity of polarization independent electrically controlled waveguides comprises first and second phase-shifting waveguide portions of respective first and second lengths having respective first and second electric fields of different directions applied thereto.

14. A selectably directable optical beam deflecting device according to claim 9, and wherein at least one of said multiplicity of polarization independent, electrically controlled waveguides comprises first and second phase shifting waveguide portions separated by a quarter-wave plate, whereby light from said first waveguide portion passes through said quarter-wave plate prior to entering said second waveguide portion.

15. A selectably directable optical beam deflecting device according to claim 1 and wherein said at least one mode matching optical element also comprises a selectable polarization rotator.

16. A selectably directable optical beam deflecting device according to claim 1 and wherein said multiplicity of waveguides each comprise a selectable polarization rotator for rotating the polarization of light passing through said multiplicity of waveguides by 90 degrees or an odd integer multiple thereof.

17. A selectably directable optical beam deflecting device according to claim 16, and wherein said selectable polarization rotator operates by generating a magnetic field extending parallel to longitudinal axes of said multiplicity of waveguides.

18. A selectably directable optical beam deflecting device according to claim 16, and wherein said selectable polarization rotator is automatically operative to rotate the polarization so as to provide an optimized light output from said multiplicity of waveguides.

19. A selectably directable optical beam deflecting device according to claim 18, and wherein said selectable polarization rotator is responsive to an output of said multiplicity of waveguides.

20. A selectably directable optical beam deflecting device according to claim 18, and wherein said selectable polarization rotator is responsive to the polarization of an input to said multiplicity of waveguides.

21. A selectably directable optical beam deflecting device according to claim 1, and having selectably directable beam receiving functionality.

22. A selectably directable optical beam deflecting device according to claim 21, and wherein said multiplicity of waveguides comprises a multiplicity of polarization independent, electrically controlled waveguides.

23. A selectably directable optical beam deflecting device according to claim 22, and wherein each one of said multiplicity of polarization independent, electrically controlled waveguides comprises first and second phase shifting waveguide portions.

24. A selectably directable optical beam deflecting device according to claim 23, and wherein said source of electrical inputs causes electric fields of different directions to be applied to said first and second phase shifting waveguide portions.

25. A selectably directable optical beam deflecting device according to claim 23, and wherein each of said multiplicity of polarization independent electrically controlled waveguides comprises first and second phase-shifting waveguide portions of respective first and second lengths having respective first and second electric fields of different directions applied thereto.

26. A selectably directable optical beam deflecting device according to claim 22, and wherein at least one of said multiplicity of polarization independent, electrically controlled waveguides comprises first and second phase shifting waveguide portions separated by a quarter-wave plate, whereby light from said first waveguide portion passes through said quarter-wave plate prior to entering said second waveguide portion.

27. A selectably directable optical beam deflecting device according to claim 21 and wherein said at least one mode matching optical element also comprises a electable polarization rotator.

28. A selectably directable optical beam deflecting device according to claim 21, and wherein said multiplicity of waveguides each comprise a selectable polarization rotator for rotating the polarization of light passing through said multiplicity of waveguides by 90 degrees or an odd integer multiple thereof.

29. A selectably directable optical beam deflecting device according to claim 28, and wherein said polarization rotator operates by generating a magnetic field extending parallel to longitudinal axes of said multiplicity of waveguides.

30. A selectably directable optical beam deflecting device according to claim 28, and wherein said selectable polarization rotator is automatically operative to rotate the polarization so as to provide an optimized light output from said multiplicity of waveguides.

31. A selectably directable optical beam deflecting device according to claim 30, and wherein said selectable polarization rotator is responsive to an output of said multiplicity of waveguides.

32. A selectably directable optical beam deflecting device according to claim 30, and wherein said selectable polarization rotator is responsive to the polarization of an input to said multiplicity of waveguides.

33. A selectably directable optical beam deflecting device according to claim 10, and wherein said selectably directable functionality is realized by means of phase-shifting.

34. A selectably directable optical beam deflecting device according to claim 21, and wherein said selectably directable functionality is realized by means of phase-shifting.

35. A selectably directable optical beam generating device according to claim 1, and also comprising:
a light source.

36. A selectably directable optical beam generating device according to claim 35, and wherein said source of electrical inputs comprises a phase controller which controls the phase of the light emitted by each of the multiplicity of waveguides.

37. A selectably directable optical beam generating device according to claim 35, and wherein said source of electrical inputs comprises an intensity controller which controls the intensity of the light emitted by each of the multiplicity of waveguides.

38. A selectably directable optical beam generating device according to claim 35 and wherein said at least one monolithic substrate comprises a plurality of monolithic substrates and wherein a plurality of selectably directable optical beam deflectors are formed in a plurality of single ones of said plurality of monolithic semiconductor substrates.

39. A selectably directable optical beam generating device according to claim 35, and wherein said light source comprises a laser formed on said at least one substrate.

40. A selectably directable optical beam deflecting device according to claim 1 and wherein said at least one mode matching optical element also comprises polarization maintaining optical fibers.

41. A selectably directable optical beam deflecting device according to claim 1, and wherein said multiplicity of waveguides are outwardly tapered at first ends thereof.

42. A selectably directable optical beam deflecting device according to claim 1 and wherein said at least one mode matching optical element also comprises a cylindrical lens.

43. A selectably directable optical beam deflecting device according to claim 1 and wherein said planar wave guide comprises a multi-mode interference coupler.

44. A selectably directable optical beam deflecting device according to claim 1, and wherein said multiplicity of waveguides have first ends which abut said planar wave guide, said first ends being tapered outwardly.

45. A selectably directable optical beam deflecting device according to claim 1, and wherein said planar waveguide comprises a light receiving waveguide.

46. A selectably directable optical beam deflecting device according to claim 45, and wherein said light receiving waveguide includes a light receiving end which is outwardly tapered.

47. A selectably directable optical beam deflecting device according to claim 45, and wherein said light receiving waveguide comprises a modulator.

48. A selectably directable optical beam deflecting device according to claim 47, and wherein said modulator receives a modulating input from a light detector monolithically formed therewith on said at least one substrate.

49. A selectably directable optical beam deflecting device according to claim 1, and wherein said multiplicity of waveguides is controllable so as to selectably provide multiple selectably directed output beams.

50. A selectably directable optical beam deflecting device according to claim 1 and also comprising a waveguide filter including:
a necked waveguide having a relatively broad input end which receives light and allows propagation of multimode light waves therethrough;
a narrowed neck portion at which higher modes radiate outside the waveguide and only the modes which can propagate therethrough pass therethrough; and
a relatively broad output end.

51. A selectably directable optical beam deflecting device according to claim 1, and wherein said at least one substrate comprises gallium arsenide.

52. An active optical beam transmission device according to claim 1, and also comprising a multiple layer integrated electronic circuit formed on said substrate.

53. An active optical beam transmission device according to claim 52, and wherein said multiplicity of waveguides emit a selectably directable beam of light.

54. An active optical beam transmission device according to claim 52, and wherein said multiplicity of waveguides selectably receive a beam of light.

55. A selectably directable optical beam deflecting device according to claim 1, wherein said multiplicity of waveguides comprises a multiplicity of electrically controlled waveguides and wherein said device also comprises:
overlying said multiplicity of waveguides, a multiplicity of electrical contacts, each contact providing an electrical connection to at least one of the multiplicity of electrically controlled waveguides.

56. A selectably directable optical beam deflecting device according to claim 1, wherein said multiplicity of waveguides comprises a plurality of waveguide assemblies, each including a multiplicity of electrically controlled waveguides and wherein said device also comprises:
overlying each of said waveguide assemblies, a multiplicity of electrical contacts, each contact providing an electrical connection to at least one of the multiplicity of electrically controlled waveguides in said assembly.

57. An optical waveguide-lens device according to claim 1, and wherein said multiplicity of waveguides comprises a multiplicity of electrically controlled, phase-shifting waveguides and wherein said source of electrical inputs comprises:
an electrical control signal source providing electrical signals to said multiplicity of waveguides to cause them to have a desired lens functionality.

58. An apparatus according to claim 1 and wherein said source of electrical inputs comprises an electrical control signal source providing electrical signals to said multiplicity of waveguides to cause them to have a desired lens functionality.

59. A selectably directable optical beam deflecting device according to claim 15 and wherein said selectable polarization rotator is automatically operative to rotate the polarization so as to provide an optimized light output from said multiplicity of waveguides.

60. A selectably directable optical beam deflecting device according to claim 59 and wherein said selectable polarization rotator is responsive to an output of said multiplicity of waveguides.

61. A selectably directable optical beam deflecting device according to claim 59 and wherein said selectable polarization rotator is responsive to the polarization of an input to said multiplicity of waveguides.

62. A selectably directable optical beam deflecting device according to claim 27 and wherein said selectable polarization rotator is automatically operative to rotate the polarization so as to provide an optimized light output from said multiplicity of waveguides.

63. A selectably directable optical beam deflecting device according to claim 62 and wherein said selectable polarization rotator is responsive to an output of said multiplicity of waveguides.

64. A selectably directable optical beam deflecting device according to claim 62 and wherein said selectable polarization rotator is responsive to the polarization of an input to said multiplicity of waveguide.

* * * * *